United States Patent
Fedorov et al.

(10) Patent No.: US 12,536,608 B2
(45) Date of Patent: Jan. 27, 2026

(54) EFFICIENT MULTI-DIMENSIONAL STORAGE OF VERY LARGE DENSE, SPARSE AND SEMI-SPARSE IMAGE DATASETS WITH MACHINE LEARNING

(71) Applicant: ViQi, Inc., Santa Barbara, CA (US)

(72) Inventors: Dmitry Fedorov, Santa Barbara, CA (US); Christian A. Lang, Santa Barbara, CA (US); Kristian Kvilekval, Santa Barbara, CA (US); Ilya Goldberg, Santa Barbara, CA (US)

(73) Assignee: VIQI, INC., Santa Barbara, CA (US)

( * ) Notice: Subject to any disclaimer, the term of this patent is extended or adjusted under 35 U.S.C. 154(b) by 291 days.

(21) Appl. No.: 18/089,561

(22) Filed: Dec. 27, 2022

(65) Prior Publication Data

US 2023/0281749 A1     Sep. 7, 2023

Related U.S. Application Data

(60) Provisional application No. 63/294,382, filed on Dec. 28, 2021.

(51) Int. Cl.
*G06T 7/00*     (2017.01)
*G06T 1/60*     (2006.01)
(Continued)

(52) U.S. Cl.
CPC ............... *G06T 1/60* (2013.01); *G06T 3/40* (2013.01); *G06T 5/50* (2013.01); *G06T 7/11* (2017.01);
(Continued)

(58) Field of Classification Search
CPC .... G06T 7/11; G06T 1/60; G06T 3/40; G06V 10/50; G06V 10/426; G06V 10/454; G06V 10/7625; G06V 10/764
See application file for complete search history.

(56) References Cited

U.S. PATENT DOCUMENTS 12,061,257 B2    8/2024   Wernick et al.
12,131,539 B1    10/2024  Broaddus et al.
(Continued)

OTHER PUBLICATIONS

Smith, John R., Vittorio Castelli, and Chung-Sheng Li. "Adaptive storage and retrieval of large compressed images." Storage and Retrieval for Image and Video Databases VII. vol. 3656. SPIE, 1998.*

(Continued)

*Primary Examiner* — Li Liu
(74) *Attorney, Agent, or Firm* — Alford Law Group, Inc.

(57) ABSTRACT

Methods, apparatus, and systems for high-resolution image storage and analysis are disclosed. In one disclosed embodiment, a method includes analyzing a high-resolution image; partitioning the high-resolution image into logical blocks; detecting objects in the high-resolution image within the logical blocks, assigning objects that differ or with differing measures to differing layers, and assigning objects that are similar or with similar measures to the same layer; tabulating the detected objects into a table, wherein each row indicates a spatial position of each detected object and at least one measure of each detected object; storing the spatial position and the at least one measure of each detected object into the table; spatially rendering selected objects over the high-resolution image; and displaying the selected objects at a selected resolution within a portion of the high-resolution image on a display device.

24 Claims, 34 Drawing Sheets
(24 of 34 Drawing Sheet(s) Filed in Color)

200A

(51) Int. Cl.
   *G06T 3/40*  (2006.01)
   *G06T 5/50*  (2006.01)
   *G06T 7/11*  (2017.01)
   *G06T 7/70*  (2017.01)

(52) U.S. Cl.
   CPC ...... *G06T 7/70* (2017.01); *G06T 2207/10056* (2013.01); *G06T 2207/20221* (2013.01)

(56) References Cited

U.S. PATENT DOCUMENTS

| | | | |
|---|---|---|---|
| 2013/0004072 A1 | 1/2013 | Liu et al. | |
| 2015/0049943 A1* | 2/2015 | Hamsici | G06F 18/2415 382/218 |
| 2020/0302237 A1* | 9/2020 | Hennings Yeomans | G06V 20/56 |

OTHER PUBLICATIONS

Yadav, Avnish, Adithya Aryasomayajula, and Rizwan Ahmed Ansari. "Multiresolution analysis based sparse dictionary learning for remotely sensed image retrieval." 2019 Women Institute of Technology Conference on Electrical and Computer Engineering (WITCON ECE). IEEE, 2019.*

Cha, Guang-Ho. "High-Dimensional Image Indexing Based on Adaptive Partitioning and Vector Approximation." Visual and Multimedia Information Management: IFIP TC2/WG2. 6 Sixth Working Conference on Visual Database Systems May 29-31, 2002 Brisbane, Australia. Springer US, 2002.*

Fedorov, D., et al. "BisQue: cloud-based system for management, annotation, visualization, analysis and data mining of underwater and remote sensing imagery." 2015.*

Thomas, Shane; PCT/US2022/054209; International Search Report; Jun. 28, 2023; 5 pages.

Thomas, Shane; PCT/US2022/054209; Written Opinion Of the International Searching Authority; Jun. 28, 2023; 6 pages.

Kaufman et al.; "Volume Visualization and Volume Graphics"; Center for Visual Computing, Computer Science Department, Stony Brook University; 2003; 35 pages. [Retreived May 26, 2003 from internet: https://www3.cs.stonybrook.edu/~mueller/teaching/cse332/volvisChapter.pdf].

Youngren, Robert William; Dissertation: "Multi-Resolution Data Structures for Spherically Mapped Data Point", University of Alabama, Huntsville, Alabama, 2017; 35 pages. [Retrieved May 26, 2023 from Internet: https://louis.uah.edu/cgi/viewcontent.cgi?article=1124&context=uah-dissertations].

* cited by examiner

An example of a 3 layer resolution pyramid (3 different scales)
with
2 highest resolution levels represented in a sparse storage
and
the 3d level using dense storage

FIG. 6

> 📁 036445A_9768_00-8UPia2RckPSXJDPmBN
>   > 📁 cells
>     > 📁 level_000
>     > 📁 level_001
>     > 📁 level_002
>     > 📁 level_003
>   > 📊 table

700

| | | | Add A |
|---|---|---|---|
| Object Attribute Info | General Object Info | | |
| Number of attributes = 10 | | | |
| Name | Type | Array Size | Value[50](...) |
| CLASS | String, length = 5, string padding = H5T_STR_NULLTERM | Scalar | GROUP |
| FILTERS | 64-bit integer | Scalar | 65801 |
| TITLE | String, length = 1, string padding = H5T_STR_NULLTERM | Scalar | |
| VERSION | String, length = 3, string padding = H5T_STR_NULLTERM | Scalar | 1.0 |
| viqi_columns_id | String, length = 4, string padding = H5T_STR_NULLTERM | Scalar | Cell |
| viqi_columns_reference | String, length = 4, string padding = H5T_STR_NULLTERM | Scalar | mask |
| viqi_image_content | String, length = 4, string padding = H5T_STR_NULLTERM | Scalar | mask |
| viqi_image_size | 32-bit unsigned integer | 2 | 28030, 84007 |
| viqi_image_type | String, length = 6, string padding = H5T_STR_NULLTERM | Scalar | planar |
| viqi_storage_subtype | String, length = 8, string padding = H5T_STR_NULLTERM | Scalar | combined |

Spatial distribution of "cell area" measure for cell nuclei detected in this slide

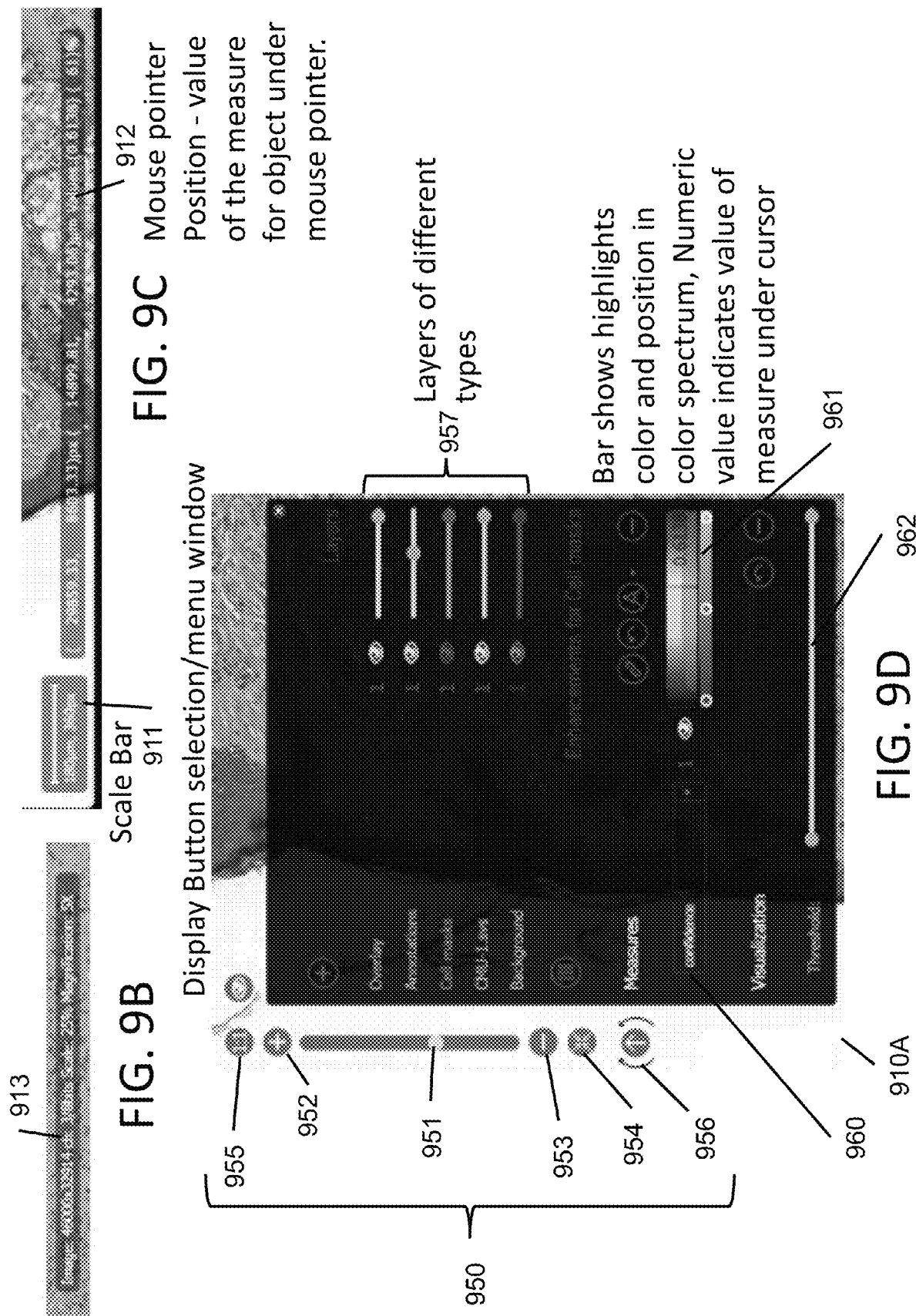

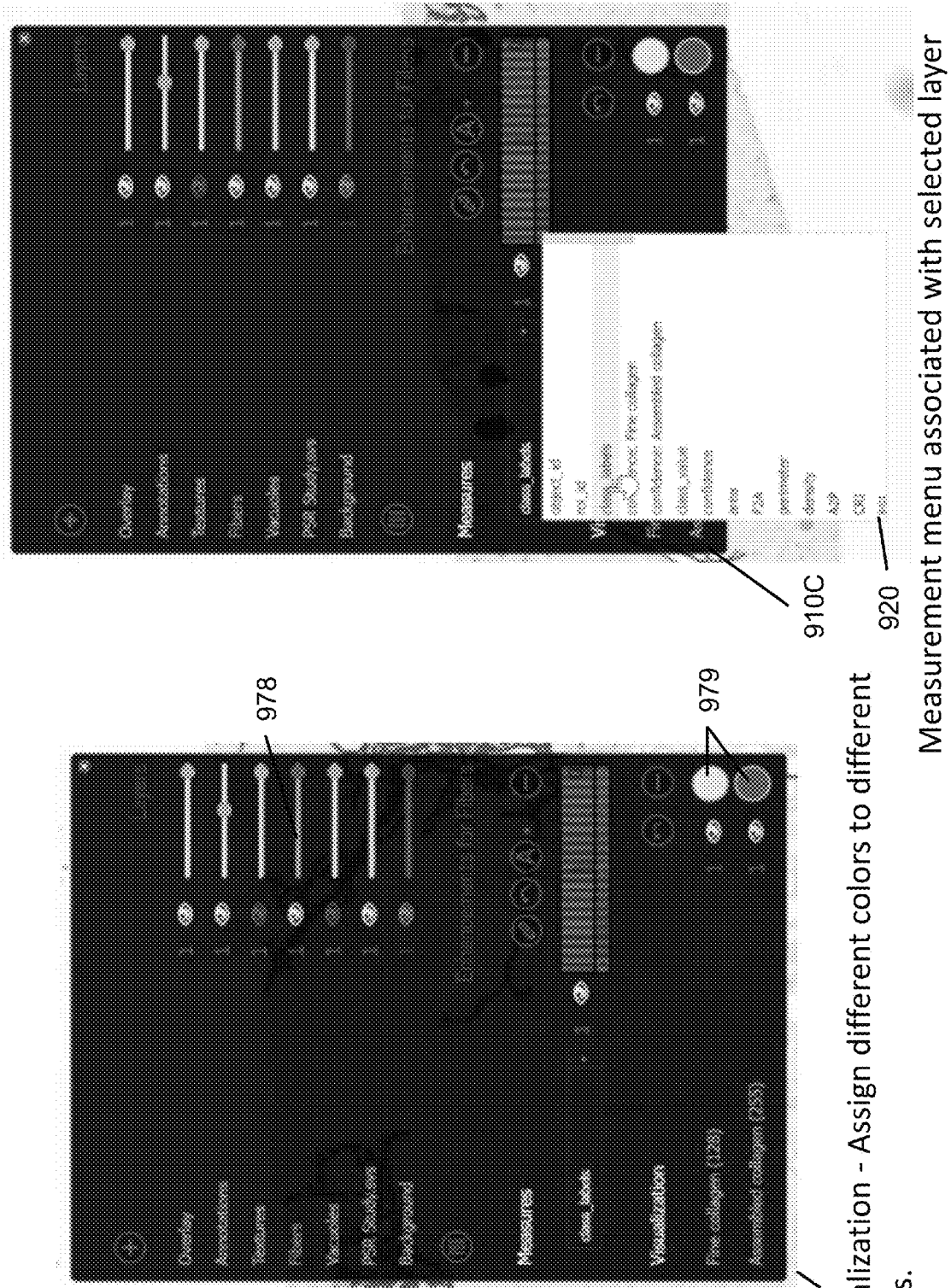

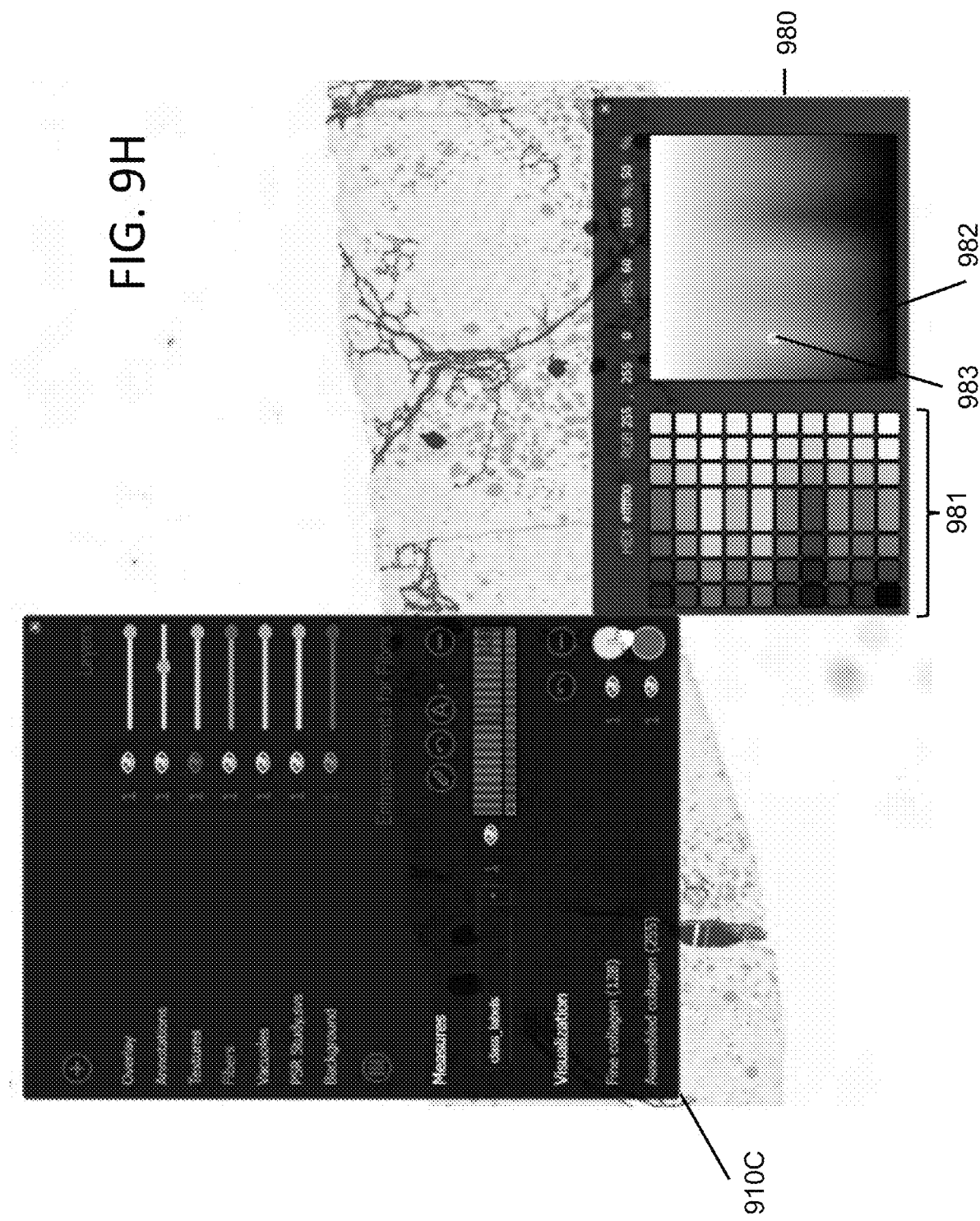

Magnification at 100% resolution

Viewer example with selection of measures of interest in the cells layer

Viewer example with lower bound gating of cells based on "area" measure

Viewer example showing all measures of a selected cell object

Viewer example showing layers of inflammatory cell nuclei confidence and confidence of inflammatory clusters overlaid on top ~ % 036445A_9768_00-8UPia2RckPSXJDPmE % cells
    v % level_000
        % block_0000
        % block_0000_sparse_index
        % block_0001
        % block_0001_sparse_index
        % block_0002
        % block_0002_sparse_index
        % block_0003
        % block_0003_sparse_index
        % block_0004
        % block_0004_sparse_index
        % block_0005
        % block_0005_sparse_index
        % block_0006
        % block_0006_sparse_index
        % block_0007
        % block_0007_sparse_index
        % block_0008
        % block_0008_sparse_index Object Attribute Info: General Object Info Number of attributes = 9                                                                                  Add Attribute  Delete

| Name | Type | Array Size | Value[50](...) |
|---|---|---|---|
| CLASS | String, length = 5, string padding = H5T_STR_NULLTERM | Scalar | GROUP |
| FILTERS | 64-bit integer | Scalar | 65801 |
| TITLE | String, length = 1, string padding = H5T_STR_NULLTERM | Scalar | |
| VERSION | String, length = 3, string padding = H5T_STR_NULLTERM | Scalar | 1.0 |
| viqi_block_item_id_offsets | 32-bit unsigned integer | 568 | 0, 1000000, 2000000, 3000... |
| viqi_level_scale | 64-bit floating-point | Scalar | 1.0 |
| viqi_storage_block_bboxes | 32-bit unsigned integer | 588 x 4 | 0, 0, 2040, 2040, 0, 1999, 2... |
| viqi_storage_number_blocks | 32-bit integer | Scalar | 588 |
| viqi_storage_sparse_items | 32-bit integer | Scalar | 2748101 |

FIG. 16

| | | Object Attribute Info | General Object Info | | | |
|---|---|---|---|---|---|---|
| | | Number of attributes = 6 | | | | |
| | | Name | Type | | Array Size | Value[50][...] |
| | | CLASS | String, length = 6, string padding = H5T_STR_NULLTERM | | Scalar | CARRAY |
| | | TITLE | String, length = 1, string padding = H5T_STR_NULLTERM | | Scalar | |
| | | VERSION | String, length = 3, string padding = H5T_STR_NULLTERM | | Scalar | 1.1 |
| | | viqi_block_bbox | 32-bit unsigned integer | | 4 | 0, 0, 2040, 2040 |
| | | viqi_block_content | String, length = 4, string padding = H5T_STR_NULLTERM | | Scalar | mask |
| | | viqi_block_format | String, length = 6, string padding = H5T_STR_NULLTERM | | Scalar | sparse |

- 036445A_9768_00-8UPia2RckPSXJDPmE
  - cells
    - level_000
      - block_0000
      - block_0000_sparse_index
      - block_0001
      - block_0001_sparse_index
      - block_0002
      - block_0002_sparse_index
      - block_0003
      - block_0003_sparse_index
      - block_0004
      - block_0004_sparse_index

EFFICIENT MULTI-DIMENSIONAL STORAGE OF VERY LARGE DENSE, SPARSE AND SEMI-SPARSE IMAGE DATASETS WITH MACHINE LEARNING

GOVERNMENT LICENSE RIGHTS

This invention was made with government support under grant award number DE-SC0018550 awarded by the Department of Energy. The government has certain rights in the invention.

COPYRIGHT NOTICE

A portion of the disclosure of this document contains material to which a claim for copyright is made. The copyright owner has no objection to the reproduction of the patent document or the patent disclosure, as it appears in the U.S. Patent Office records, but reserves all other copyrights whatsoever.

CROSS-REFERENCE TO RELATED APPLICATIONS

This patent application claims the benefit of U.S. Provisional Patent Application No. 63/294,382 titled EFFICIENT MULTI-DIMENSIONAL STORAGE OF VERY LARGE DENSE, SPARSE AND SEMI-SPARSE IMAGE DATASETS WITH MACHINE LEARNING filed on Dec. 28, 2021, by inventors Dmitry Fedorov et al., incorporated herein by reference for all intents and purposes.

This patent application also incorporates by reference U.S. Provisional Patent Application No. 63/228,093 entitled MACHINE LEARNING FOR EARLY DETECTION OF CELLULAR MORPHOLOGICAL CHANGES filed on Jul. 31, 2021, by inventors Ilya Goldberg et al., for all intents and purposes. This patent application further incorporates by reference U.S. Provisional Patent Application No. 63/146,541 entitled MACHINE LEARNING FOR EARLY DETECTION OF CELLULAR MORPHOLOGICAL CHANGES filed on Feb. 5, 2021, by inventors Ilya Goldberg et al., for all intents and purposes.

FIELD

The disclosed embodiments relate generally to methods and apparatus for efficiently storing high-resolution digital images having large file sizes.

BACKGROUND

High-resolution digital images with large (e.g., gigabyte or terabyte) file sizes are often difficult to process with personal computers, due to random access memory limitations and/or processor limitations. Displaying high-resolution digital images with large file sizes on a display device is often challenging. Zooming in and out on high-resolution digital images to display different features therein can be a slow process. Furthermore, analysis of objects within a high-resolution digital image is often desirable but computationally difficult. It is desirable to provide a computer system with a more efficient process of handling, storing, reading, and displaying high-resolution digital images.

BRIEF SUMMARY

The embodiments are summarized by the claims that follow below which are incorporated here by reference.

One or more objects of some of the disclosed embodiments are as follows. One object of the disclosed embodiments is to describe a large multi-dimensional (N-Dimensional) space with detected imaged objects and their numerical features (measures). Another object of the embodiments is to store millions of small detected imaged objects represented as matrix data (masks or image data). Another object of the embodiments is to store several numerical features (measures or measurements) associated with the small detected imaged objects. Another object of the embodiments is to present the data as a dense table with a column being a matrix of object raster content (mask or image data). Another object of the embodiments is to speed retrieval of individual object matrices and their numerical features. Another object of the embodiments is to improve efficiency in storage space utilization. Another object of the embodiments is to provide for incremental detection and addition of groups of objects (individual element additions are not required and may not need to be very efficient although possible) into a data store associated with the high-resolution image information, prior detected objects, and prior computed measures. Another object of the embodiments is provided the ability to store multiple groups of objects together as layers of such objects at different paths and possibly different resolutions.

A further object of embodiments is to reconstruct full resolution regions from the dense multidimensional (N-D) space. A still further object of embodiments is to quickly reconstruct lower resolution regions from the dense (N-D) space. A still further object of embodiments is to reconstruct masks with different intensities per object based on the associated object identifiers (IDs) or associated object features. A still further object of embodiments is to represent different resolution levels with different storage mechanisms. A still further object of embodiments is to store dense blocks of image data not representing objects when it is desired to view the high-resolution image at a low resolution. A still further object of embodiments is to provide the ability to store object information (parameters, measures, etc.) in addition to the raster data.

BRIEF DESCRIPTION OF THE DRAWINGS

This patent or application file contains at least one drawing executed in color. Copies of this patent or patent application publication with color drawing(s) will be provided by the United States Patent and Trademark Office upon request and payment of the necessary fee.

FIG. 6 shows a portion of a table (tabular) of logical blocks and associated parameters.

FIG. 7 shows an example of a main view of the file structure of the high-resolution image.

FIG. 9A-9H illustrates views of a context based graphical user interface (GUI) of the viewer/analysis tool/system for high-resolution images.

FIG. 16 illustrates a hierarchy format of an example portion of a resolution level 0 (scale 100%) used for a high-resolution image.

FIG. 17 illustrates a format of storing images of a block at a given resolution level.

FIG. 18 illustrates a format of storing a portion of a block in a sparse matrix format at a given resolution level.

DETAILED DESCRIPTION

Figure 1A:
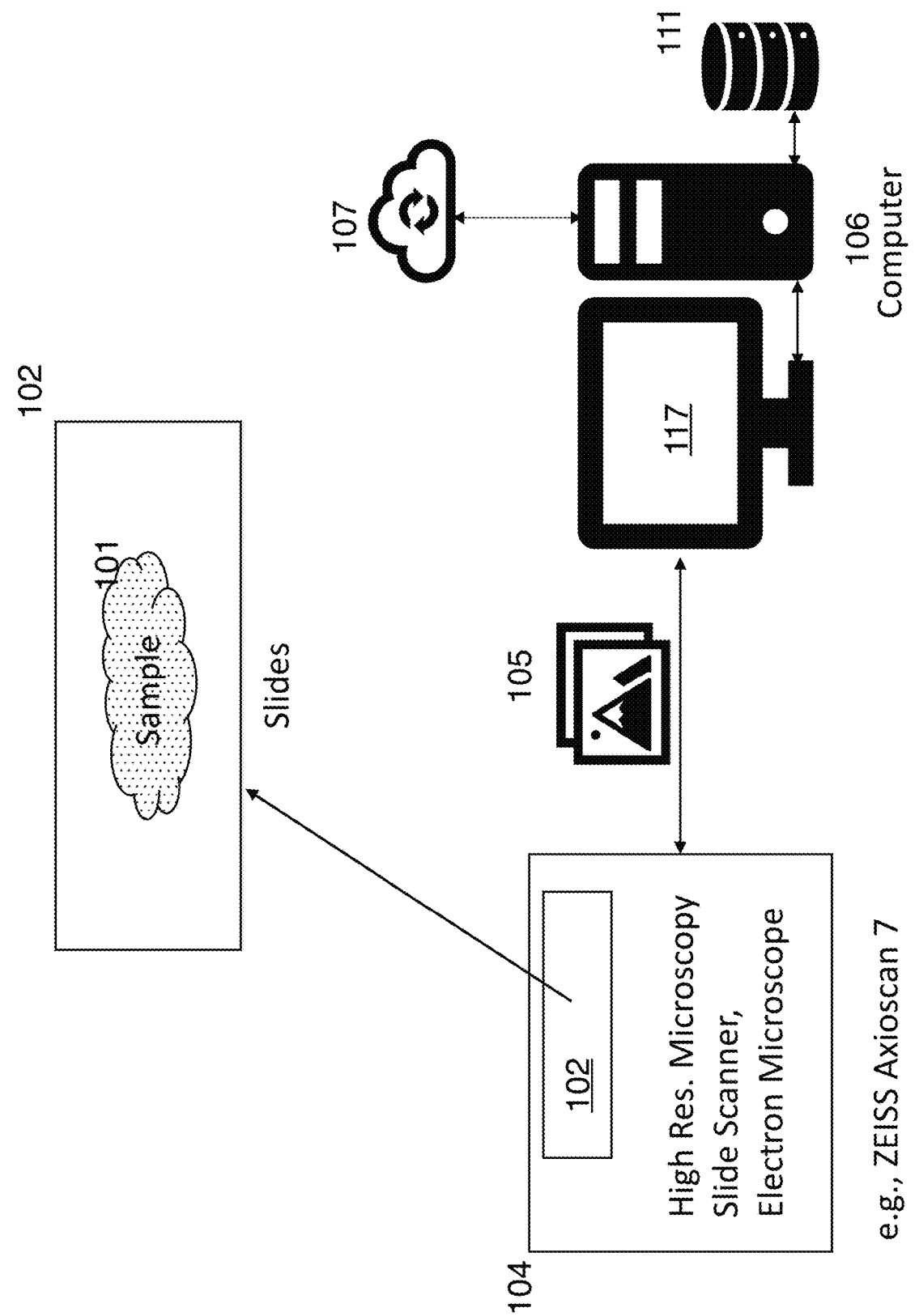
FIG. 1A is a block diagram of a high-resolution microscopy/spectroscopy system in communication with a computer system with a high image storage and analysis database.

In the following detailed description of the disclosed embodiments, numerous specific details are set forth in order to provide a thorough understanding. However, it will be obvious to one skilled in the art that the disclosed embodiments can be practiced without these specific details. In other instances, well known methods, functions, procedures, components, systems, and subsystems have not been described in detail so as not to unnecessarily obscure aspects of the disclosed embodiments.

Researchers are entering a new era in scientific discovery enabled by big data and eScience. A growing, but largely untapped resource, is large-scale image analytics. Previously large-scale high-resolution images were only viewed by scientists. Advanced analytics can now allow scientists to extract quantitative data from the images. New imaging techniques now routinely reveal everything from crystal lattices to fully cleared brains in ever-increasing levels of detail. The high-resolution and imaging throughput requires significant innovation to visualize, validate and analyze the large amounts of data. Furthermore, as data sizes grow even more, computational power for the stored data is desirable. Moreover, a web-based platform is desirable to allow collaboration with colleagues and business associates with the stored data.

A scalable, web-based viewer and query system for large scientific image and tabular data is disclosed to provide interactive visualization of multi-terabyte datasets on local commodity hardware. It can be used with extremely large datasets, such as from material science (X-ray tomography) and life science (high-resolution microscopy). Query and analysis mechanisms interface with the viewer to handle large, diverse collections of scientific datasets. The visualization capabilities are provided in scalable web viewers for other common scientific data types with novel ways to analyze large datasets directly in the viewer. Support for scientific workflows and versioning is provided for repeatability of scientific analyses.

The web-based platform that enables ubiquitous access to data, collaboration, and scientific workflows. The web-based platform can reshape scientific collaborative work in data-intensive domains and can lead to new insights and discoveries in materials science, life sciences, and other related disciplines. As a software-as-a-service platform, the disclosed functionality can provide an important element to industries dealing with massive data analytics requiring data sharing and delivery.

Pharmaceutical and biotech companies are increasingly outsourcing research and development to external research organizations under contract, boosting the need for inter-organization collaboration over large life science datasets, such as full-brain scans for example. Drug discovery processes, such as by drugs treating tissue for example, can be expedited with the disclosed embodiments, potentially reducing the time-to-market of novel treatments. Other industries, such as materials science, oil and gas exploration, construction, surveillance, and agribusiness, can benefit from the disclosed embodiments through an image sharing and analysis service.

The disclosed image storage format can detect millions or more objects (small, medium, and large objects) in a large image, compute and store several numerical features computed on these objects, all the while paying attention to speed, size and functionality.

Figure 1B:
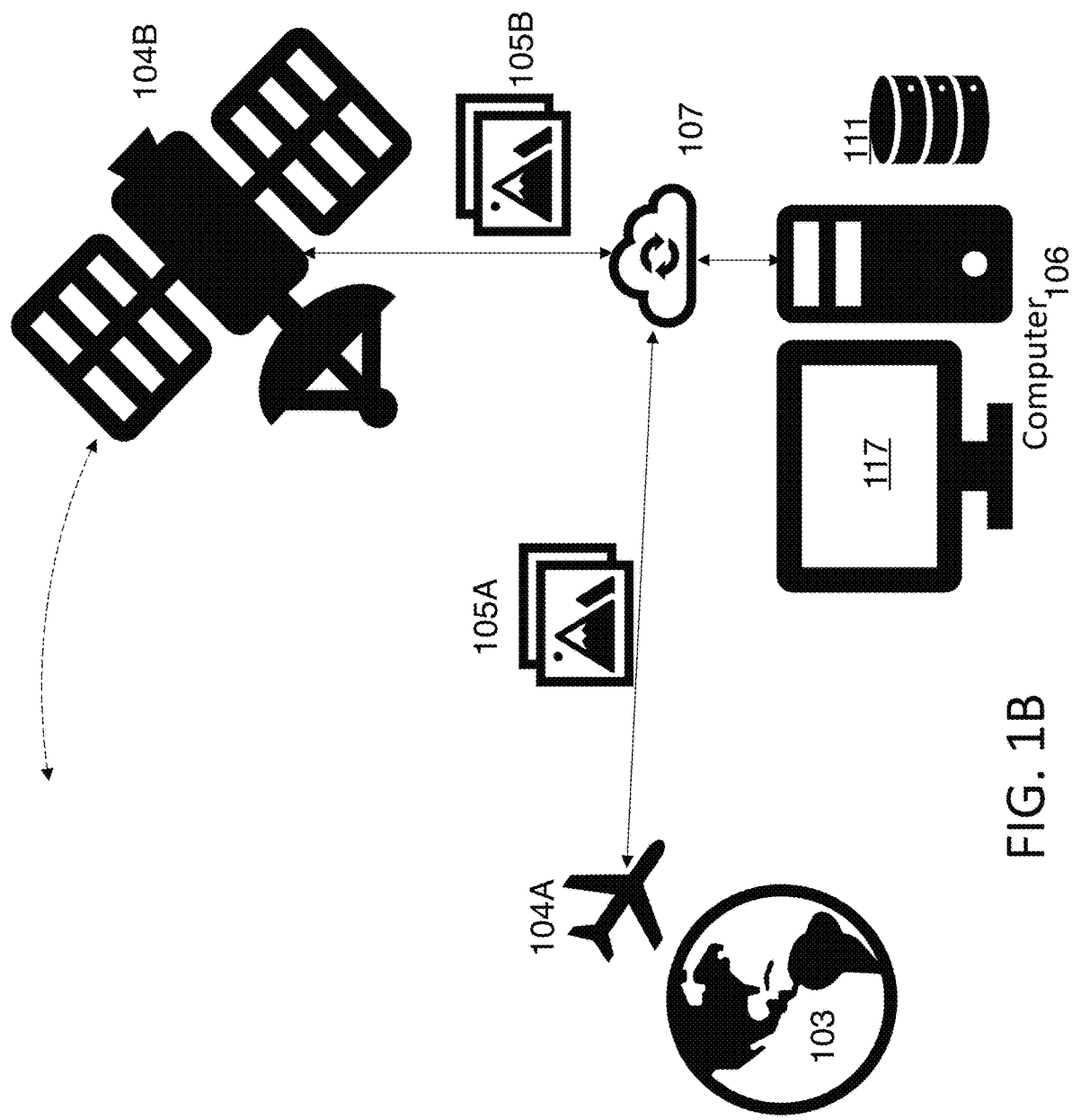
FIG. 1B is a block diagram of a high-resolution aerial system and a high-resolution satellite system in communication with a computer system with a high image storage and analysis database.

Referring now to FIGS. 1A-1B, high-resolution digital images can be captured in various ways. In FIG. 1A, for example, it is desirable to digitally image a physical object 101 (e.g., a tissue sample) at a high-resolution using a high-resolution microscopy/spectroscopy device 104 in communication with a computer system 106 with a database 110. The physical object 101 can be a tissue sample placed on a slide 102 and inserted into a slide scanner (e.g., ZEISS Axioscan 7) 104, illuminated with a light source (LED, laser, etc.) and then digitally scanned or photographed by optics and a low noise high-resolution camera sensor. The optics can be used to magnify portions of the physical object 101. The field of view of camera sensor can be physically moved through an array of logical tile positions (e.g., 20×30 tiles-see FIG. 3C) of the slide and take/capture scans/images of each tile that can be digitally stitched together to form the overall high-resolution image of the slide and the physical object thereon. In other cases, lines across the slide can be scanned and digitally stitched together to form the overall high-resolution image of the slide and the physical object thereon. Regardless, a high-resolution image 105 of the slide and the physical object can be transferred to the database 111 of the computer system 106 for further viewing and analysis. In some cases, the computer system 106 controls the high-resolution microscopy device 104 to capture the tiles of digital images and stitches them together with software to form the overall image.

The computer system 106 is in communication with a display device 117 to display a graphical user interface to display the high-resolution image and detect objects therein, zoom in and out on details of the high-resolution image and objects, and perform analysis to obtain differing measurements of objects (e.g., width, length, depth), differing measurements between the same objects (e.g., distance between normal cells—density), and different objects (e.g., distance from normal cell to tumor cell) in the high-resolution image. The computer system 106 can allow remote access of high-resolution image in the database 111 over a computer network 107 to another remote computer system executing the graphical user interface.

In FIG. 1B, for example, high-resolution digital images can be captured in other ways. High-resolution digital arial photographs 105A can be captured by sensors and/or cameras in an airplane or drone 104A flying at various altitudes over the earth 103. High-resolution digital satellite images 105B can be captured by sensors and/or cameras of a satellite 104B in an orbit or stationary position over the earth 103. In either case, the high-resolution images can be transferred to a data store 111 of a computer system 106 with a display device 117 and user input devices for further viewing and analysis.

Figure 1C:
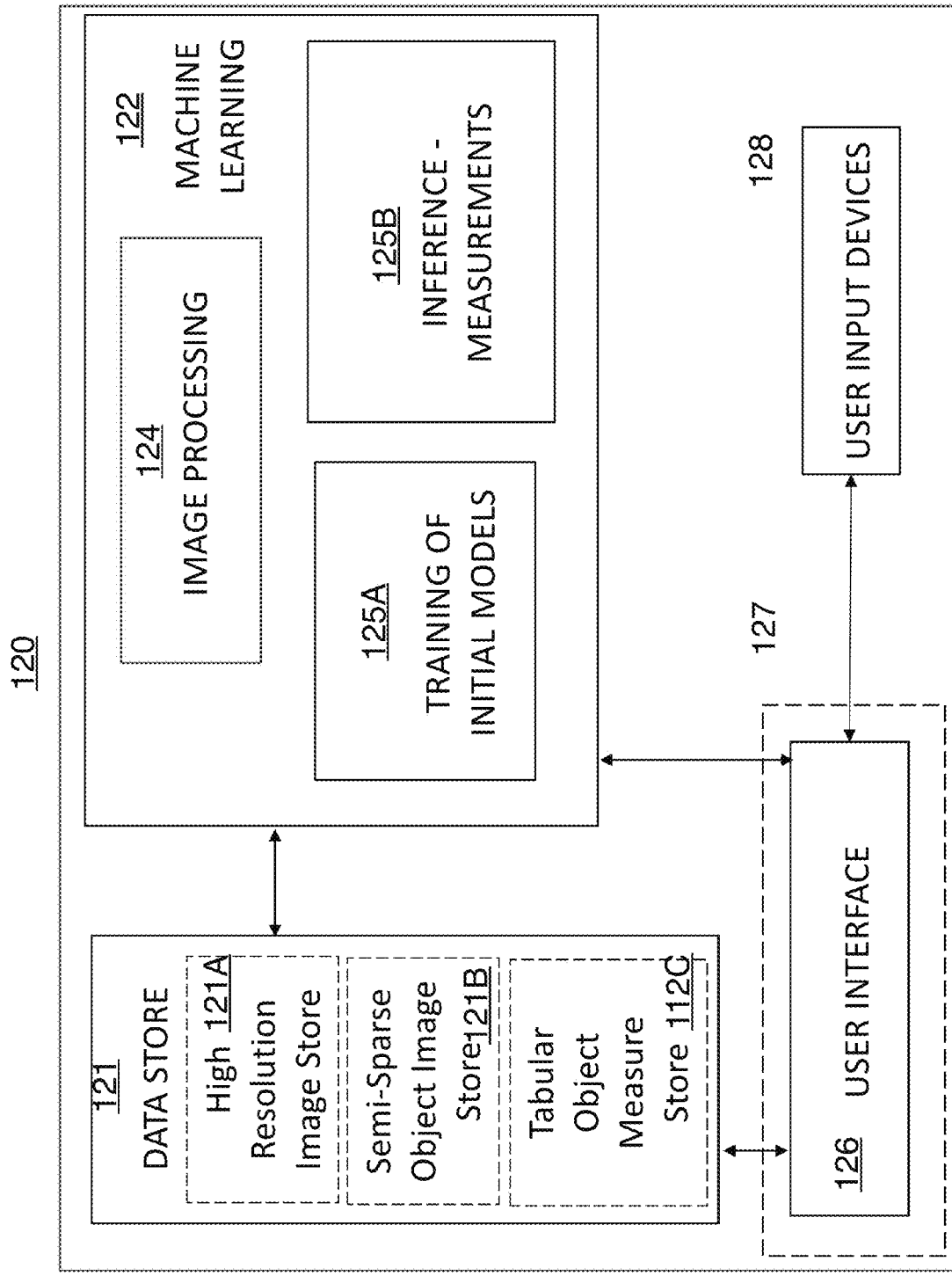
FIG. 1C is a block diagram of an image storage and analysis system with machine learning for measurement generation.

Referring now to FIG. 1C, a block diagram of an embodiment of a high-resolution image analysis and viewing system 120 is shown. The high-resolution image analysis and viewing system 120 includes a data store 121, includes a machine learning system 122 and a graphical user interface (high-resolution block-based viewer) 126 coupled in communication together. The machine learning system 122 includes an image processing subsystem 124, and machine learning models and algorithms 125A-125B that can be trained and used for image analysis. The GUI 126 can be displayed on a display device 117. The system can further include one or more user input devices 118 (e.g., mouse pointing device, mouse buttons, keyboard) coupled in communication with the GUI 116 displayed on the display device 117 for user interaction.

The image processing system 112 reads a high-resolution image of gigabytes, terabytes, or more stored in a data store 111 of one or more storage devices. The image processing system 112 and machine learning system analyzes the images for various types of objects therein. The machine learning system can be supervised in that a model 115A can be initially trained with a few tagged objects and then recognize and classify the same type of objects throughout the high-resolution images. Feature vectors can be generated and used to further train the machine learning model 115A to recognize/detect objects. The machine learning model 115A trains a classifier that is used to classify objects. A further machine learning model 115B is used to obtain inferences or measurements associated with the objects. Simple pixel definitions of the objects can be made by the image processing system 124 and associated in a multi-dimensional space with the high-resolution images based on image or spatial coordinates.

The high-resolution images can be displayed by the graphical user interface 126 fused together with one or more layers of objects overlaid onto the high-resolution image. Alternatively, one or more layers of objects can be displayed spatially together without the underlying high-resolution image from which the objects were detected. In addition, the graphical user interface 126 provides menus of the objects and various measurements that can selected by user input devices 128 for selective measurements to be displayed on the display device 127 of the computer system.

User Interface

Figure 9A:
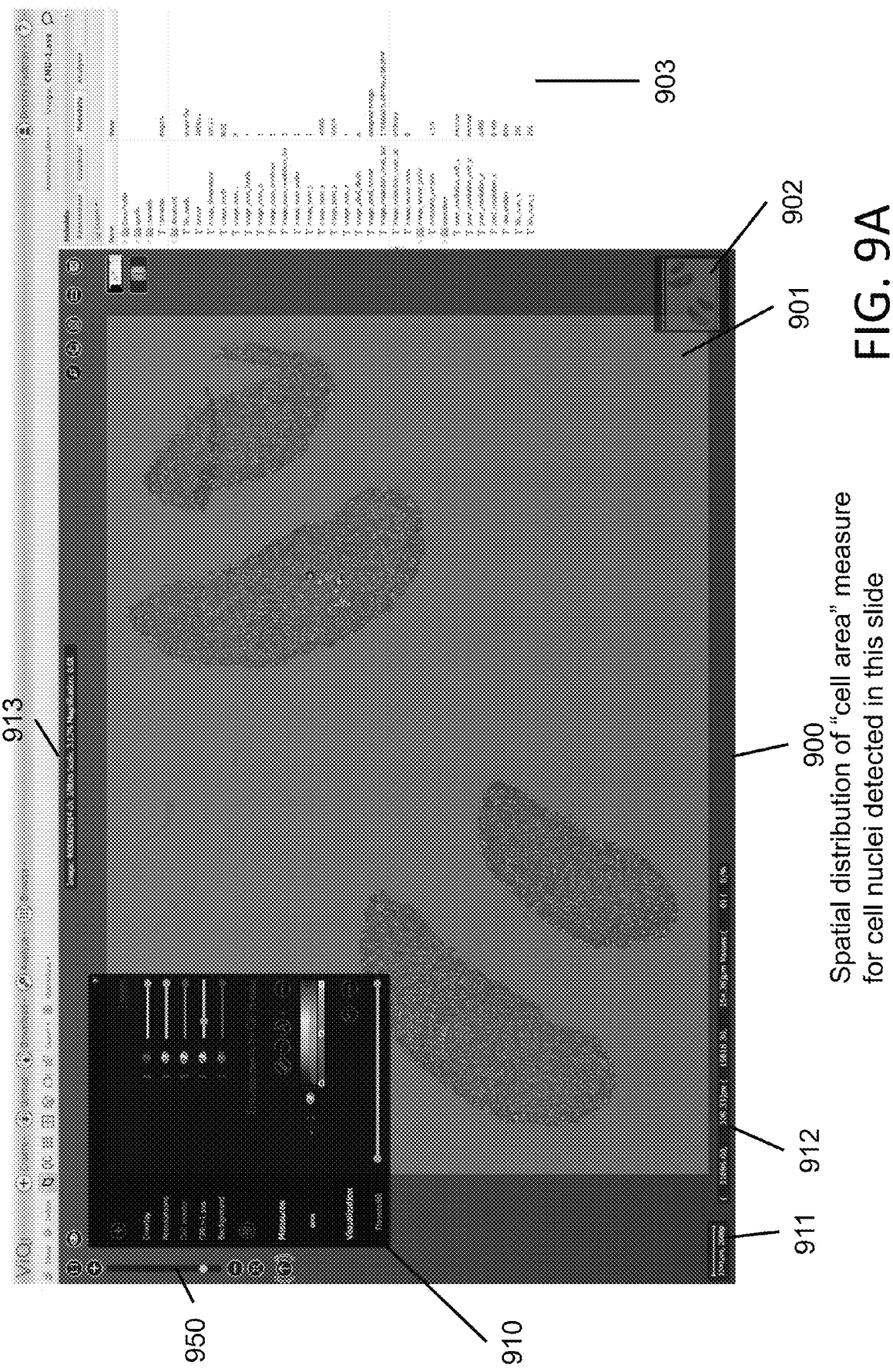

FIGS. 9A-9H illustrate views of a context based graphical user interface (GUI) 900 of the viewer/analysis tool. In FIG. 9A, the GUI 900 includes a viewer window 901, a thumbnail window 902, and an information side panel 903. The viewer window 901 displays the high-resolution image at the user selected scale/magnification. The thumbnail window 902 displays an overview of the overall image. The information side panel 903 has one or more selectable tabs to display information, such as metadata, analysis, graphical, and annotation information, about the high-resolution image. The GUI 900 further includes one or more information bars 911-913 around the periphery of the viewer window. The GUI 900 further includes a selection window (box) 910 that is overlaid on top of the viewer window 901 near the upper left corner. The selection window (box) 910 is contextual based on which one of a plurality of buttons is selected to be shown, such as the Overlay button, the Annotations button, the Cell masks button, the CMU-1.sys button, or the Background button that are associated with the layers of information being displayed in the viewer window. The GUI 900 further includes a plurality of magnification and zoom controls 950.

In FIG. 9B, a magnified view of an image information bar 913 of the GUI 900 is shown. It provides pixel dimension information (e.g., 46000×32914), channel information (e.g., channel (ch): 3), bit depth information (e.g., 8 bits), scale information (e.g., 25%), and magnification information (e.g., 5%). In FIG. 9C, a magnified view of a scale bar 911 and a magnified view of a mouse information bar 912 are shown. The scale bar 911 illustrates a line with its length in dimensions of meters (microns) and pixels (e.g., 180 μm, 360px). The mouse information bar 912 provides information regarding the position (pixel position and microns from a zero point) of the mouse pointer (cursor) associated with the mouse. If over an object, the mouse information bar 912 further includes a value of the measure an object under the mouse pointer (cursor). For example, the measure can be the confidence of detection of an object that can be indicated in a normalized value between 0 to 1 and/or as a percentage.

In FIG. 9D, a magnified view of the selection window (box) 910A is shown in context with the Cell masks button being selected. The selection window (box) 910A includes a measurement pull down menu 960 for the selected measure that is desired to be displayed, such as object detection confidence or object area for example. The selection window 910 further includes a log histogram or distribution slider 961 for the selected measure. The selection window 910 further includes a plurality of controls (sliders and eye buttons) 957 respectively for the different types of layers (e.g., Overlay, Annotations, Cell masks, CMU-1.svs, and Background) that are displayed in the viewer window. The slider for each layer changes a variable opacity so that other layers can be visible or not underneath. The eye button for each selects whether or not a layer is displayed in the viewer window or hidden from view in the viewer window.

As an enhancement for Cell masking, the log histogram or distribution slider 961 of the selected measure—for example the area of the object—is a distribution between maximum and minimum values of the measure. The range between maximum and minimum values are respectively mapped to a look up table (LUT) of colors to be shown in the viewer window 901. The different colors and shades visually indicate the measure associated with the imaged objects in the viewer window. The LUT can be changed to alter the color spectrum used to color the measure associated with the imaged objects. Left and right sliders in the distribution slider 961 select the range of the measures to be shown on the screen and the mapping of colors to them. For example, the left slider selects the lower value of the measure that the left most color (e.g., blue) is assigned. The right slider selects the upper value of the measure that the right most color (e.g., red) is assigned. The center slider is a gamma correction slider. The numeric value adjacent the slider 961 indicates the value of the measure that is under the mouse pointer (cursor) generated by the mouse user input in the viewer window.

The measurement pull down menu 960 allows the user to select various measurements of the objects in the field of view of the viewer window. The histogram slider 962 with an upper slider allows the user to set an upper threshold and with a lower slider allows the user to set a lower threshold for the selected measurement to be displayed in the viewer window.

For example, spatial distribution of a "cell area" measure for the cell nuclei objects detected in the digital image of tissue can be selected by the measurement pull down menu 960 and displayed in the viewer window 901 as shown in FIG. 9A. Cell nuclei objects with smallest measures of cell area may be colored red for example. Cell nuclei objects with largest measures of cell area may be colored blue for example. Cell nuclei objects with measures of cell area between may be mapped to other shades of color between the color red and the color blue.

Figure 10:
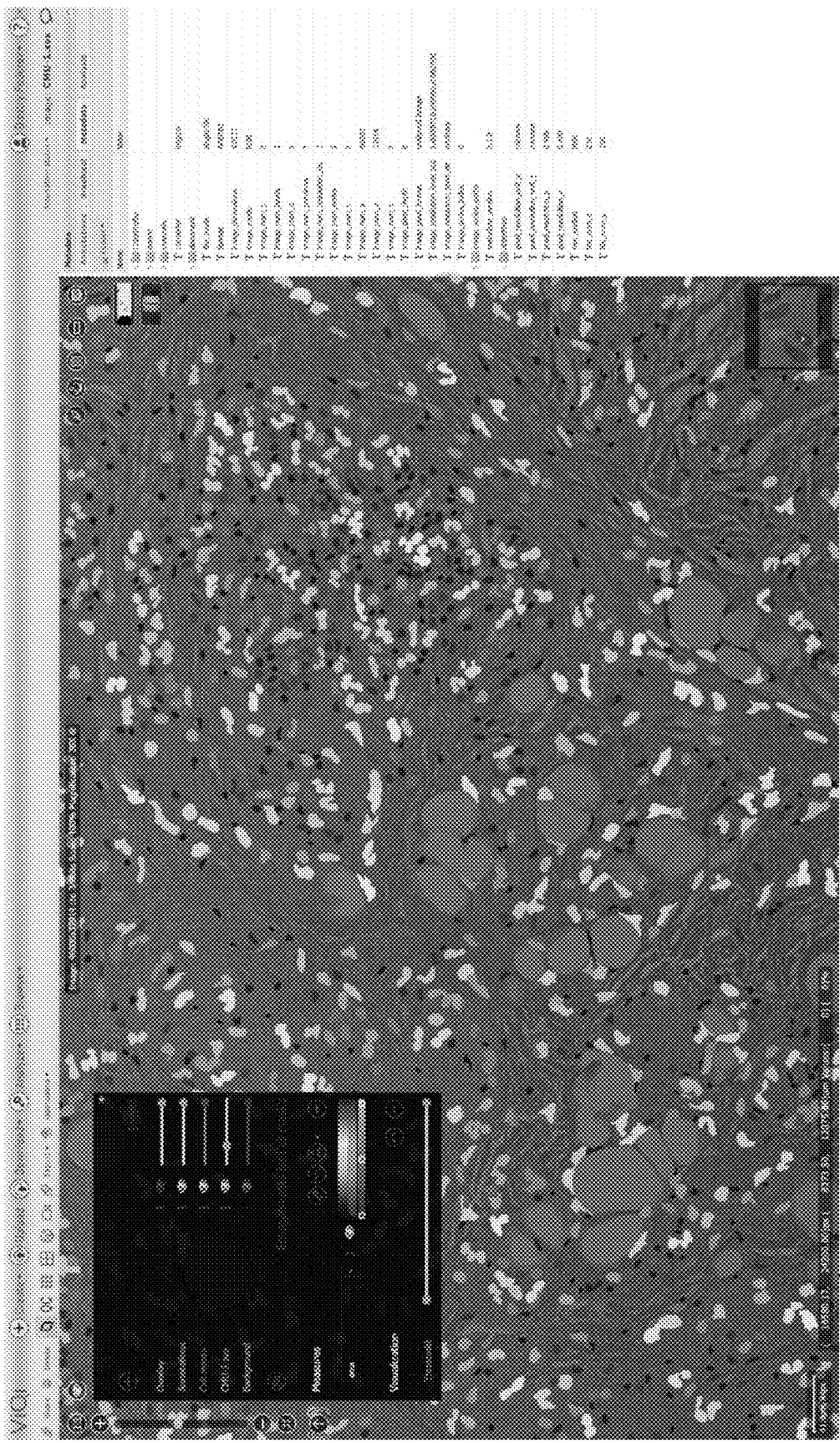
FIG. 10 illustrates the viewer window of the GUI illustrating a field of view of the high-resolution image with a one hundred percent (100%) scale (1× magnification) and one hundred percent (100%) resolution of the imaged objects overlaid onto the underlying image.

The GUI 900 of the viewer/analysis tool includes the plurality of magnification and zoom controls 950 that allow for rapid zooming in and out (different resolutions and equivalent objective magnification and different) on the digital image to show different scales of the objects and underlying digital image. For example, FIG. 9A illustrates a digital zoom of 3.13% scale of resolution at an equivalent objective magnification of 0.6×. FIG. 10 illustrates a scale of magnification at 100% resolution in the view window 1000 of the tissue shown in FIG. 9A. Small objects in the digital image are more readily visible in FIG. 10 at the scale of magnification at 100% resolution.

In FIG. 9D, the plurality of magnification and zoom controls 950 are better shown adjacent the selection window (box) 910A. The plurality of magnification and zoom controls 950 can include one or more of a digital zoom slider 951, a positive digital zoom button 952, a negative digital zoom button 953, a lowest resolution (view/pan out) button, a highest resolution button 955, and a rotate button 956. The field of view defined by the viewer window 901 reads in the image tiles of the high-resolution image and the imaged objects within the logical blocks defined by the viewer window and the level of zoom. The level of digital zoom of the high-resolution image shown in viewer window 901 is selected by the digital zoom slider 951 or buttons 952,953 adjacent the selection box window 910. Based on the level of digital zoom selected by the user, the appropriate pyramidic magnification of objects and images is shown in the view window.

Figure 9E:
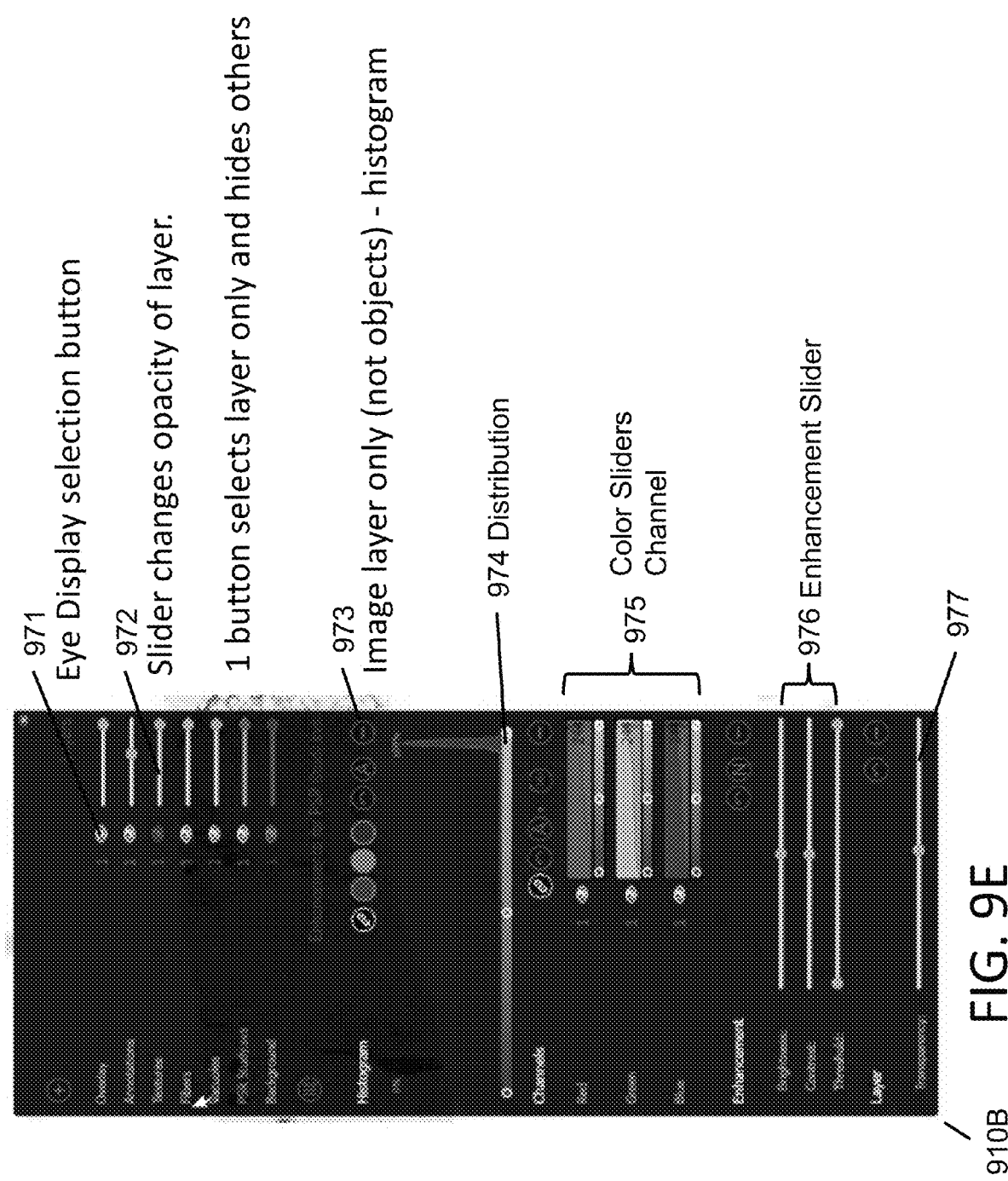

In FIG. 9E, a magnified view of the selection window (box) 910B is shown in context with the PSR study button being selected. The selection window (box) 910B includes a number of the GUI features of the selection window (box) 910A described herein. The selection window (box) 910B further includes a histogram chart 974 for the image layer between 0 percent and 100 percent. In the case shown, the histogram chart indicates a narrow normal curve with a peak near 100 percent. The selection window (box) 910B further includes a histogram control buttons 973 for setting up the histogram chart 974. Multiple channels can be displayed on the histogram associated with multiple layers. For example, three colors (e.g., red, green, blue) can be associated with three channels of a layer. The selection window (box) 910B further includes color channel sliders 975 to control how the channels are displayed on the histogram chart 974. The selection window (box) 910B further includes image enhancement sliders 976 to control brightness and contrast of the histogram chart 974 and the threshold of max/min values to be considered for including in the histogram chart 974. The selection window (box) 910B further includes a layer transparency enhancement slider 977 to control the transparency of the selected layer.

In FIG. 9F, a magnified view of the selection window (box) 910C is shown in context with the Fibers button being selected. The selection window (box) 910C includes a number of the GUI features of the selection window (box) 910A described herein. The selection window (box) 910C further includes visualization enhancements for the different layers and different objects on the same layers. For example, the Fiber layer can be assigned the color blue while the Textures layer can be assigned green by selecting a slider rail 978. Regarding different colors of objects on a layer, a button 979 can be selected and a color assigned to that object to enhance visualization of objects in the viewer window. For example, a button for Fine collagen objects on a layer can be assigned the color yellow while a button for Assembled collagen objects on the layer can be assigned to the color red.

In FIG. 9G, a magnified view of a measures pull down menu 920 is shown overlaid on the selection window (box) 910C and the viewer window. The measures pull down menu 920 show the various measures that are selectable for the select layer, such as Fibers, that can be displayed by the analysis system. For example, object ID, ROI ID, class labels, confidence level of fine collagen, confidence level of assembled collagen, class value, confidence level of object detection, area, F2A, perimeter, density, A2P, CRI, FCI, or other type of measures related to the objects on the selected layer that are detected in the image.

In FIG. 9H, a magnified view of an object color selection window 908 is shown adjacent the selection window (box) 910C and overlaid on the viewer window when pressing the button 979. The object color selection window 908 includes predefined color buttons 981 that can be chosen or a color palette window 982 that can be used to select the object color with a mouse (cursor) pointer.

Methods

Figure 2A:
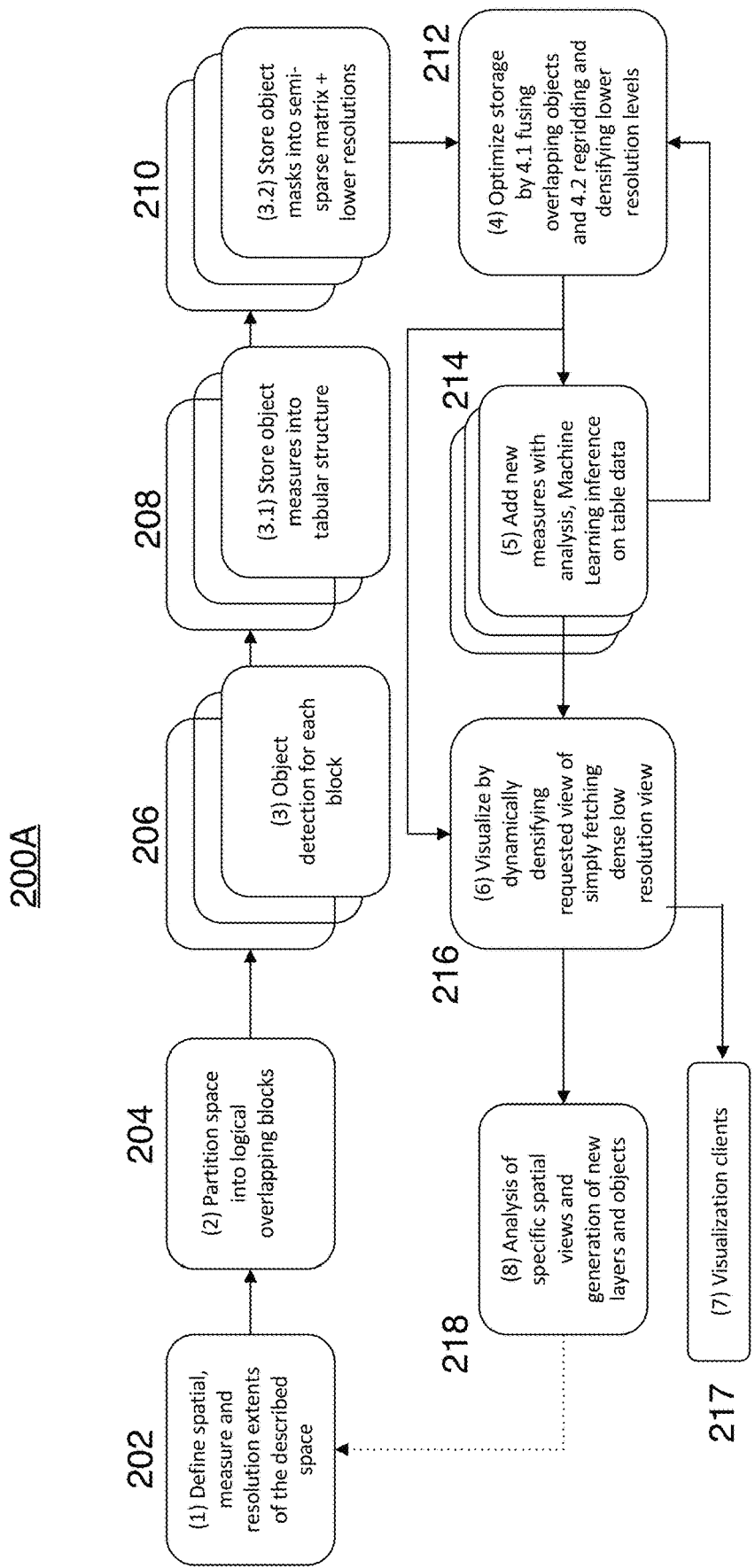
FIG. 2A is a block diagram flow chart of a method for high-resolution image storage and analysis.

Referring now to FIG. 2A, a method is disclosed for efficient analysis, description, storage and visualization of large multidimensional digital images. The method further includes detecting sparse (one or two objects), semi-sparse (millions of objects), and/or dense (image equivalent) objects by various analysis methods and algorithms. The method can perform various machine learning based analysis workflows for images from whole tissue microscopy, light-sheet microscopy, large-scale electron microscope microscopy, spectroscopy, remote sensing satellite and aerial imagery.

Particular workflows that can be used with this method are those where many objects (millions) are detected and described with many (tens-hundreds) measures. A subset of the detected objects in one or more images can be manually labeled and used to train a machine learning model. Such a machine learning model can be used to subsequently predict new measures for all of the objects in the selected image and other images. Once measures are computed/predicted, they can be visualized spatially over the high-resolution image with the object data. At the same time, the measurements can be visualized in their respective measure space using plotting and/or dimensionality reduction techniques. Spatial-context information and measure-space information can be used to infer specific relationships, phenotypes/classes of these objects. With this information, statistical comparisons of different conditions can be observed in areas of the image.

The disclosed method is fast and efficient balancing the storage and computational resources needed to enable fast machine learning workflows while at the same time providing fast visualization workflows. Previously, visualization of detected objects was typically achieved by creating new dense images (stored as tiled spatial pyramids) where objects are rendered directly using a color representing one specific measure. Previously, additional measures within an image required creation of new dense images, which is very expensive in terms of storage and computational requirements. The dense nature of standard image representation makes it difficult to update and extend representations, such as with zooming in and out on the image, for example. Even more complicated with the dense nature of standard image representation is to perform machine learning (ML) inferences on objects burned into dense pixel data when several measure values are needed to predict a new measure. Furthermore, using a separate and disconnected tabular data structure for optimal machine learning inferences, makes visualization of its results an expensive process of re-generation of such dense images.

The disclosed method builds upon an observation that depending on the scale, representation of the same objects can be sparse (at very high magnification), semi-sparse (at middle magnifications) or completely dense at very low resolution. The representation of sparse objects and semi-sparse objects is a tabular database storage. The typical dense storage of dense objects is a multi-dimensional matrix store. The system enables workflows producing and accessing objects at any scale by implementing both tabular database storage and multi-dimensional matrix store of objects with a mechanism to switch from one to another based on the desired visible scale (zoom) of resolution/magnification.

Some amount of processing is used to densify a data view from sparse storage that can be performed in real time if the requested extent is not overly large. If access to sparse storage of objects can happen in a distributed fashion, then larger extents can be computed in real time using parallel and distributed processing.

The functional processes in the disclosed method connects storage of measure information and spatial object information together in the tabular database storage. The functional processes further define when an efficient sparse storage is used for object information/display and when a dense representation of object information is used for information/display in order to balance storage and computational resource utilization and efficiently enable all parts of a workflow.

Figure 2B:
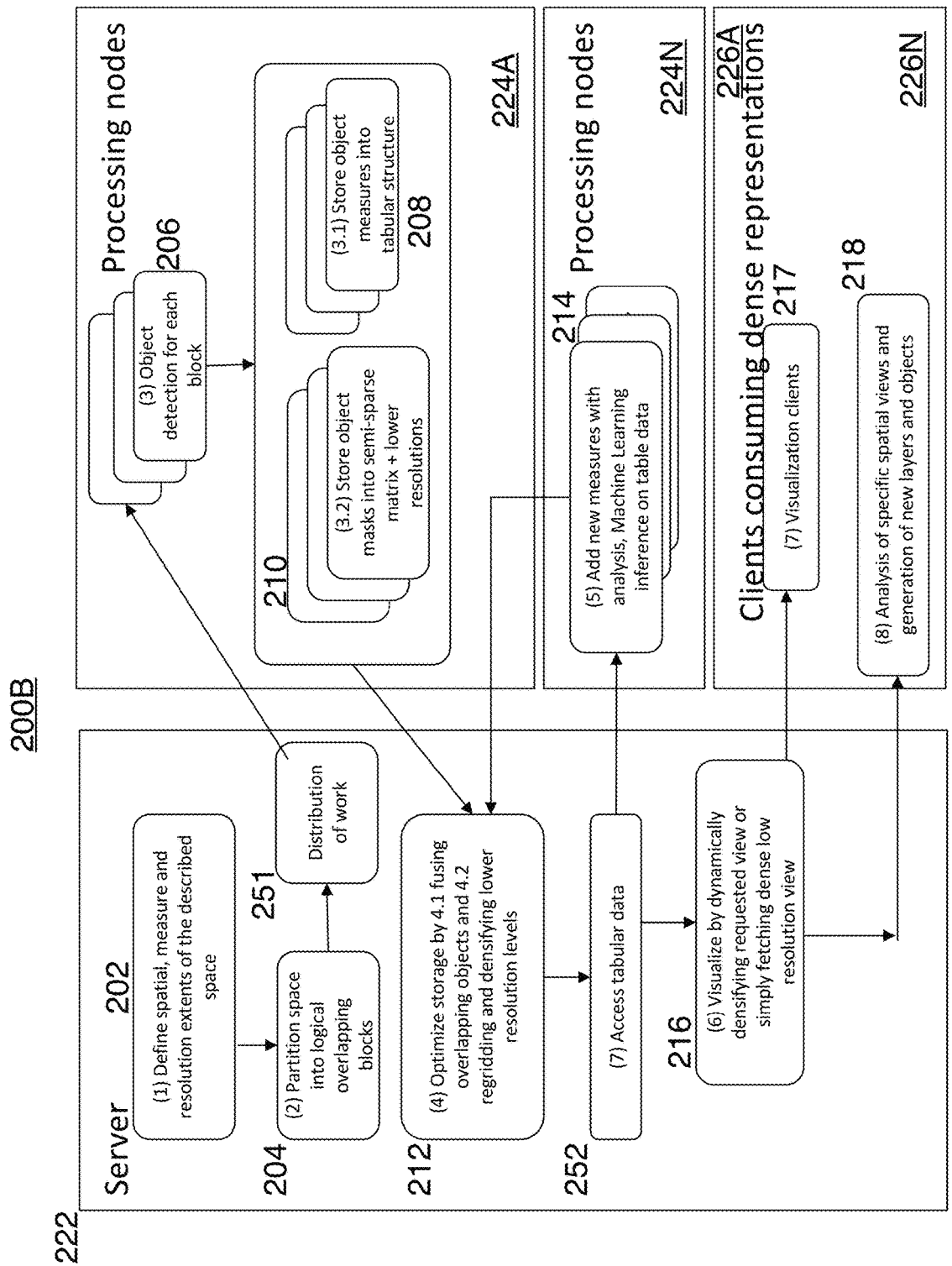
FIG. 2B is a block diagram flow chart of a distributed method for high-resolution image storage and analysis.

FIG. 2A illustrates the overall method 200A for image analysis and image storage with resultant measures that can be executed by one or more computers. FIG. 2B illustrates a method 200B that distributes the functionality performed in the method 200A across one or more servers 222, one or more processing nodes 224A-224N, and one or more client computers 226A-226N. Each client computer 226A-226N can have a visualization client 228 that can be used to visualize and analyze the high-resolution image. The visualization client 228 is provided by a graphical user interface (GUI) display in a pixel screen of a display device.

Space Definition

At step 202 in FIGS. 2A-2B, the process begins by describing the resulting spatial and measure extents based on the input image spatial extent (multi-dimensional: X,Y,Z, time, etc. . . . ) and a predefined set of descriptive measures that can be computed for the detected objects (area, eccentricity, mean intensity, etc. . . . ) in the high-resolution digital image. The original extents can be read from the metadata of the high-resolution image. The original saved resolutions of the high-resolution image (e.g., 100% and thumbnail), can be read from the metadata. Both extents can be modified subsequently by a different process.

The spatial extent is represented with data variants at different scales of magnification and resolution. The different scales (e.g., 100%, 50%, 25%, 10%, 5%) can be selected in step 202 or predetermined by an algorithm based on the levels of zoom selected by a user. The different scales of representation of the high-resolution image can be referred to as a spatial pyramid. A common spatial pyramid is based on the power of two scales (e.g., 50%, 25%) other than 100%.

Figure 5:
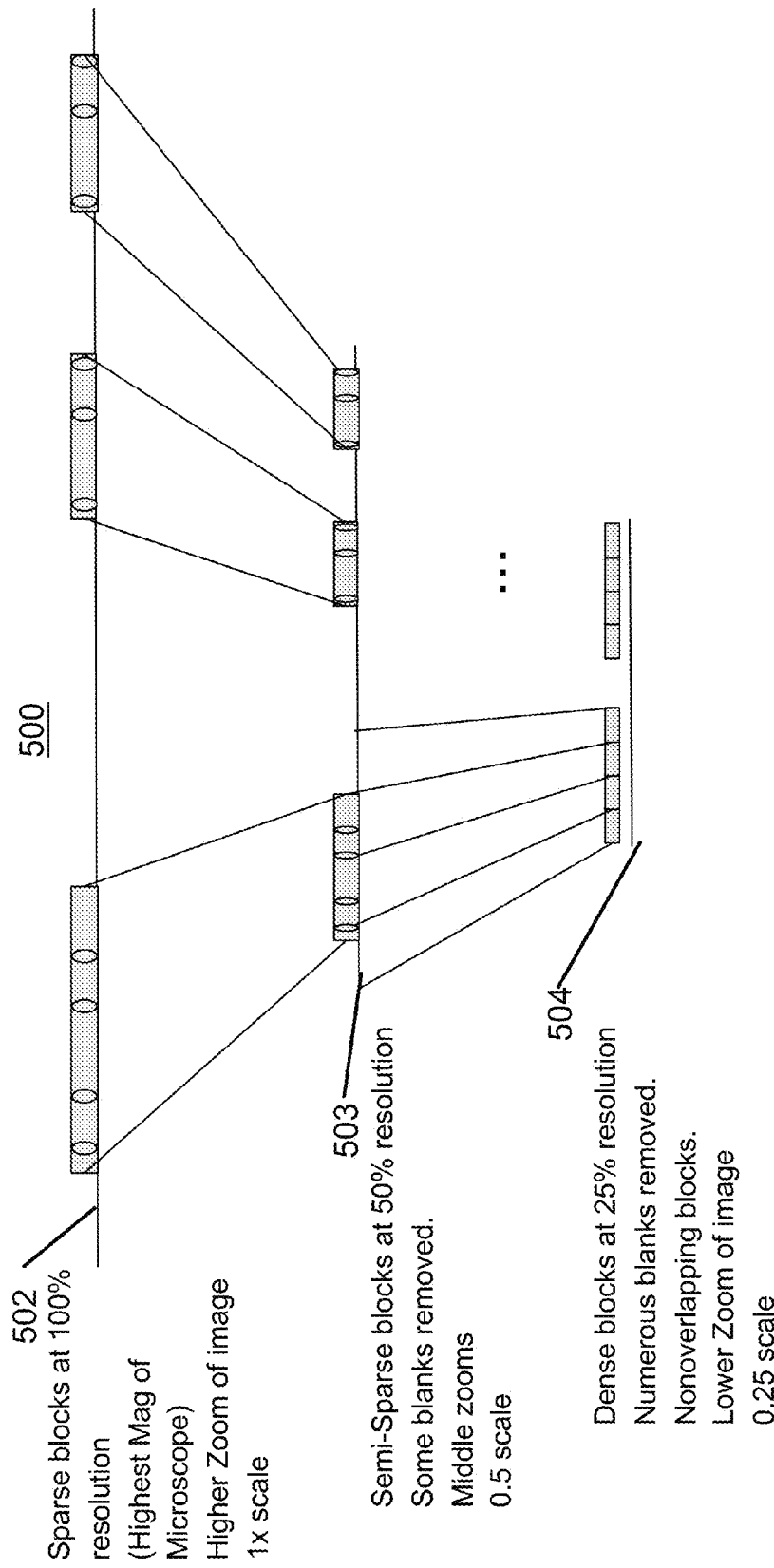
FIG. 5 is a block diagram of a resolution pyramid with multiple resolutions/scales for a high-resolution image and each logical block.

FIG. 5 illustrates a view of a pyramidal scale 500 of multiple resolutions stored for each logical block. The example shown in FIG. 5 illustrates three different scales of resolution, including a 100% (1×) scale 502 associated with 100% resolution at level zero, 50% (0.5×) scale 503 associated with a 50% resolution at level one, and a 25% (0.25×) scale 504 associated with a 25% resolution of the image at level two. Further levels, scales, and resolutions can be used but are predetermined or preselected before analysis of the high-resolution image(s). The highest and higher resolutions (typically above 25% scale) of images are represented and stored using sparse or semi-sparse storage. Lower resolutions (typically less than or equal to 25% scale) of images are represented and stored using dense storage. While only three different levels/scales of resolution and storage are shown for a logical block, additional levels/scales of resolution may be used with an associated image storage type.

2) Division of Space into Logical Blocks

Figure 3A:
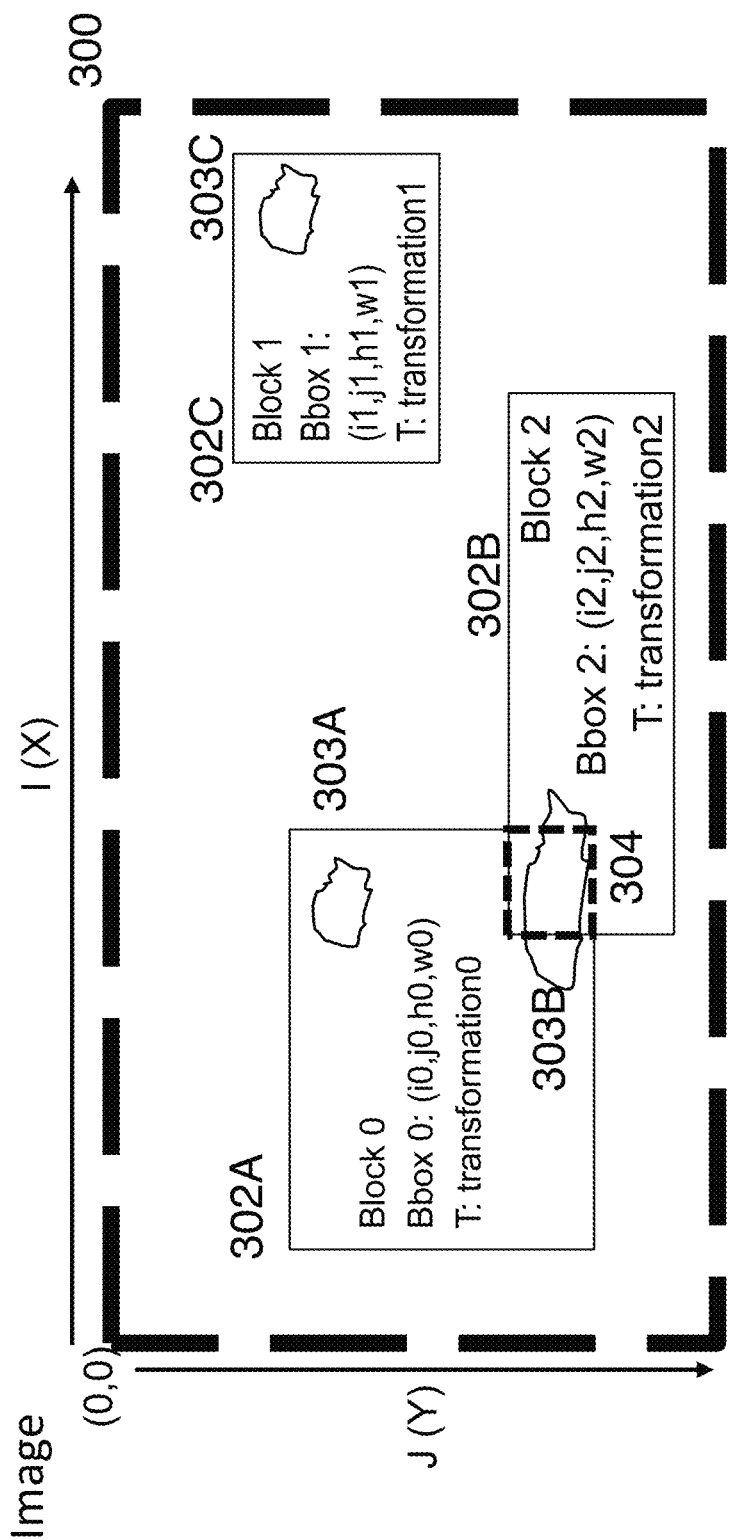
FIG. 3A is a block diagram of overlapping and non-overlapping blocks in a high-resolution image.
Figure 3B:
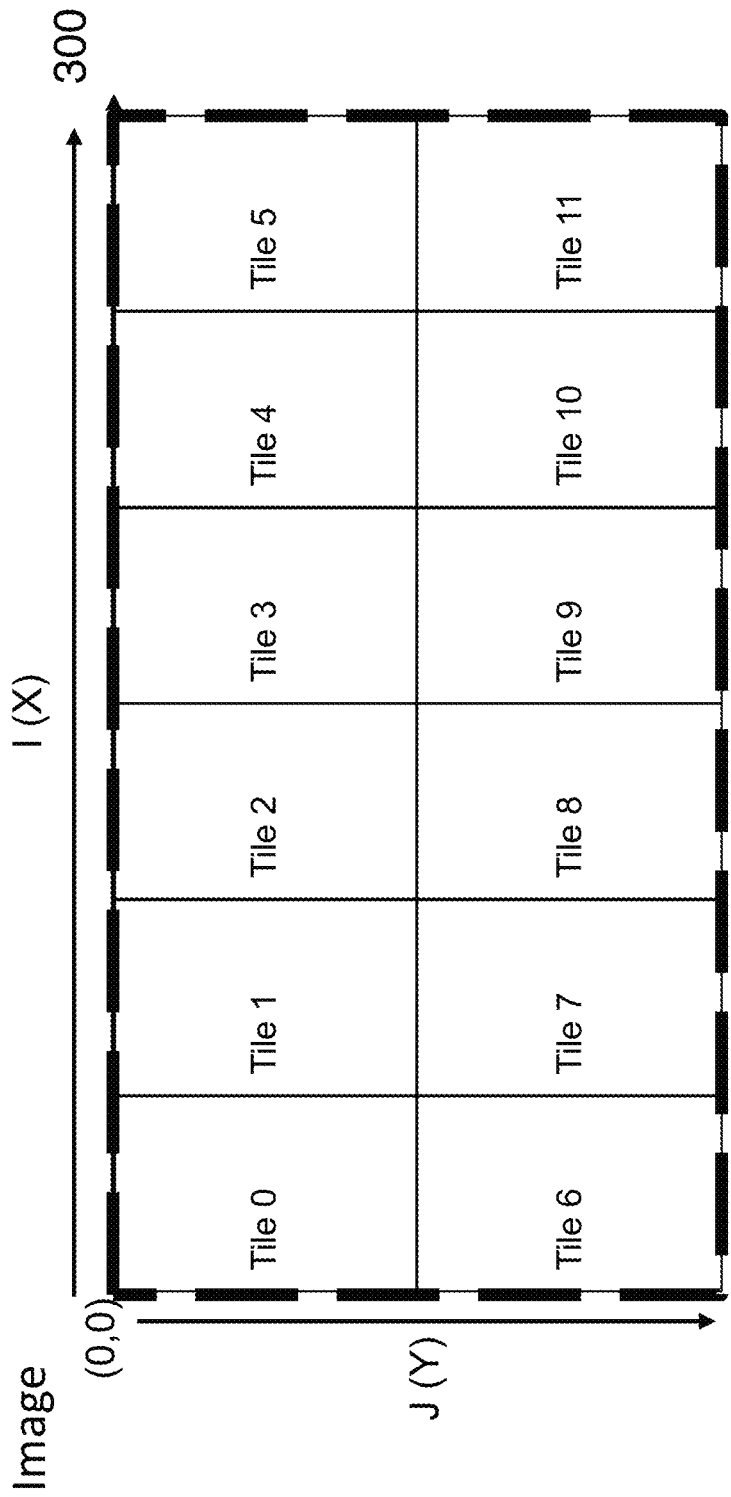
FIG. 3B is a block diagram of non-overlapping tiles in a high-resolution image.

Referring now to FIG. 3A, the image space of the high-resolution digital image 300 is often large. The high-resolution digital image 300 itself is often captured by using a plurality of non-overlapping tiles (e.g., tiles 0-11) such as shown by FIG. 3B. The high-resolution digital image 300 defines how the plurality of non-overlapping tiles are stitched together to define the overall high-resolution digital image 300. One or more of the plurality of non-overlapping tiles can be viewed in a viewer window. One or more lower resolutions of the plurality of non-overlapping tiles can be stored with the high-resolution digital image 300, such as a thumbnail image, to speed viewing of the overall high-resolution digital image 300. Non-overlapping tiles are not conducive to recognizing or detecting objects in an image that can be located near the border of tiles and/or that can cross over between a plurality of tiles.

Accordingly, at step 204 shown in FIG. 2A, the high-resolution digital image is subdivided into a plurality of rectangular logical blocks, such as logical blocks 302A-303C shown in FIG. 3A, to make detection and recognition of objects feasible. The logical blocks 302A-302C define individual and parallel analysis extents of objects (e.g., objects 303A-303C) therein. Such logical blocks are defined by a bounding box (Bbox) translated in the Euclidean space by a transformation T associated with the image. For example, block 303A (Block 0) is two dimensional and has a bounding box (Bbox 0) defined by the staring upper left corner coordinates i0,j0; height h0; and width w0. Block 303A (Block 0) has a transformation or translation (transformation0) that spatially places the given block within the high-resolution image.

Notice that the logical blocks can have arbitrary sizes, be overlapping or non-overlapping, and be computed and added in any order. For example, blocks 302A and 302C are non-overlapping. However, blocks 302A and 302B overlap each other to better be able to detect and recognize object 303B that extends between them across borders.

The logical blocks leave empty spaces in the overall volume of the digital image to speed analysis and viewing. Between blocks 302A-302C is an empty space or just background, for example, without any objects to be recognized or detected. There are empty spaces between outer edges of the blocks and edges of the high-resolution image 300 as well, that without objects, no block needs to cover.

The spatial extent of the logical blocks is driven by the expected size and quantity of objects. Block 302A has one or more imaged objects 303A-303B to recognize/detect and analyze. The spatial extent can be detected empirically a priori or dynamically via algorithmic image analysis. The simple translational positioning of these logical blocks in the overall image space is intended for the fastest identification of the overlapping blocks within the spatial extent being accessed. The simplicity of this positioning is countered by an arbitrarily complex transformation associated with the internal data of each block transforming it into the predefined bounding box. Such a construct enables a fast description of a very large volume at the same time enabling storage mechanism optimizations of a most optimized mechanism for a specific block and objects located within.

Figure 8:
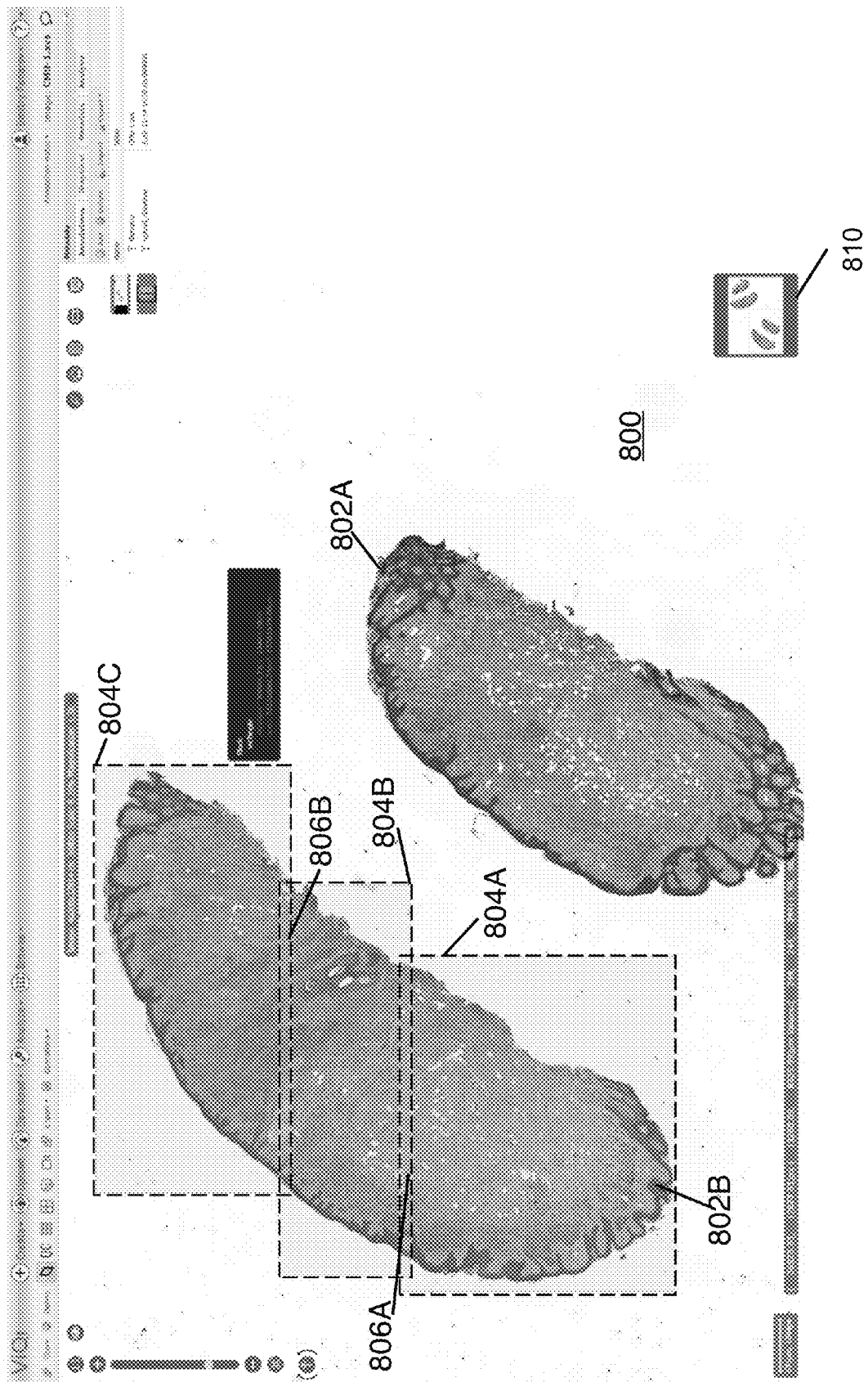
FIG. 8 illustrates an image viewer of a graphical user interface with example imaged objects with logical blocks overlaid thereon.

FIG. 8 illustrates a graphical user interface window with a magnified view of an image 800 of a plurality of tissue samples 802A-802B on a glass slide. The image 800 illustrates the tissue sample 802B with an example of overlapping logical blocks 804A-804C covering the tissue sample 802B. Logical block 804A overlaps logical block 804B over one portion 806A of the tissue sample 802B. Logical block 804B overlaps logical block 804C over another portion 806B of the tissue sample 802B. The underlying high-resolution image in each logical block is analyzed to detect imaged objects therein. The graphical user interface window includes a thumbnail image 810 of an image at a lower level and smaller scale that includes the tissue sample 802A-802B.

3) Identification of Objects

At step 206 of the process shown in FIG. 2A, for each block, imaged objects in each logical block over portions of the high-resolution image are detected. Furthermore, measurements are computed using the image content of the one or more imaged objects within each block. The computed measures are associated with the imaged objects and the logical block. Additional associated measures can be computed within the blocks using the underlying image content therein.

Objects that are completely contained within blocks, such as objects 303A,303C in FIG. 3A, and are not touching the block boundaries (considering half the overlap between the blocks) can be immediately stored into final blocks using two specific mechanisms, tabular storage and semi-sparse storage.

Objects, such as object 303B in FIG. 3A, that are located in an overlapping region 304 are stored into a new temporary block 304' defining overlapping space with the spatial extent defined by the union of objects and overlapping block spatial extents. After the parallel description of the entire volume is completed, the overlapping blocks undergo an object fusion process to describe objects that extend between them. For example, object 303B has a portion in the overlapping space 304, and portions in non-overlapping space in each of blocks 302A-302B. Object 303B is fused together across these blocks and the temporary block. Once an object is fused together, its stored in a new final block with a description of the overlapping space. One or more objects can extend between a plurality of logical blocks. Each of the one or more objects are processed across their respective logical blocks.

Referring now to FIG. 9A, various measurements can be computed from and about the objects and underlying image within each block and displayed in a graphical user interface. For example, spatial distribution of a cell area measure for the cell nuclei objects detected in the digital image 901 of tissue can be computed. In the viewer window 901 and thumbnail 902 of the GUI 900, a spatial distribution of cell area of the cell nuclei objects over the image such as shown in FIG. 9A can be computed.

Figure 6:
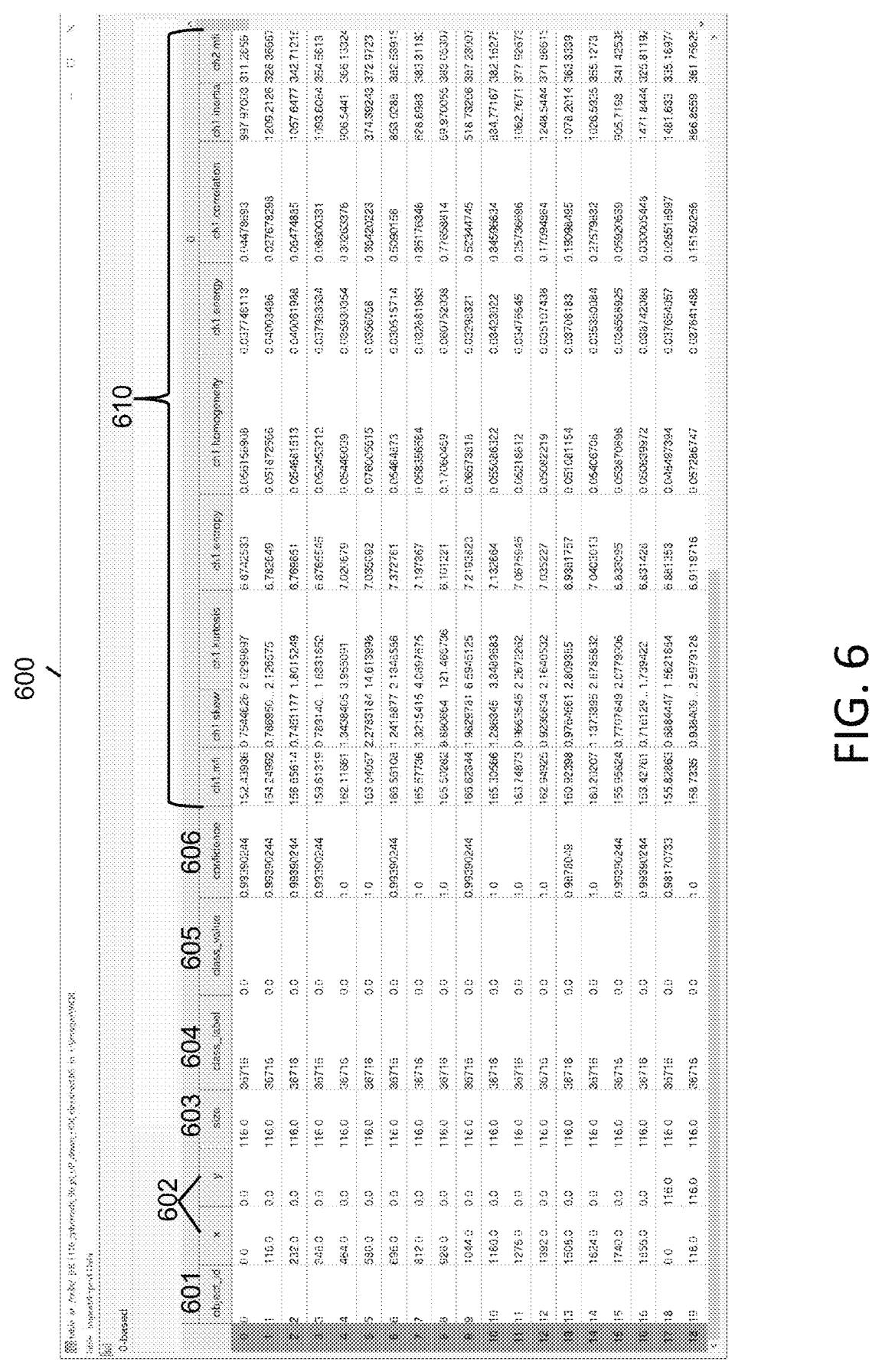
Figure 11:
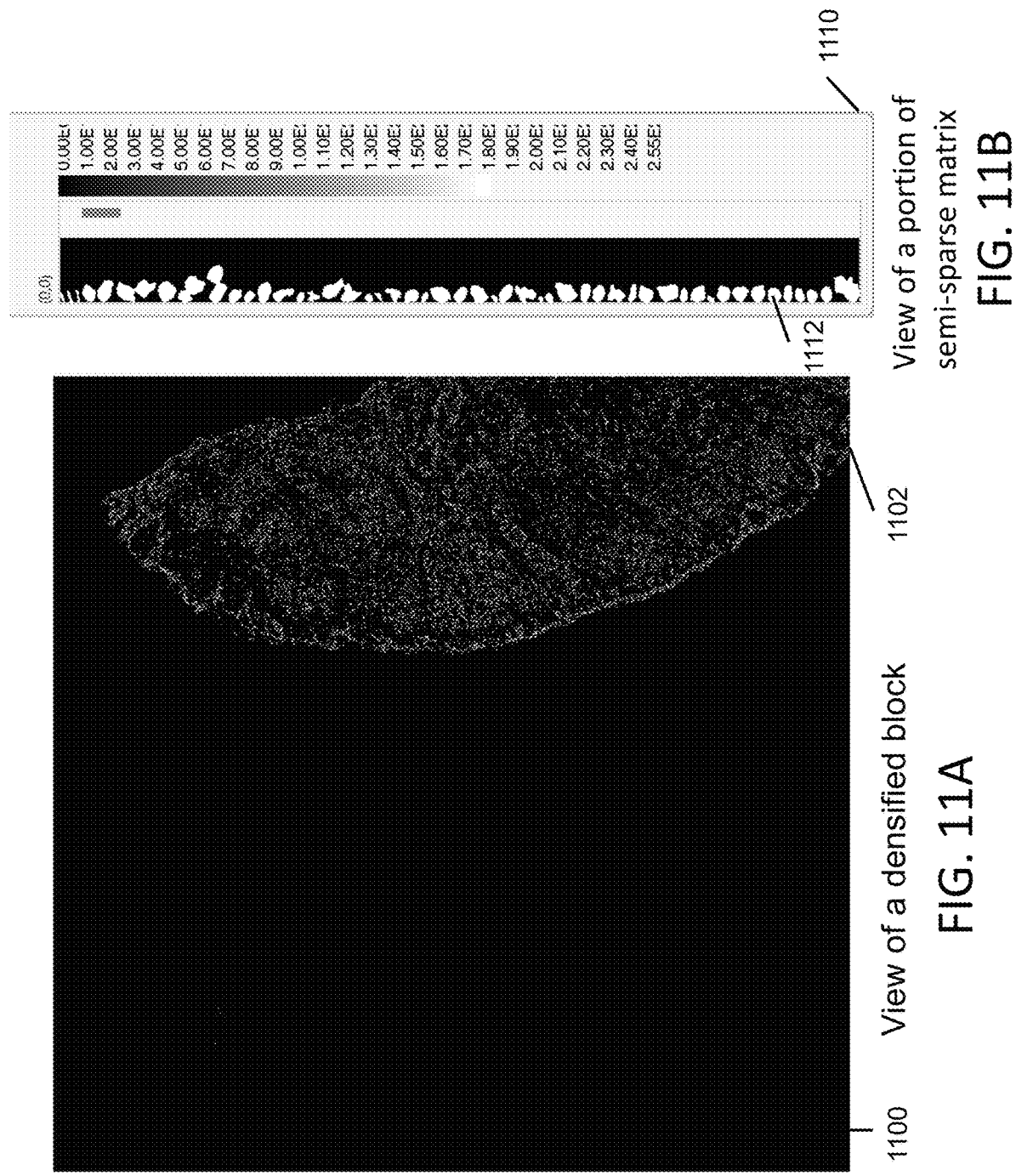
FIG. 11A illustrates a view window of the GUI illustrating a view of a densified block with imaged objects.
FIG. 11B illustrates a view of a portion of a semi-sparse matrix illustrating imaged objects and their underlying pixels associated with a logical block.

As mentioned previously, objects can be stored associated with the logical blocks using tabular storage and semi-sparse storage. Computed object measures are stored using tabular storage. FIG. 6 illustrates an example of a portion of a tabular or table of object measures for objects in a high-resolution image. Spatial data representation of the objects is stored using semi-sparse storage. FIG. 11B illustrates a view of a portion of a semi-sparse matrix 1110. For each object 1112, the object measures and the spatial data representation are linked by a unique object-identifier (object ID). Note that a semi-sparse storage mechanism for semi-sparse objects also supports a storage of sparse objects.

3.1) Tabular Storage of Object Measures

At step 208, for each block, all of the computed object measures are stored as a row into a standard tabular structure (like SQL database, HDF-5 table or a column store) referred to as a measure table. FIG. 6 illustrates an example of a portion of a tabular or table 600 of object measures for objects in a high-resolution image. The table 600 is flexible in that more columns for additional measures can be added and more rows for more detected objects within each block can be added.

For each row of an object in the table, the table 600 can include an object identifier (ID) 601, x and y coordinates 602, object size 603, class label 604, class value 605, and confidence level 606. Each row for an object in the table 600 can further include one or more computed measures 600 made on object or made with the object.

Computed measures are stored with a specifically allocated object-identifier from within a range of identifiers that are allocated for a given block. One way of allocating a range of object identifiers is by using a sequential object number within a block added to a block number multiplied by a large number, such as one million (1M) or ten million (10M) for example, expecting a large number of objects within a block.

The typical measures 610 describe various characteristics of the objects. For example, morphometric characteristics (like area or eccentricity), intensity characteristics (mean intensity, standard deviation of the object's intensity), texture or spatial pattern characteristics, neighborhood characteristics (like density), spatial characteristics (like distances to nearest neighbor of a particular class), as well as various pixel transforms or descriptors optimized by convolutional neural networks and similar machine learning processes.

3.2) Semi-Sparse Storage of Object Spatial Data

At step 210 of the process, for each block, the spatial data (mask or pixel data) of each of the detected objects at one or more resolutions is stored into a separate representation (semi-sparse matrix) that uses the same identifiers of the objects for storing object measures into the measure table. The object identifier is the connecting structure between spatial data in the semi-sparse matrix and the object measures of a given object in the measure table.

A paging semi-sparse matrix of spatial data can used to represent each detected object at one or more levels of resolution. The extent of the matrix is equal to a sum of all object extents on a first dimension and the largest objects extent in all the other dimensions of a multidimensional space. Accordingly, a sequence of objects are stored into a long object matrix, such as shown in FIG. 11B, for example. The semi-sparse matrix can be stored in a chunking fashion (e.g., a plurality of chunks of data) so that a retrieval of one object does not require retrieving the entire matrix for all objects from one or more storage devices. Instead, retrieval of one object only requires retrieval of a small portion of the semi-sparse matrix—one or more chunks of data. Additionally, the chunks of data for the semi-sparse matrix can be stored in a compressed format utilizing a lossless or lossy compression algorithm like deflate, zstandard, or jpegxr. Upon retrieval, the chunks of data can be decompressed and further analyzed and/or displayed on a display device.

Figure 19:
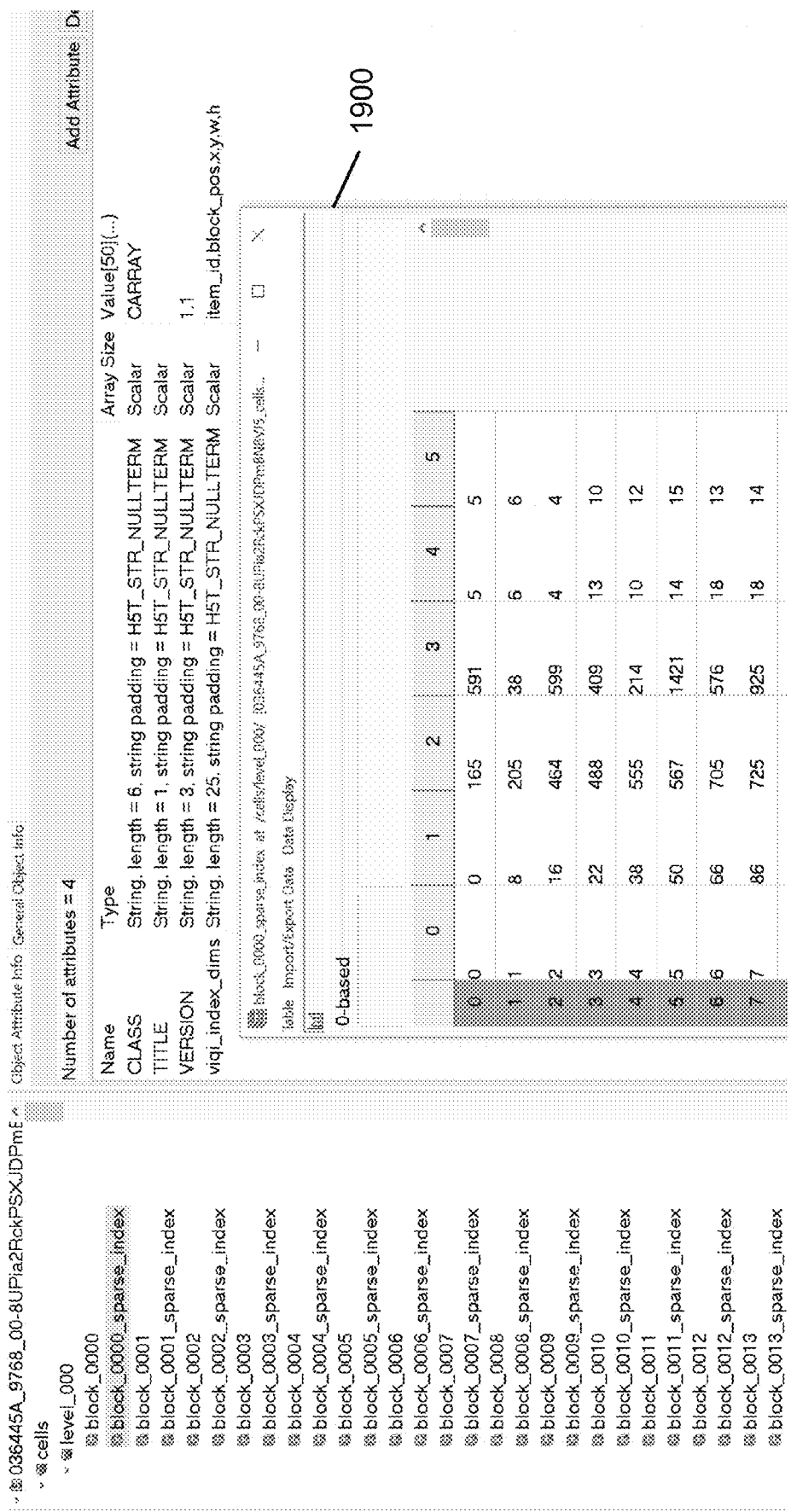
FIG. 19 illustrates a format of storing a portion of the sparse index for the block shown in FIG. 18.

In addition to the semi-sparse matrix, an index table is stored consisting of object id, object's position (in first dimension) in the semi-sparse matrix as well as the object's spatial extent within the block in which the object is placed. FIG. 11B illustrates a view of a portion of a semi-sparse matrix with objects of similar sizes. FIG. 19 illustrates a block sparse index table that includes a mapping between a semi-sparse matrix and object positions in a block. The index table includes columns for object id, object position in the semi-sparse matrix, object position in the block, and object size for the object identified in a row.

Matrix storage of sparse and semi-sparse objects is efficient, if object spatial sizes in a given block are relatively similar. However, if an object is dramatically different in spatial size from other objects in a logical block, then it is less efficient. However, the one oversized object can be stored in a more efficient manner. For example, if an object is ten times (10×) larger than the average object in a given block, (or if an object is simply larger than a fixed threshold), then that object can be stored by itself into a separate new logical block defined for the oversized object. The new logical block with the oversized object can represent only one object or it can represent several similarly sized objects. A set of a plurality of thresholds can also be used, based on a distribution of object sizes (e.g., a statistical mode), thereby creating groups of objects with differing sizes stored into new blocks.

Each block's matrix storage is attached to a specific scale. Objects are typically detected at 100% scale resolution with a block. However, other larger objects can be detected at lower scales of resolution. Once the highest resolution semi-sparse matrix is stored for small objects, several lower-scale blocks can be stored right away by down-sampling semi-sparse matrices and scaling block index tables.

Note that detected objects can be too small, such as 1-2 pixels in object size for example, to be stored and represented by a description and spatial representation in a semi-sparse matrix. For such a block, the storage method and representation switches over to a dense representation and storage mode. For example, FIG. 11A illustrates a view of a densified block 1100 with detected objects 1102 in the tissue having very small sizes. At this resolution scale and field of view, the detected objects 1102 are too small to be efficiently represented by a semi-sparse matrix. Accordingly, the software switches over to use a dense representation of the high-resolution image at lower resolutions when a large field of view of the image (e.g., thumbnail) is desired.

The number of semi-sparse down-sampling levels can be fixed at a predetermined number of levels, such as two to provide a total of three resolution levels (e.g., 100%, 50%, 25%). Alternatively, the number of levels can be optimized dynamically, based on object sizes and the scale (switch resolution scale) at which there is an expectation to switch from a semi-sparse storage mechanism to a dense representation.

With the lower scales of resolution of the blocks formed, storage can be optimized for access and further analysis can be made using machine learning to detect and/or measure objects. For example, larger objects can be detected and measured using the lower scale resolutions.

3.3) Storage of Many Object Types and Examples

There are many meaningful object types in microscopic digital images. For example, in high-resolution images of a tissue sample, different objects such as blood vessels, cells, cell nuclei, collagen fibers, tissue folds, tissue tears, etc. can be observed and detected by the software. The different object types can be of dramatically different sizes, shapes and uses. The different object types can also be hierarchical. For example, going from higher to lower hierarchy the objects can be: Tissue sample->Inflammatory foci->inflammatory nuclei. In order to preserve relationships between objects and have the ability to optimize storage, the various different object types can be assigned into individual storage layers. The same type of objects are assigned to the same storage layer. Each layer is named and stored hierarchically. For example, a single histopathology slide with several layers can be defined at step 202 such as "/rois", "/cells", "/fibers", "/inflammation", etc. All the cells can be assigned to layer 2 while all the fibers are assigned to layer 3, for example. In viewing a single layer in the viewer, such as layer 2 without layer 3, all the cell objects in the viewer window can be shown.

Several ways of storage of objects can be used. Hierarchical data formats (HDF), such as HDF-5 (or Zarr), can be used to store both dense matrices, tabular data, and layer hierarchy into files of a file system. Another aspect for a dense storage system is the ability to store chunked and possibly compressed arrays. Chunked array storage breaks large multi-dimensional matrices into smaller chunks so that each chunk can individually be compressed, stored and subsequently retrieved.

If a more centralized and optimized storage is needed, a structured query language (SQL) database can be used to enable efficient storage of several tables and their specific names. A single table can be used for all of the layers or separate tables can be used for each layer. Matrix data can be stored in dense array databases, such as SciDB, designed for multidimensional data management and analytics common to scientific applications.

4) Optimization of Storage for Rapid Visualization/Dense Access

At step 212 of the process, with all or most of the semi-sparse blocks processed and stored, a volume storage optimization step can be performed. To create a very fast visualization of the volume of the high-resolution image at low resolutions, the volume optimization step 212 performed. Typically, the low-level resolutions are those where hundreds of blocks and millions of objects can be rendered and viewed. During the optimization process step 212, all the overlapping objects are fused together as one. Furthermore, during the optimization process step 212, the lower resolution levels not yet covered by the semi-sparse representations are re-gridded and densified. Finally, the measures table can be indexed for faster queries to find objects with specific characteristics. The index table can also be stored as part of the HDF5/Zarr file for built-in index types (e.g., simple numbers) or in an external indexer for more specialized types (e.g., geometric index for polygons).

Based on the number of objects and their configuration, this optimization step 212 can be skipped entirely with optimization being left to the visualizer's dynamic rendering of the GUI.

4.1) Fusion of Overlapping Parts of Objects

During the optimization process 212, the overlapping blocks that identify overlapping objects are accessed. The portions of the overlapping objects in the overlapping blocks are found and a union of their parts is computed to fuse the object together as one fused object. Measures of the fused object are recomputed and stored in a new block along with the fused object. One or more fused objects can be stored into the new fused block.

4.2) Dense Re-Gridding of Lower Resolution Levels

Final spatial optimization of low-resolution views of the volume for the high-resolution image is desirable to enable fast visualization. The interpolation technique for images and each and every measure can be pre-defined. Based on the interpolation technique desired and the number of objects within the extent of the given block, there are different ways to interpolate measures.

Starting at the highest resolution level (e.g., 5% or 10%) not yet represented, the space is sub-divided into non-overlapping consecutive blocks (re-gridding) such as like the tiles shown by FIG. 3B. Within each non-overlapping block, a dense image representation is computed by finding all the lower-resolution blocks overlapping the spatial extent in the given block, rendering them all together (densifying) including any and all measures, and then interpolating the rendered image with any and all measures down to the desired scale. Each dense block contains all visualizable measures from the last dimension. Assuming N is the number of spatial extents in the last dimension, each block will now contain N+1 dimensions where the N+1 dimension is the interpolated measure. This method can be used with higher order interpolations (Cubic for example).

In a second method, each dense block contains object identifiers, and the objects are dynamically rendered in order to visualize a particular measure. This method is used with a nearest-neighbor type of interpolation.

5) Addition of New Measures Using Machine Learning Inference

At step 214 of the process, assuming the measure table has been generated, the measure table can be analyzed to generate/produce new measures of objects, layers, etc. in the high-resolution image. For example, distances between two different objects (e.g., cells and tumors in tissue) on different layers, can be measured and added into the measure table. Various machine learning algorithms can be used on the measure table to analyze the measure table of the pre-existing data therein and using machine learning inferences generate new measures.

After modifications to the measure table for the newly added measures is completed, the densification optimization step 212 can be repeated. A dense re-gridding process can be delayed until after the initial machine learning inference step is performed to produce additional visualizable measures. With additional visualizable measures, the dense re-griding process for the optimization process step 212 can be performed. The densification optimization step 212 can be repeatedly performed as many times as needed after any changes to computed measures and/or objects are made. The densification optimization step 212 can also be performed within spatial constraints, if objects within a specific area have only changed.

6) Visualization/Densification of any Scale of the Volume

One or more users can request different fields of views and resolutions of the same high-resolution image. The software stores a number of image resolutions (e.g., 100%, 50%, 25%, 5%) of the high-resolution image in a pyramid of resolution levels in advance. The user may desire to see a field of view with a different resolution (e.g., 75%, 30%, 10%) than those that are stored in advance. The software and GUI can respond by providing desired field of view at the desired resolution. The software and GUI can switch between densely-stored images for low resolutions less than a switch storage resolution threshold (e.g., 25% resolution) and semi-sparsely stored images for higher resolutions greater than or equal to a switch storage resolution threshold (e.g., 25% resolution).

At step 216, a visualization process of the high-resolution image can be performed for visualization clients 217 at various desired resolutions. Visualization of the densely-stored resolutions of the high-resolution image at low resolutions is very fast. The visualization of low-resolution images simply involves retrieving the planes of a specific selected measure or measures of interest, because the rendering process has already been performed and stored for each measure. For example, assume the 5% resolution has been stored but a 10% resolution is desired. Because details of measures at less than 25% are difficult to see, the software and GUI can use the stored 25% resolution image in the field of view and down sample it to the desired 10% resolution and store it. If instead a 2.5% resolution is desired, the software and GUI can use the stored 10% resolution image in the field of view and downscale it to the desired 2.5% resolution.

Switching to higher resolutions (e.g., greater than 25%) for the high-resolution images of the requested specific measure or specific measures of interest, the visualization at the sparse levels of resolution involves a dynamic algorithm that finds the one or more logical blocks (overlapping and non-overlapping) in a requested spatial extent (field of view) and in the requested scale (zoom level). Using interpolation, the objects are rendered into a dense representation image over the one or more logical blocks based on the selected measure or measures and the requested spatial extent and requested scale. The rendering of objects in a limited number of logical blocks within the requested spatial extent and requested scale is key to allow for a low storage footprint. In a client server system, this visualization method provides for a light computational load on the client computer with lower space usage on the server computer.

Furthermore, if some resolution levels are not pre-computed the selected visualizer output that is rendered can be cached and/or stored directly as a new resolution level for quick subsequent retrieval.

7) Parallel and Distributed Computation

Visualization systems that use chunks/tiles as an access method can respond to a requested spatial extent of a requested view by responding to several independent requests. Such an access method enables a distributed system to serve and dynamically compute a plurality of small spatial extents to allow very large views to be constructed in real time.

FIG. 2B illustrates a distributed method 200B, associated with the method 200A, for providing access to high-resolution images. The computer network shown in FIG. 22 can be used to execute the functionality of the distributed method 200B.

As shown in FIG. 2B, some of the process steps (e.g., steps 206, 208, and 210) can be done in parallel for each block, and the machine learning step 214 can be performed in parallel and distributed process by one or more processing nodes 224A-224N on a block-by-block basis. Furthermore, a plurality of clients 226A-226N can be served in parallel and a distributed manner, including visualization clients 228 that are accessing saved data to view in a GUI viewer and analysis clients 229 that are requesting analysis of images through the GUI. Accordingly, added process steps 251-252 can specifically provide for increased efficiency from parallel and/or distributed processing in a client-server system or cloud computing system. Furthermore, the arbitrary positioning of descriptive blocks in the sparse matrix allows for further optimization with content analysis.

Process steps 202 and 204 are centrally controlled and performed by a server 222 to define the volume and the logical blocks. Process 251 distributes the actual processing work (e.g., steps 206, 208, and 210) for each block on a block-by-block basis to a plurality of processing nodes. The results of the block processing is transferred back to the server to perform the volume optimization process step 212. The volume optimization step 212 is thus centrally controlled and performed in a serialized manner to guarantee completeness of the description and efficiency of access.

Then in process 252, with access to tabular data, the server 222 can centrally control and serialize consecutive updates to the volume with process step 214 being performed by one or more processing nodes.

8) Utilization of the Visualization/Dense Representation of the Data Space for Consecutive Machine Learning (ML) Analysis As discussed herein, step 216 performs a visualization process of the high-resolution image for viewer clients 217 at a requested resolution. However, the software and GUI provide for further analysis of spatial views of the resolution image for the viewer clients 217.

At step 217 in the process, spatial visualization and analysis is provided to users with various analysis algorithms. The user can select one or more of the various analysis algorithms that are run consecutively to analyze the high-resolution image to further determine additional objects to detect, and new measures to compute of one or more objects (referred to herein as Products). Products generated by these consecutive analyses themselves can be stored as additional layers of the high-resolution image, The new objects and new measures can be viewed at the various stored resolutions in the pyramid of resolutions to further enhance the understanding of original data and enable fast spatial summarization of the sample in the high-resolution image. A user can utilize the software and GUI in several ways to obtain various visualizations to gain a further understanding of the sample captured in the high-resolution image.

8.1) Dynamic Object Visualization

The most direct use of the software is visualization of various fields of views and resolutions of objects and measures of the high-resolution image. The visualization software can request a particular spatial extent, in a particular scale with a particular measure to be densified into a matrix with values of that measure. For example, consider that the sample on the slide of interest is tissue with a plurality of cells having nuclei. A user may want to measure and visualize the nuclear area of the plurality of cells of the tissue in the high-resolution image in order to visually analyze spatial distribution of nuclear areas of the cells.

Using a low-resolution rendering, the viewer client application can obtain the distribution of areas in the high-resolution image of interest. This distribution enables dynamic spatial gating. For example, objects smaller than a particular size can be hidden. Similarly, objects' areas can be shown and emphasize a measure by using different colors. A value or level of a measure for an object can be shown using an appropriate color selected from a lookup table (LUT) mapping colors to a plurality of values for that measure. Once specific objects of interest are found in the sample object, more information can be rapidly obtained by using the GUI and visualization system. For example, new object measures for an object in a particular spatial position can be requested through the GUI. A new object measurement can be performed rapidly by using tabular indices.

Alternatively, the viewer client application can request a dense view of objects of interests in the image using object identifiers (IDs) in addition to the measure of interest. The objects with the requested object identifiers can be immediately accessed and shown, and thereby inform the user that the objects are present or not within the viewable image. Furthermore, the viewer client application can request several densified measures, in addition to object identifiers, that can be quickly used to enable spatial gating based on different measures of interest.

Object identifiers (dense object id) associated with a dense view of large quantities of objects and many measures can be defined. Selecting of the dense object identifier enables rapid visualization of many measures without thrashing back-and-forth between client and storage. In case the number of objects being visualized is not too large (1K-100K), the viewer application can pre-fetch the measure table for the specific range of ids being visualized. Selection of a range of object identifiers allows for any available measures to be dynamically rendered by the client using the spatial view of object ids.

Figure 12:
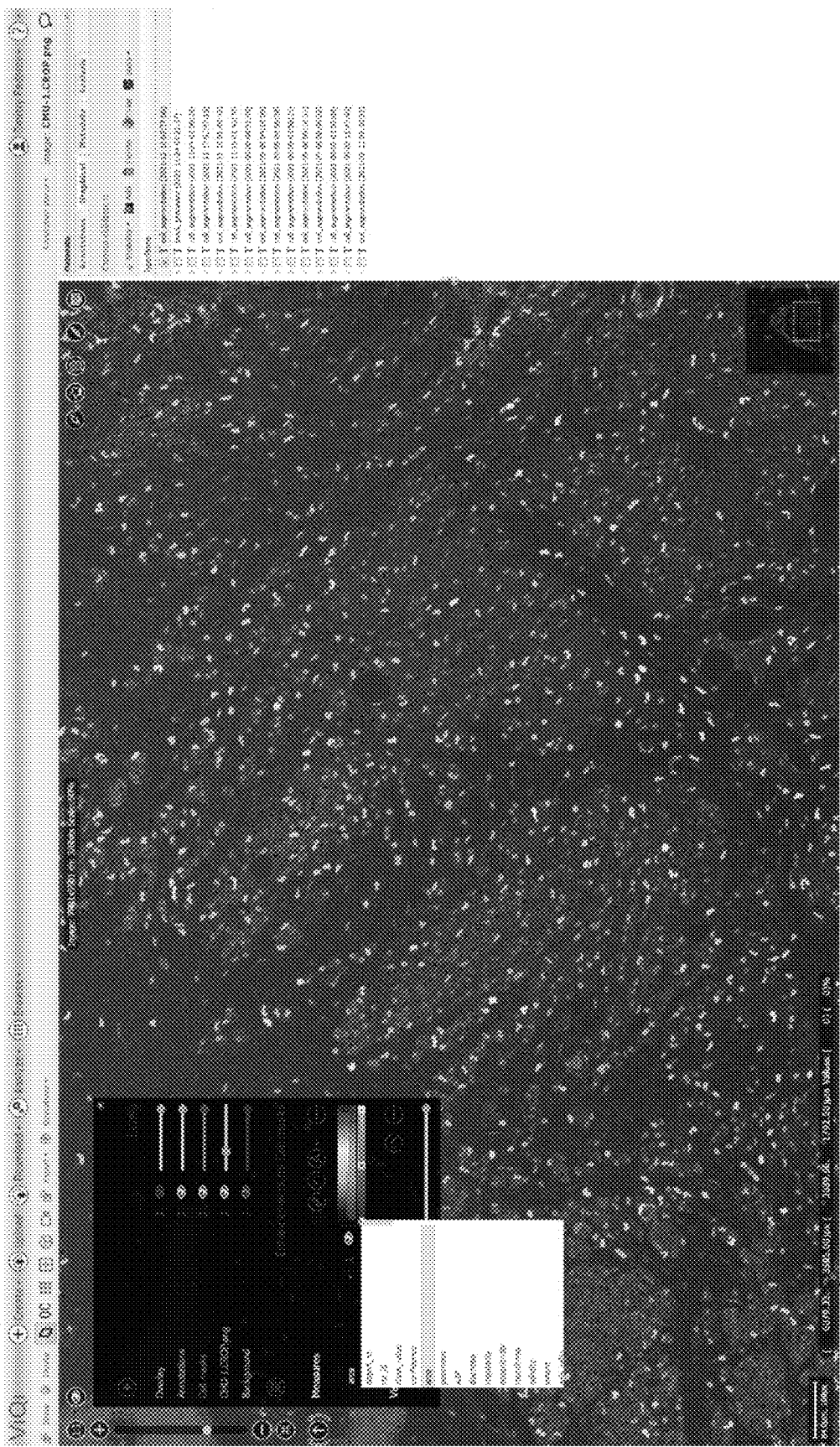
FIG. 12 illustrates a viewer window of the GUI with a selected measures of interest for imaged objects in a layer displayed with differing colors.

FIG. 12 illustrates an example of a viewer window 1200 of the GUI with selection of visualizable measures of interest (e.g., area) in a cells layer. The cell objects are colored differently based on area over the color range with dark red color being larger cells and dark blue being smaller cells in this case.

Figure 13:
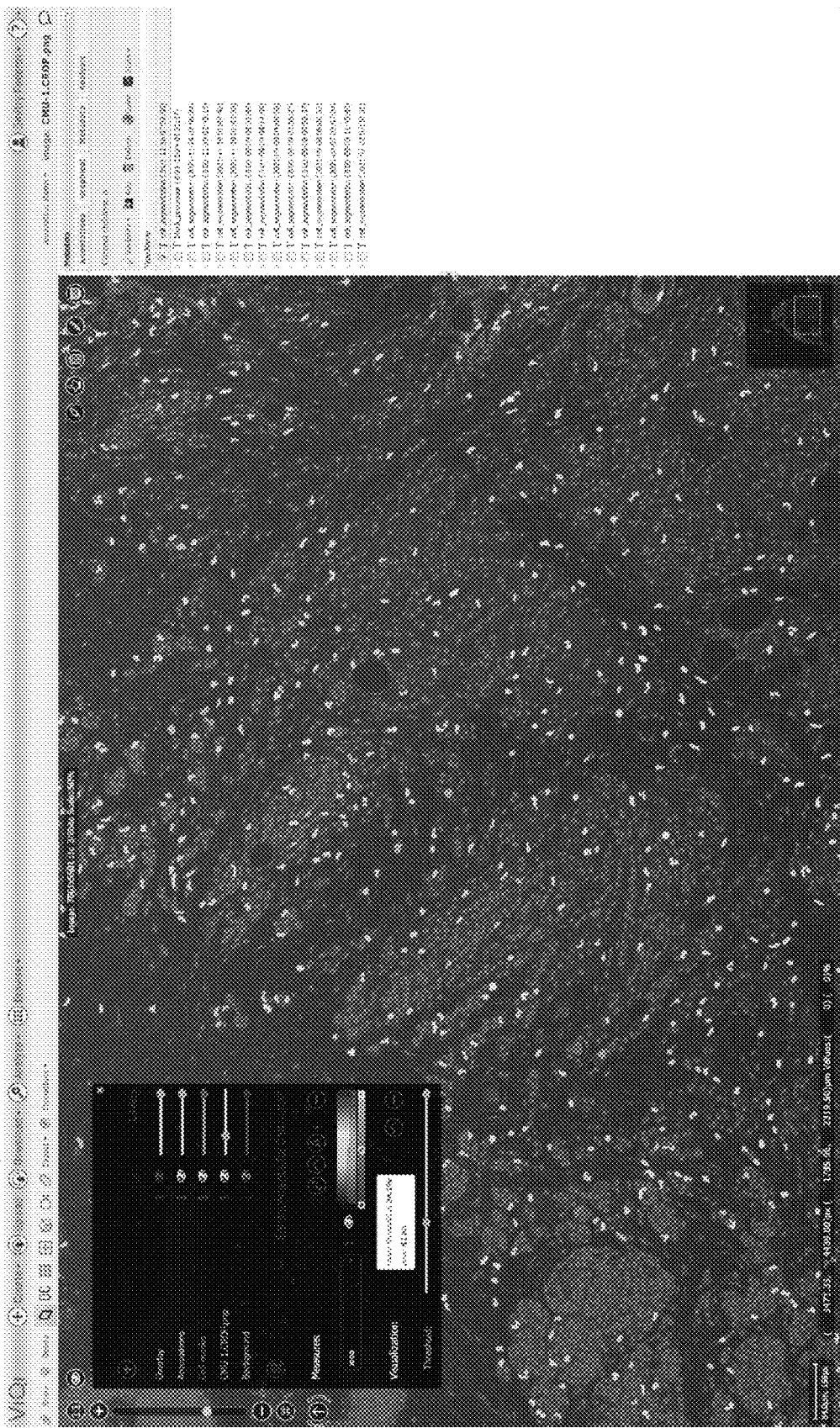
FIG. 13 illustrates a viewer window of the GUI with an example illustrating lower bound gating of cells based on an area measure.

FIG. 13 illustrates another example of a viewer window 1300 with a lower bound gating of cells based on area measure from that of the viewer window 1200 shown in FIG. 12. A lower threshold is adjusted upward by the threshold slider by a user to a selected percentage and lower area value. Accordingly, imaged objects (cells) having a magnitude for the selected measure below or less than the selected lower bound are now shown. That is, only imaged objects (cells) with an area above the lower bound gate are shown in color. The cells below are greyed out in order to be closer to the background color and not highlighted in color. The color spectrum can be used to color the objects differently and indicate the magnitude of the measure for the objects. An upper bound gating can also be used on a selected measure so that objects with an area greater than the upper bound are not shown in the viewer window.

Figure 14:
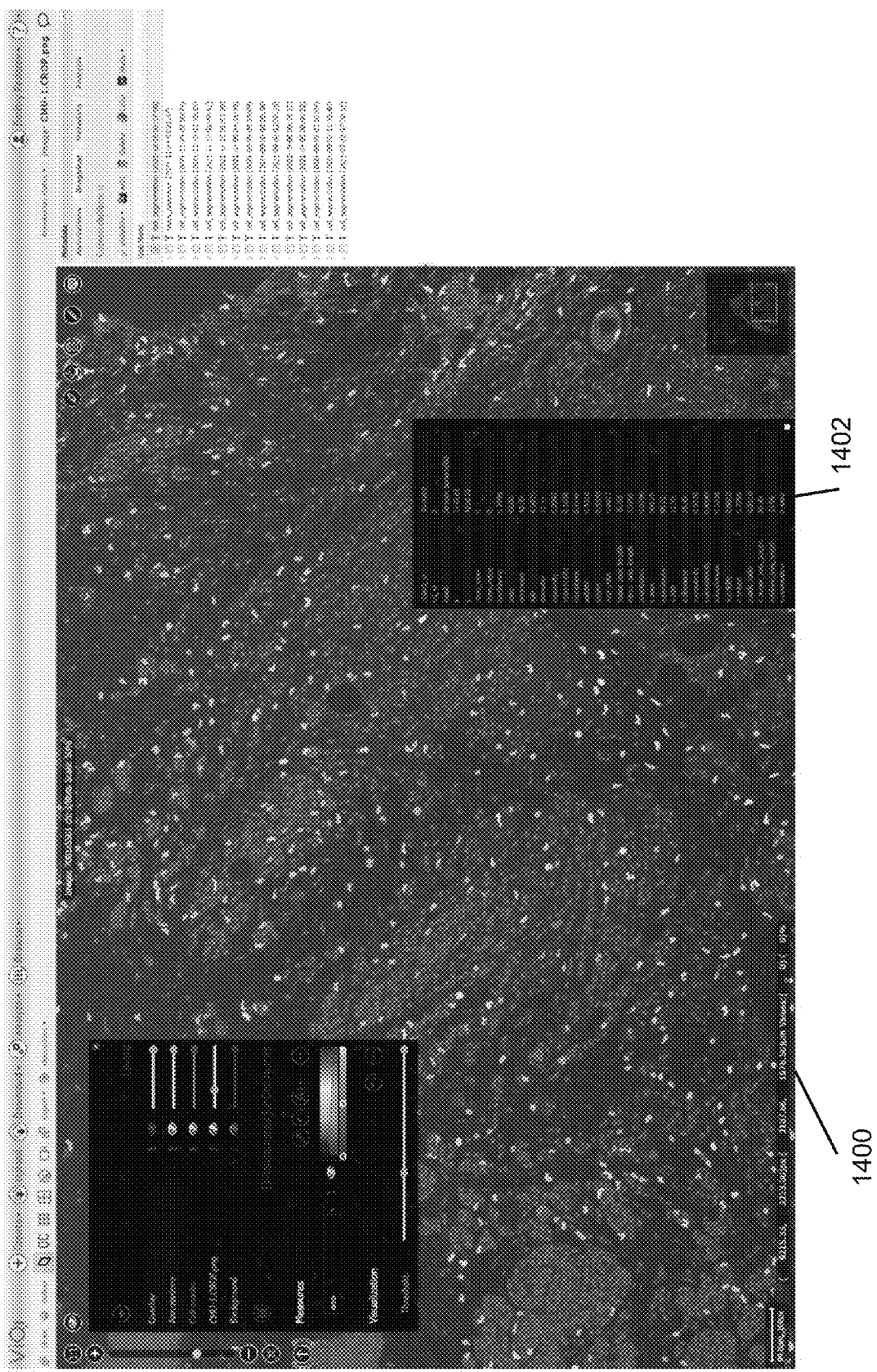
FIG. 14 illustrates a viewer window of the GUI showing all measures of a selected cell object.

FIG. 14 illustrates an example of a viewer window 1400 showing measures of a single selected cell object. A colored cell object is selected by a mouse cursor in the cells layer. A cell measurement window 1402 is overlaid on the viewer window 1400 near the selected cell object. The cell's object identification (ID), region of interest (ROI) ID, mask, position (x, y coordinates), class label, class value, and statistical confidence (e.g., object detected) are listed in the cell measurement window 1402 above all the measurements that are made on each cell in the layer. Some of the measurements that may be made and listed in the cell measurement window 1402 are area, perimeter, A2P (area to perimeter ratio), diameter, regularity, eccentricity, roundness, solidity, extent, axis ratio, major axis length, minor axis length, and orientation. Other measurements that can be made and listed in the cell measurement window 1402 are e.area, e.perimeter, e.A2P (area to perimeter ratio), e.diameter, e.regularity, e.eccentricity, e.roundness, e.solidity, e.extent, e.axis ratio, e.major axis length, e.minor axis length, and e.orientation.

Statistical measures of confidence can also be visually shown around and/or on imaged objects. For example, statistical measures of diseased cells can be shown in color heat maps. As another example, statistical measures over time can show how treatment by a drug or some other treatment improves diseased cells in the same type of tissue. In a study, the statistical measure typically involves a plurality of tissue samples from the same organ from different patients.

8.2) Using Precomputed Objects to Generate Spatial Clusters of Specific Phenotypes The efficient spatial abilities of the disclosed method and system can be leveraged to perform useful consecutive automated analysis. Clusters (Foci) of inflammatory cells can be used to determine the progress of different diseases in tissue sampled from various organs of patients. High quality identification of such clusters in tissue is complex. Identifying such clusters requires detecting nuclei, classifying the detected nuclei as inflammatory or not, and spatially grouping nearby inflammatory cells into clusters. The disclosed method and system is designed for performing this type of consecutive analysis using machine learning.

First, cell nuclei are detected at full resolution in the high-resolution image of the tissue sample and stored along with many features describing, intensities, textures, and morphology of various extents of these nuclei. For example, the morphology of various extents of these nuclei can include nuclear extent (immediately segmented from pixel data), and cell extent (obtained by partitioning the space of detected centroids and finally the neighborhood extent that describes an area around the detected centroid encompassing 10-100 cells). The stored information regarding all the features (measures) can be used to classify each nucleus with the cell phenotype. In this case, the inflammatory cell phenotype is of interest.

A dense view of inflammatory cells can be requested overlaid with a measure of the probability of the nucleus being inflammatory at a lower resolution. Image processing operations can be performed in order to combine nearby nuclei, for example, morphological dilation or closing operation. The obtained space can then be smoothed and thresholded at a required probability. Final objects can then be detected and stored in another spatial/measure layer and used for various statistics or subsequent analysis.

Figure 15:
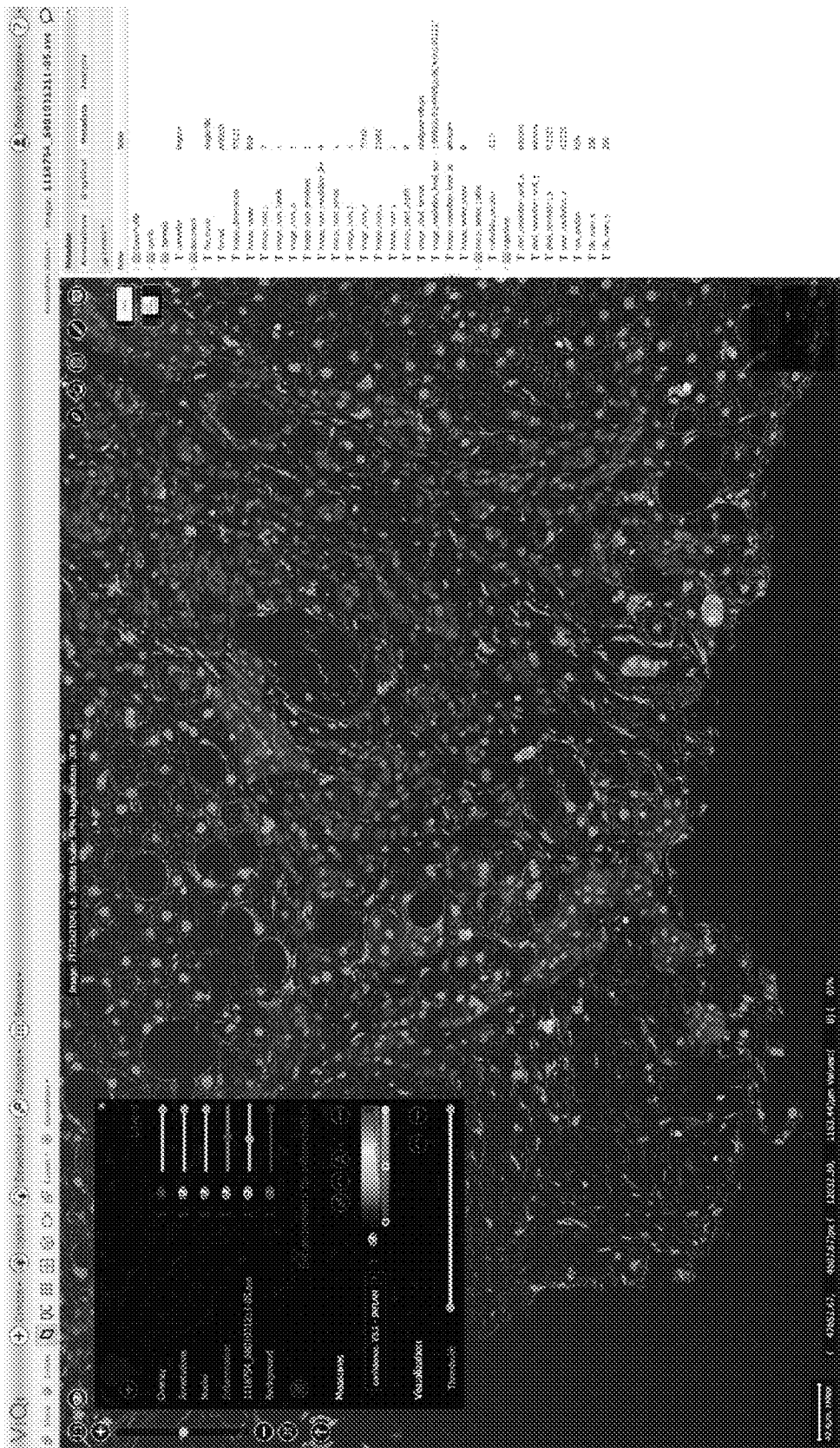
FIG. 15 illustrates a viewer window of the GUI showing various layers of imaged objects and generated clusters of objects of a selected confidence overlaid on top of the underlying high-resolution image.

FIG. 15 illustrates an example of a viewer window 1500 showing layers of confidence predictions overlaid on top of the high-resolution image. One layer (Nuclei layer) in varying color, shows the predicted confidence in detecting inflammatory cell nuclei. Another layer (inflammation layer) in varying color overlaid on top of the Nuclei layer and image, shows the predicted confidence of inflammatory clusters of cells. For example, a cluster region colored in red can show a high predicted confidence in a cluster of cells being inflammatory. A cluster region colored in blue can show a lower predicted confidence in a cluster of cells being inflammatory. Clusters with colors between blue and red can show a predicted confidence level between the lower predicted confidence and the upper predicted confidence.

8.3) Using Generic ML Pipeline for Object Identification

Image machine learning (ML) or artificial intelligence (AI) workflows can analyze small areas (tiles) of image data to make predictions. For example, an ML (or AI) model can predict a severity of a certain disease for each tile. The prediction of severity can be a progression score or simply a probability that a certain tile contains a tumor. However, typical ML (or AI) workflows do not work over large areas to make predictions on cells in the entire field of view of a high-resolution image.

With the disclosed methodology and system, ML (or AI) workflows can work over large areas to make predictions on cells in the entire field of view in a high-resolution image. Each image tile over the entire image is analyzed in a block-based manner. Multiple objects can be detected, and multiple features or measurements can be computed for the objects and stored into a measure table that are describes rectangular regions (logical blocks) over the tile positions. Additionally, direct predictions can be made on the objects using the ML workflows over the entire field of view and stored into the measure table. Instead of storing an object with mask/raster information, a value of the prediction is stored and associated with the object-by-object identifier. Another useful feature that saves storage is that entire blocks or specific tiles can be absent, if there's no tissue content in that position. The storing of structure with a prediction measure therefore represents a heatmap describing the tissue with computed measures.

A specific view of this tissue can be requested at a lower resolution, for example, to show tumor probability. The obtained space can be thresholded at a required probability with final objects that can be detected and stored in another spatial/measure layer that can be used for various statistics or subsequent analysis.

8.4) Spatial Analysis of Detected Nuclei

Several workflows with different machine learning (ML) models/algorithms can be consecutively used to make progressively more specialized predictions from the high-resolution images. For example, combining the predictive power of machine learning (ML) with spatial information can be used to detect disease in tissue. Cell phenotypes based on object features like intensity, texture, etc. can be detected Although finer grained cell phenotypes can depend on spatial proximity to other types of cells or other objects, an inference of their presence can be detected and shown. For example, ductal nuclei circling a bile duct can be detected and shown based on spatial proximity. Accordingly, spatial features that are measured in tissue can be used to determine some types of inferences.

The system and methods disclosed allows for detection of all types of objects of interest in the volume of image space in the high-resolution image. For example, cell nuclei, tumors, blood vessels, collagen fibers, fat vacuoles, etc. are objects of interest in tissue. Each object can be described in their own spatial/measure layer and further classified by a specific machine learning (ML) model producing different subcategories of fibers, tumors, nuclei, etc.

Given a plurality of differing object layers, new spatial features of interest can be created for each nucleus of interest at lower resolutions. For example, additional spatial features of interest can be the shortest distance to other specific cell types, how many other cells are in the vicinity, how much surrounding collagen is there, etc. These new features of interest with the objects can be measured and used to answer questions such as, what is the percentage of steatotic hepatocytes in the tissue (hepatocytes near fat vacuoles) or what cell types are typically near tumors.

More interesting questions can be answered by predictive machine learning (ML) workflows using all of the obtained measures about cell nuclei, such as predicting likely cells or traits involved in better outcomes with a particular treatment (e.g., drug treatment).

8.5) Geo-Spatial Example

Geospatial workflows can easily be supported by the visualization/analysis system and methods thereof. For example, high-resolution aerial images of an entire city can be captured. The visualization/analysis system can be used to detect houses in the high-resolution aerial images of the city. The houses can be further classified as to whether or not they have a swimming pool. A spatial cluster analysis can be requested and performed on the images to determine neighborhoods dominated by real estate with swimming pools.

Format

The disclosed storage format describes a multi-dimensional (N-D) Euclidean space that logically separates spatial dimensions (X,Y,Z,T, etc.) from other types of dimensions, such as radiometric (spectral) or other types of measures. The image space is populated by logical blocks of data where each block has been translated into the space and thereby defining a bounding box. Blocks have no other restrictions otherwise. Thus, blocks can be overlapping and non-overlapping. The simplification of using logical blocks of data allows for fast discovery of blocks involved in a particular visualization.

In order to support a wide array of data, blocks can contain many different storage or data types. The blocks can have an associated transformation that transforms them into a defined bounding box of the image space.

FIG. 3A shows a graphical representation of logical blocks in a two-dimensional (2D) space. A high-resolution image in three-dimensional (3D) space can be captured with a confocal laser microscope for example and can be similarly represented in 3D space.

Spatial dimensions are attached to a scale (resolution) of the image. Each scale of the image can contain different blocks in completely different locations and formats. The 100% scale (level 0 in resolution hierarchy) describes the real physical space from which the sample object was captured with the high-resolution image. Other resolutions of each image in the blocks are provided for visualization efficiency.

In addition to the block storage, the methods and systems can utilize a tabular storage mechanism to describe any non-spatial measures. Sparse objects can have a set of non-spatial measures in stored in various formats associated with them. Spatial measures are those that are explicitly related to spatial dimensions of physical space (e.g., coordinates x,y,z) and time (e.g., date, time). Non-spatial measures are those that are not directly related to the spatial dimensions of physical space and time. Non-spatial measures can be a statistical measure for example. Typical non-spatial measures of objects describe various characteristics of the imaged and detected objects. For example, morphometric characteristics (like area or eccentricity), intensity characteristics (mean intensity, standard deviation of the object's intensity), texture or spatial pattern characteristics, neighborhood characteristics (like density), spatial characteristics (like distances to nearest neighbor of a particular class), as well as various pixel transforms or descriptors optimized by convolutional neural networks and similar machine learning processes.

Definitions

A first storage format provides a mechanism to store many small raster objects along with their properties expressed as numerical features. The most natural representation for this data is a table where some columns can store variable-length matrices in their cells.

A hybrid table format is used where columns in a standard dense table can be marked as pointing to block-level storage of object data with referenced object identifiers (IDs). The format allows multiple columns to refer to different object identifiers.

There are some efficiency trade-offs when storing many very small objects in a compressed format in a file. To avoid the efficiency trade-offs, padded memory blocks are used and several objects located in approximately similar physical locations are group together in the same logical block.

Each logical block stores its position and extent in the overall physical space of the high-resolution image, thus allowing reconstruction of any region in the spatial extent by interrogating overlapping blocks. Spatial translation and scale transformation can be predefined, but any other translations/transformations can be accommodated. Blocks can be overlapping and/or very sparse and non-overlapping.

The block extent can be predetermined by the software writer. The block extent can be based on the processing granularity. For example, when processing a large slide composed of multiple fields of views (FOVs), it can be logical to store objects within those FOVs in FOV-based blocks. Alternatively, when processing some user-defined regions of interests (ROIs) in a large slide, it can be logical to store objects detected within these ROIs in blocks located within those ROI extents.

Blocks containing objects in the computed resolution (resolution used to detect objects—typically 100% scale of the original image) are stored in blocks located in the pyramidal level 0. Each pyramid level has an associated scale. Typically, pyramid level 0 has a scale of 1.0 or 100%. Additional resolutions can be stored in consecutive pyramidal levels. The pyramid levels can be spaced apart by halving the resolution of the prior level. Therefore, with pyramid level 0 having a scale of 1.0 or 100%, Level 1 image data can be stored with a scale of 0.5. or 50%.

Additional pyramid resolutions levels can be used when rescaling data for visualization is overly slow. Additional pyramid levels can be desirable for large volume images composed of many blocks. If there are few blocks with few objects in an image, additional resolution levels are likely unneeded. These levels may not be computed by the writer and instead only appended when reading of these levels is requested. Efficiency of each approach must be determined for each case.

Hierarchy of Block and Level Storage
    My Layer->space extent
        Table->Id, f1, f2, f3, ref to object id
        Level 0->scale 1.0
            Block 0->0 padded matrix concatenating object matrices, bbox at scale 1.0
            Block 1->0 padded matrix concatenating object matrices, bbox at scale 1.0
            . . .
        Level 1->scale 0.5
            Block 0->0 padded matrix concatenating object matrices, bbox at scale 0.5
            Block 1->0 padded matrix concatenating object matrices, bbox at scale 0.5
            . . .
    . . .

Data Types

Block Storage

There are several data types that can be stored in the spatial blocks: dense, sparse (mask), heatmap.

Dense

A simple N-D matrix defining spatial and non-spatial dimensions present in the image.

Sparse

A set of objects positioned within, and relative to, the block. These objects are described by masks stored in a VQI sparse storage mechanism as well as a tabular storage structure that contains any non-spatial measures associated with these objects.

Heatmap

Figure 3C:
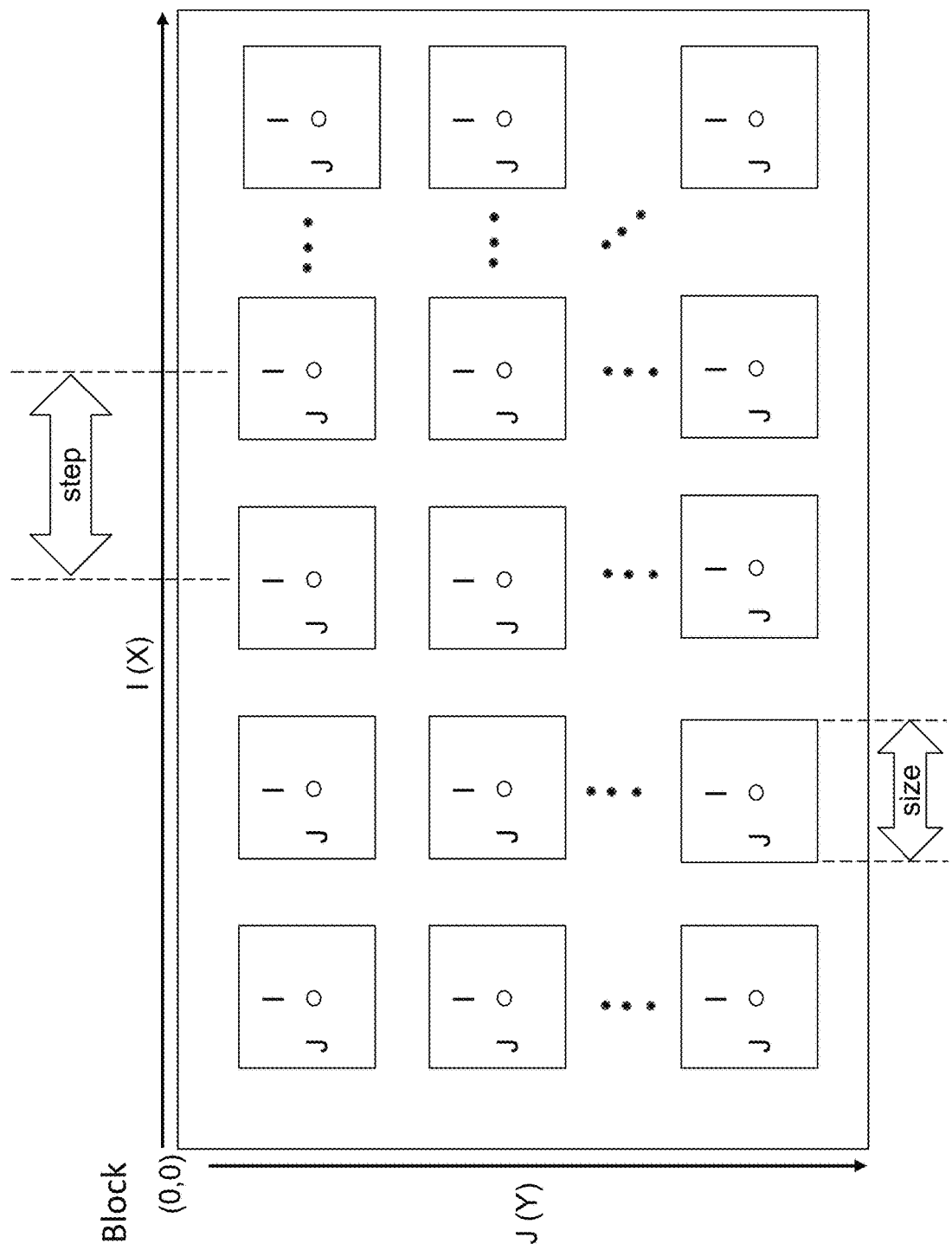
FIG. 3C is a block diagram of a heat map in a logical block of a high-resolution image.

FIG. 3C illustrates an example heatmap for a block. A heatmap is a set of measures describing centroids (tiles) and measured within a spatial extent (size). The centroids (tiles) in the block are uniformly distributed in steps over a block.

Heatmap is defined as a regular grid, starting at 0 (0,0) of the block and ending at the end of the block (I max, J max). Grid points can be missing although missing values will affect higher order interpolations.

Tiles can have a different step than the tile size creating either overlapping or non-touching tiles. Tiles can require the usage of more random-access memory such that it is slower processing. Tile generations with steps equivalent to tile sizes can be used to speed processing.

Overlapping and non-continuous tiles can be process using a two-step interpolation where a uniform grid portion is interpolated independently from its sides that will have a different tile size.

Typical Efficient Storage

Storage efficiency is a balancing act trying to optimize simplicity and efficiency of storage, required storage space and ultimately simplicity and efficiency of reading. The ideal workflow allows for fast, simple and distributed storage of acquired or computed data elements. This may be followed by a slower optimization process. After the optimization process, reading the data should be very fast.

Storage of semi-sparse objects is by far the most complex of all VQI uses. We typically start with arbitrarily positioned blocks with semi-sparse objects. While writing each block is down-sampled in exact configuration for a few resolution layers. The exact number of layers is based on the object sizes, the typical number is 3. Finally, a densification re-gridding process takes place that describes the space with gridded and non-overlapping dense blocks. These blocks will contain as many channels as there are visualizable measures marked in the table description. These blocks will be stored in float32 format in order to provide a decent common dense representation for any measure data type. It is imperative to balance the resolution level at which the densification process will start in order to balance reading speed and amount of storage overhead needed for visualization. This involves the number and size of objects, the spatial distribution of the sparse blocks and required speed or storage utilization.

FIG. 5 illustrates a graphical representation of a typical pyramidal structure.

Non-Spatial Dimensions

There are several non-spatial dimensions that can be described: spectral and measures. A typical microscopy image can have several spectral (radiometric) channels that sparsely populate the spectral. In a typical case we can describe many parameters of those channels.

Spectral

A slightly special mode when there are many channels (currently arbitrarily defined as >30) named "spectral" is used specifically for hyper-spectral images with many densely defined bands.

Measures

A "mask/heatmap" can be described by a set of measures, each measure having a name and a data-type. They are reported with a special meta-data and are not stored or represented as channels to make a specific distinction. There are two main differentiators of spectral and measure data: spectral channels are stored in a dense N-D matrix form, are of the same data type and come from sensor measurements of physical characteristics.

Measures, on the other hand, are stored in a tabular form, can be of different data types and typically produced by processing original sensor data, i.e., feature descriptors. Measures are typically describing groups of original sensor data points, VQI allows describing sparse objects (mask storage) or o gridded heatmap.

Implementation Details

An HDF-5 storage container can be used for the storage format because it provides efficient I/O implementation, hierarchical storage, metadata storage, compression support and drivers for many relevant computer programming languages such as C++, C, MATLAB and Python.

Note that standard HDF-5 ordering is used throughout. Column-wise matrices: IJ order, thus in image coordinates it is HW and ij as yx. All vector indices begin with 0.

FIG. 7 shows an example of a main view of the file structure 700

There are required fixed named metadata tags and sub-elements that describe the contents of the fused table/image construct.

The required metadata tags 702 are:
viqi_image_type:string [planar]—defines the image format and currently only supports planar
viqi_image_size: int vector—defines the dimensionality of the virtual dense image
viqi_storage_subtype: string [combined]—defines fused data containing image and table
viqi_image_content: string [mask]—defines the image data format
viqi_columns_id:—int, defines columns that store element IDs
viqi_columns_reference: int, defines columns that store references to variable length matrix data The required storage elements 704 are:
table—object features table containing columns pointing to matrix data
level_000—matrix data at a particular scale indicated by a tag, level 0 indicates the highest resolution available in this file
level_001—matrix data at a lower scale, level 1 indicates the next highest resolution available Additional levels of matrix data, level_002 and level_003 are shown as storage elements 704 in FIG. 7.

Each resolution level is independent of each other and does not have to have the same number of sub-blocks and items.

Resolution Levels

FIG. 16 illustrates an example portion of a resolution level 0 used for a high-resolution image.

Level 0 indicates the highest resolution available in this dataset and its scale in relation to the overall image is stored in the "vigi_level_scale" tag. If the level is represented with sparse objects stored in blocks, the tag "vigi_storage_spar- se_items" will be set with the number of items. Level 0 is followed by lower resolution levels with the next highest resolution stored at level 1 and so on.

The tags used in levels are defined in the following:
Level: Required Metadata Tags
viqi_level_scale: float, defines the scale of the given pyramidal level
viqi_storage_number_blocks: int—defines the number of blocks representing the following level
viqi_storage_sparse_items: int—defines the number of sparse objects within this level
viqi_storage_block_bboxes: int vector—cache for faster access of bounding boxes of each block within the level stored as (y,x,h,w)
viqi_block_item_id_offsets: int vector—cache of object ID offsets per block, used to quickly find in which block a particular object is contained.

Level: Optional Metadata Tags
viqi_block_first_row: int64 vector—list of first row indices per block, used to quickly find a range of rows for a particular object. This is very important for reading speed but is not required.

Blocks within Resolution Levels

FIG. 17 illustrates images of blocks stored at a resolution level 0 (scale 100%).

Blocks are sequentially numbered, and each block contains its position in the resolution level and storage type. Note that sparse blocks can be missing if there are no objects detected in that area. The bounding box in the level index is still present in order to assure that an empty dense image with proper size can be produced from such a block.

Block: Required Metadata Tags
viqi_block_content: string [mask|image]—defines the matrix representation, image or mask
viqi_block_format: string [sparse|dense]—defines if the blocks is stored as a sparse set of objects or a dense image
viqi_block_bbox: int vector—bounding box of this block within the resolution level (y,x,h,w)

Sparse Block: 0 Padded Matrix Block Storage

Objects (images or masks) are stored collated in a 0 padded matrix with width of the largest width of objects within the block and height equal to sum of heights of objects plus some 0 padding between them. Objects with even height get 2 pixels padding and objects with odd height get 3 pixels padding. The matrix itself is stored as a chunked compressed array with the chunk size equal to 256×Max_object_height.

Figure 18:
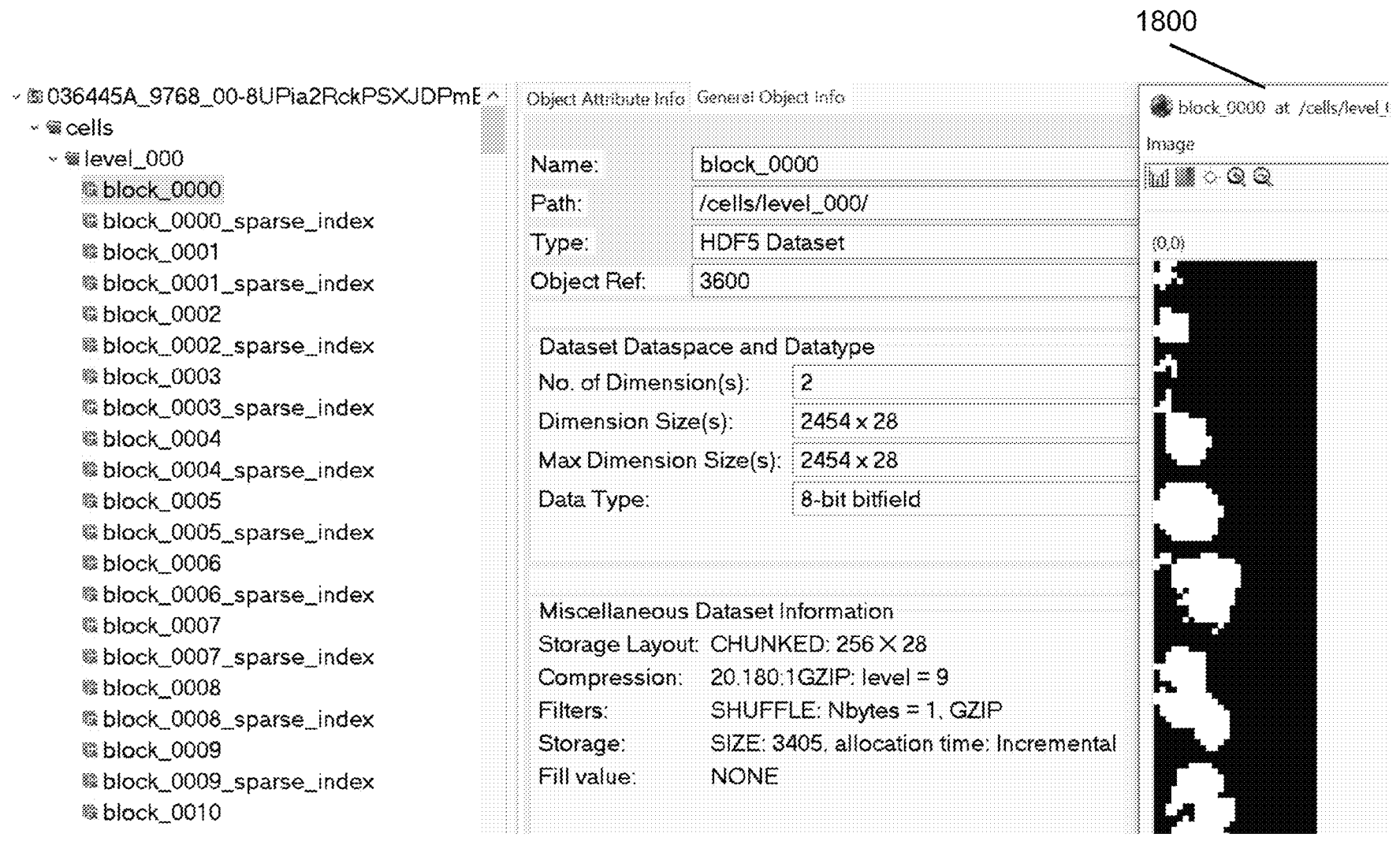

FIG. 18 illustrates a portion of matrix block storage 1800 for a selected block, block 0000.

Sparse Block: Object Index

In order to properly read objects from the 0 padded block matrix and reconstruct the dense image, the object index with bounding boxes and object ids is used. Each row contains a record describing: item_id,block_pos,y,x,h,w as is indicated by the "vigi_index_dims" tag, the object index.

FIG. 19 illustrates the selection of a portion of the sparse index 1900 for the block 0000.

Storage Modes and Content Types

The method provides different types of storage modes to store and visualize several types of content. The following content types are currently supported by the embodiments:
1) Image—each block is a dense N-D matrix
2) Spectral—similar to an image but with an expectation that there are many spectral channels (bands), at least >32 with physical meaning attached via viqi_spectral_wavelengths tag. See spectral definition.

3) Mask—typically represented as a set of semi-sparse objects where each object has a number of visualizable properties, these properties are stored in the table under appropriate object ids and also marked as visualizable using viqi_columns_vis tag. 0 color is always a transparent color in the mask. In the case of a completely dense mask, it can be stored as a dense block with object ids stored in pixels.

4) Heatmap—dense grid of measurements of various properties. Heatmap is typically in lower resolution than the image itself and is represented as a table of measurements indexed by their ids and having their bounding boxes stored in a mask semi-sparse format without the actual mask content. Once the dense grid is computed it typically needs to be interpolated to the required image resolution. This operation can happen directly on the viewer to minimize transmission costs.

Other Content Types that can be Support are

5) Points—
6) Polygons—
7) Polylines—
8) Rectangles—
9) Circles—
10) Ellipses—
11) Labels—

These content types can be stored using different block formats and have different requirements.

Block Format

There are different storage formats associated with each block:

1) Dense—a block is a dense N-D matrix stored using a standard HDF-5 node
2) Sparse—a block is represented by two nodes: bbox index and zero padded matrix consisting of objects. In case of a "mask" content type, the values of objects defined by the sparse masks are stored and retrieved from a table. In case of an "image" content type, the values are stored within the masks themselves.
3) Heatmap—a block is represented by a bbox index node just like in sparse mode but without the object's block, objects measurement values are stored and retrieved from a table.

Other block formats can be directly associated with other types of contents. Other block formats can be 4) Points—
5) Polygons—
6) Polylines—
7) Rectangles—
8) Circles—
9) Ellipses—
10) Labels—

Metadata

Some fields with important metadata can be stored directly as HDF5 attributes at the root of the selected path, in this case/cells. The rest of the metadata can be stored as an XML document embedded into one of the attributes. Some defined tags are as follows.

Image Level:
  viqi_metadata_xml: string with XML document in ViQi tag format
  viqi_metadata_json: string with JSON document in ViQi JSON tag format
  viqi_units: string, comma separated units for table columns, can be empty for unit-less column
  viqi_pixel_resolution: double vector of pixel resolution for Y,X,Z,T, . . . as many dims as needed
  viqi_pixel_resolution_units: comma separated units for pixel resolution Image Level:
  viqi_image_content: mask|image|heatmap|spectral
  viqi_image_dimensions: comma separated names of dimensions: Y,X,Z,C
  viqi_image_size: integer vector with sizes per dimension [Y,X,Z] ignoring the last spectral one
  viqi_image_type: one of: planar,
  viqi_storage_subtype: combined, image, objects
  viqi_columns_class: name of the column containing class label
  viqi_columns_confidence: comma separated strings containing column names that store classifier confidence
  viqi_columns_id: comma separated strings containing column names that store object identifiers
  viqi_columns_reference: comma separated strings containing column names that define columns used to reference sparse object stores, order defines stores starting with the default as 0 (which is omitted) and on to 1, 2, etc.
  viqi_columns_index: comma separated strings containing column names of columns to be indexed
  viqi_columns_ml: comma separated strings containing column names of columns to be used for Machine Learning
  viqi_columns_vis: comma separated strings containing column names of columns to be used in visualization
  viqi_columns_category_feature: comma separated strings per column describing feature categories
  viqi_columns_category_marker: comma separated strings per column describing marker (channel) categories Image Level:
  viqi_columns_roi_id: column name storing ids of ROIs for given objects Resolution Level:
  viqi_level_scale: [0.5,0.5,1.0]//vector of float, defines the scale of the given pyramidal level per dimension, in case of isotropic images that are resized in all dimensions Block Level:
  viqi_block_type: string [libbioimage]—defines the file supported by libbioimage
  viqi_block_transform: [a,b,c,d,e,f, . . . ]//Transform matrix at block dimensionality that transforms a given block into defined bounding box in viqi_block_bbox,
  supporting two 2D image 90-degree rotations, for example
  Clockwise: [[0, −1, 0], [1, 0, 0]]
  Counter clockwise: [[0, 1, 0], [−1, 0, 0]]
  viqi_block_transform_type: string "affine| . . . ", currently supporting "affine" transforms.

Note that the following block corrections are applied to the retrieved object prior to geometrical transforms.
  viqi_block_correction_flatfield: reference, an HDF5 pointer to correction object
  viqi_block_correction_darknoise: reference, an HDF5 pointer to correction object
  viqi_block_correction_background: reference, an HDF5 pointer to correction object Spectral Extensions Color spectra can be used to support spectroscopy data in the file format.

Blocks store spectra the same as channels in the last dimension, e.g., a block would contain H×W×C. It is suggested that chunking the block into chunks with few spectra in each chunk can result in fast retrieval of planar data, e.g.: 256×256×1.

Figure 4A:
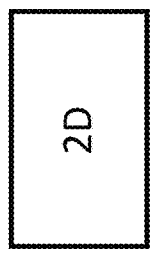
FIGS. 4A-4D are block diagrams of various multi-dimensional images.
Figure 4C:
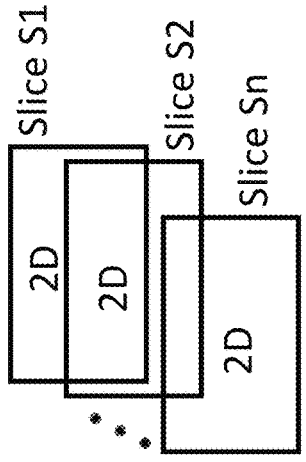
Figure 4B:
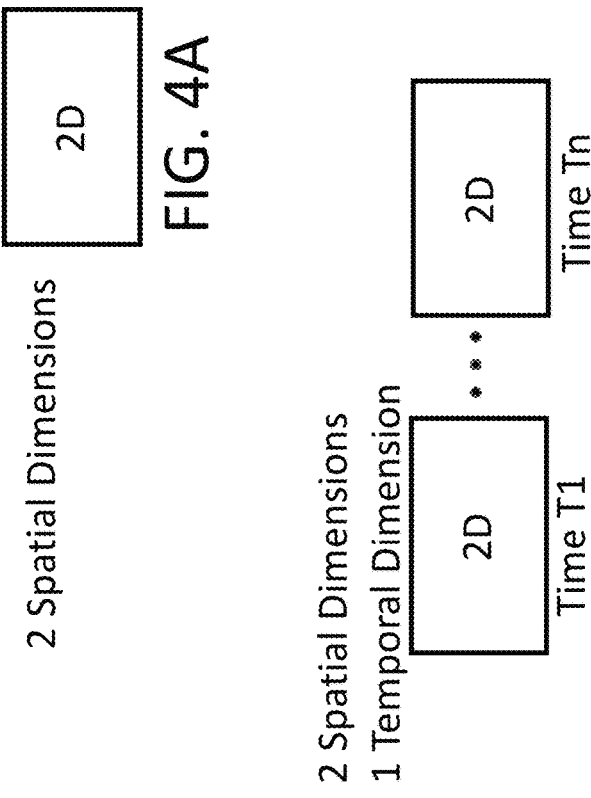
Figure 4D:
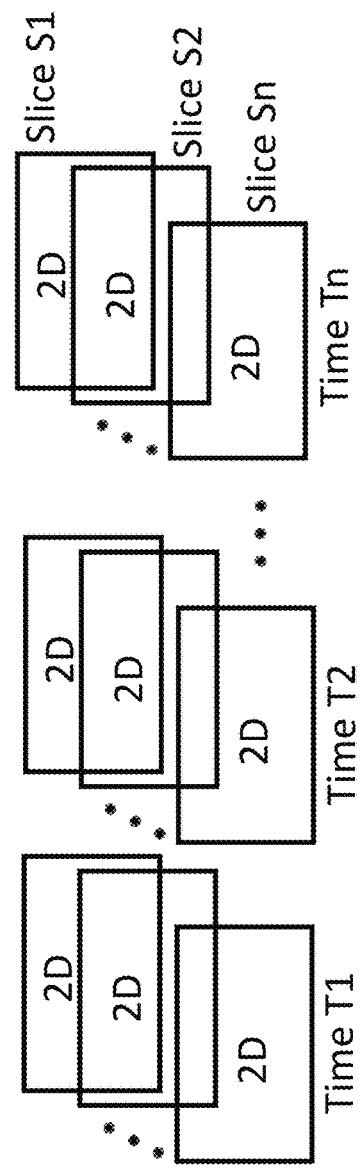

Tags:
Top Level:
    viqi_storage_version: 1.3 (or higher)
Image Level:
    viqi_image_content: spectral//string
    viqi_image_dimensions: Y,X,C//string
    viqi_spectral_wavelengths: [380,385,390, . . . ]//num vector
    viqi_spectral_wavelengths_units: nm//string
Block Level:
    viqi_block_content: spectral//string N-D Extensions The image storage form supports N-Dimensional (multi-dimensional) data in the VQI file format. FIGS. 4A-4D illustrate examples of multidimensional images. In FIG. 4A, two dimensional (2D) images with spectral components require no change and remain exactly the same when stored. A bounding box for a block of data can be defined by 4 integers. Differences in storage of image data can occur for three dimensional (3D) images and up. Referring to FIGS. 4B-4C, in the case of 3D images, all bounding boxes change from 4 integers to 6 integers. Referring to FIG. 4D, in the case of four dimensional (4D) images, all bounding boxes change from 4 integers to 8 and so on for even higher dimensions. The increase of integers for higher dimensions from 2D images affects the following at the various levels:

1) Per level block bbox index: viqi_storage_block_b-boxes
2) Per block bbox: viqi_block_bbox
3) For sparse blocks the object index: block_XXXX_sparse_index The block storage is the same with additional dimensions. All additional dimensions are 0 padded just like in the 2D case.

Note: N-Dimensional (multidimensional) volumes can be interpolated differently, for example: highly anisotropic 3D block can retain the same number of Z slices until pixel resolution becomes isotropic, at which point z dimension will be interpolated at the same rate.

Required Metadata Tags:
Top Level:
    viqi_storage_version: 2.0 (or higher)
Image Level:
    viqi_image_dimensions: Y,X,Z,C//string
    viqi_image_size: [2048,2048,501]//num vector Y,X,Z for example in 3D case
Resolution Level:
    viqi_storage_block_bboxes: [0,0,0,2048,2048,501; . . . ]//num 2D vector Y,X,Z for example in 3D case
    viqi_level_scale: [0.5,0.5,1.0]//vector of float, defines the scale of the given pyramidal level per dimension, in case of isotropic images that are resized in all dimensions
Block Level:
    viqi_block_bbox: [0,0,0,2048,2048,501]//num vector Y,X,Z for example in 3D case
    Sparse index node: block_XXXX_sparse_index
    viqi_index_dims: "item_id,block_pos,y,x,z,h,w,d"
    viqi_block_transform: [[a,b,c],[d,e,f], . . . ]]//Transform matrix at block dimensionality that transforms a given block into defined bounding box in viqi_block_bbox
    viqi_block_transform_type: string "affine| . . . "

External Block Support

External HDF-5 Blocks

An external block in HDF-5 format is a standard HDF-5 external link containing file path and HDF-5 path to the required node. The pointed node must contain all the metadata required for a block as by VQi definition.

Block (External HDF-5): Required Metadata Tags
    viqi_block_content: string [mask|image]—defines the matrix representation, image or mask.
    viqi_block_format: string [sparse|dense]—defines if the blocks is stored as a sparse set of objects or a dense image.
    viqi_block_bbox: int vector—bounding box of this block within the resolution level (y,x,h,w).
    viqi_block_external_dimensions: int vector—defines HDF5 compatible dimensions vector.
    viqi_block_external_chunking: int vector—defines HDF5 compatible dimensions vector.
    viqi_block_external_datatype: string [uint8,int8,uint16,int16, . . . ]—defines the pixel data type.

External Blocks in Other Formats

The image analysis and storage system supports external blocks provided by files in any format supported by libbioimage, a command line image conversion utility that can read and write many image formats, extract regions of interest (ROI) and metadata stored in the images. This allows creating an N-D pyramidal file from original blocks stored in external files. The main file can contain lower resolution and differently positioned data blocks. This allows to point to original files for blocks at 100% resolution, then several lower resolutions of the same blocks to HDF files (e.g., one file per 2-3 resolutions of one block) and then re-gridded blocks at low resolution straight in the file itself. This can be done by creating a node containing a vector of paths as utf-8 encoded strings in a similar format to HDF-5 links, in that, it could contain an optional sub-path component after ":" character. The sub-path will be interpreted by the libbioimage. In the case of pointing to several files with channels or dimensions, the list will have more than one entry. In this case, geometry is deduced from N-D bbox in the standard dimensions order, and the last undefined dimension is spectral which will be interpreted as channels. The following are examples:

Ex1: 'one_block.tif'
Ex1: 'one_block.czi:/fov=100'

Block (External Other Format): Required Metadata Tags
    viqi_block_type: string [libbioimage]—defines the file supported by libbioimage
    viqi_block_external_dimensions: int vector—defines HDF5 compatible dimensions vector
    viqi_block_external_chunking: int vector—defines HDF5 compatible dimensions vector
    viqi_block_external_datatype: string [uint8,int8,uint16,int16, . . . ]—defines the pixel data type
    viqi_block_content: string [mask|image|heatmap]—defines the matrix representation, image or mask
    viqi_block_format: string [sparse|dense]—defines if the blocks is stored as a sparse set of objects or a dense image
    viqi_block_bbox: int vector—bounding box of this block within the resolution level (y,x,h,w)
    viqi_block_transform: [a,b,c,d,e,f, . . . ]//Transform matrix at block dimensionality that transforms a given block into defined bounding box in viqi_block_bbox, currently supports two 2D image 90-degree rotations, for example:
    Clockwise: [[0, −1, 0], [1, 0, 0]]
    Counter clockwise: [[0, 1, 0], [−1, 0, 0]]

viqi_block_transform_type: string "affine| . . . ", supports an "affine" transform type.

Note that block corrections are applied to the retrieved object prior to any geometrical transforms viqi_block_correction_flatfield: reference, an HDF5 pointer to correction object viqi_block_correction_darknoise: reference, an HDF5 pointer to correction object viqi_block_correction_background: reference, an HDF5 pointer to correction object Heatmap Block Storage Format Any block can be stored as a heatmap. In this case the measure data associated with centroids is stored and red from a table where the object_id column indicates the centroid id. Since we have to define the block bbox as well as a storage format as "heatmap" this mechanism requires storing a block and a block_index nodes. While the block node is an empty array only used to define the metadata, the block_index node is the same as in the mask case. Block index is defining the extent of the measure tile with a bounding box but is describing a centroid which must be computed from the bounding box. The table store should store the actual centroid position in x and y columns.

Block: Required Metadata Tags for a Heatmap are as Follows:

viqi_block_content: string [heatmap]— viqi_block_format: string [heatmap]— viqi_block_bbox: int vector—bounding box of this block within the resolution level (y,x,h,w)

Implementation

Figure 20A:
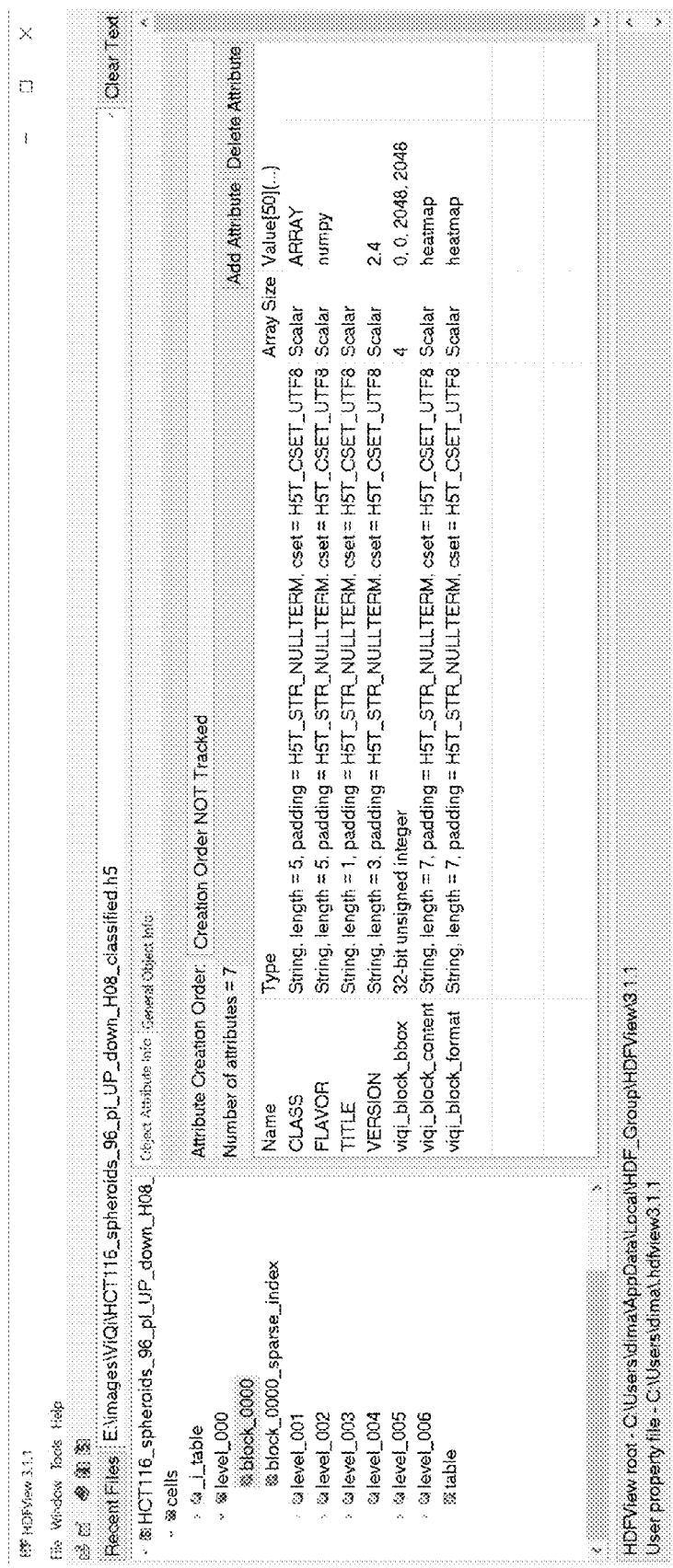
FIG. 20A illustrates a block storage format of a heat map.

FIG. 3C illustrates a diagram of an example heatmap for a block of data in an image. FIG. 20A illustrates implementation of block storage format for a heatmap. The block has the attribute "vigi_block_content" defined as "heatmap".

Figure 20B:
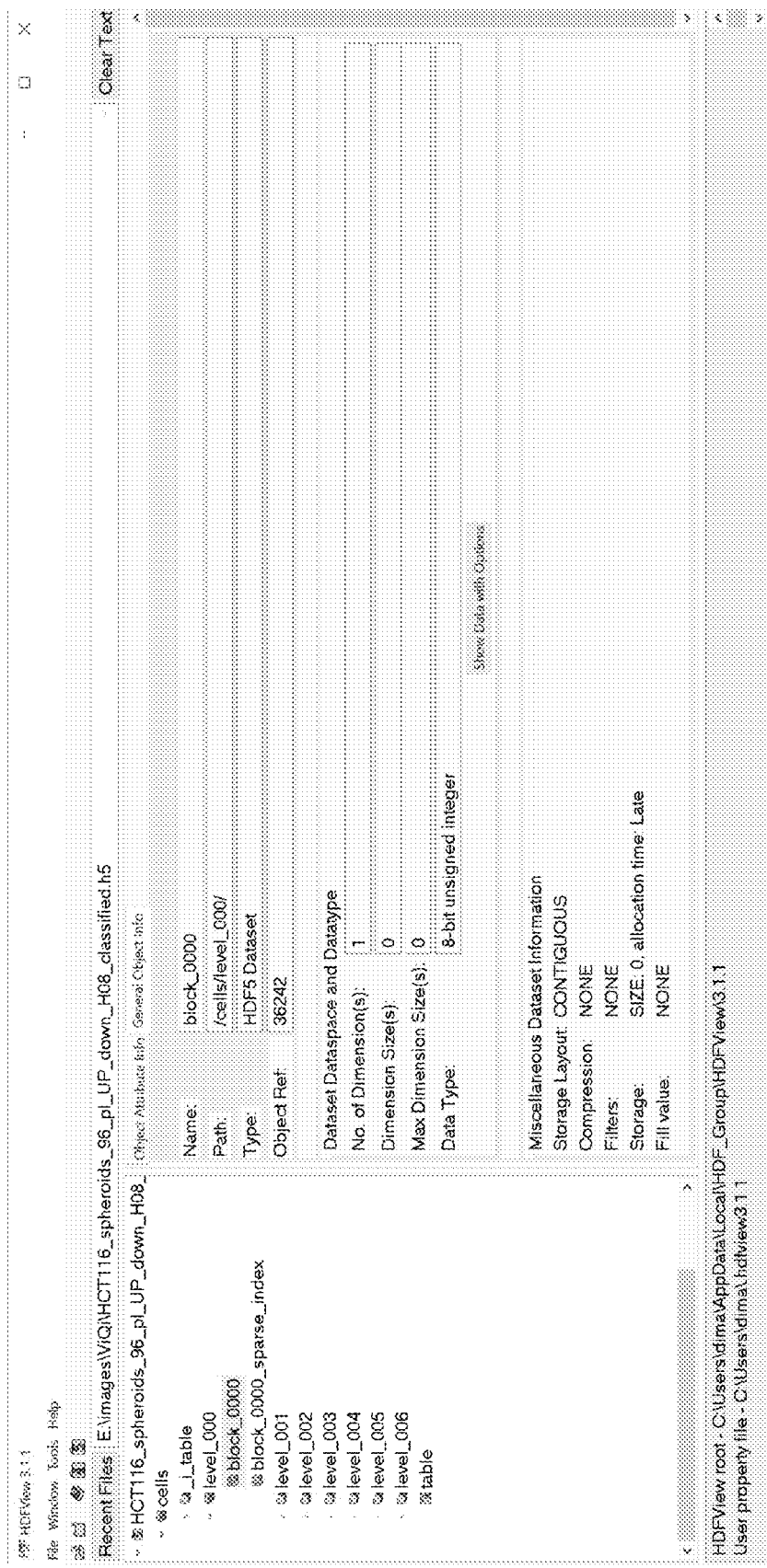
FIG. 20B illustrates a format of a heat map with an empty matrix.

FIG. 20B illustrates how a heatmap has an empty matrix. The block 0000 is selected and it contains an empty matrix.

Figure 20C:
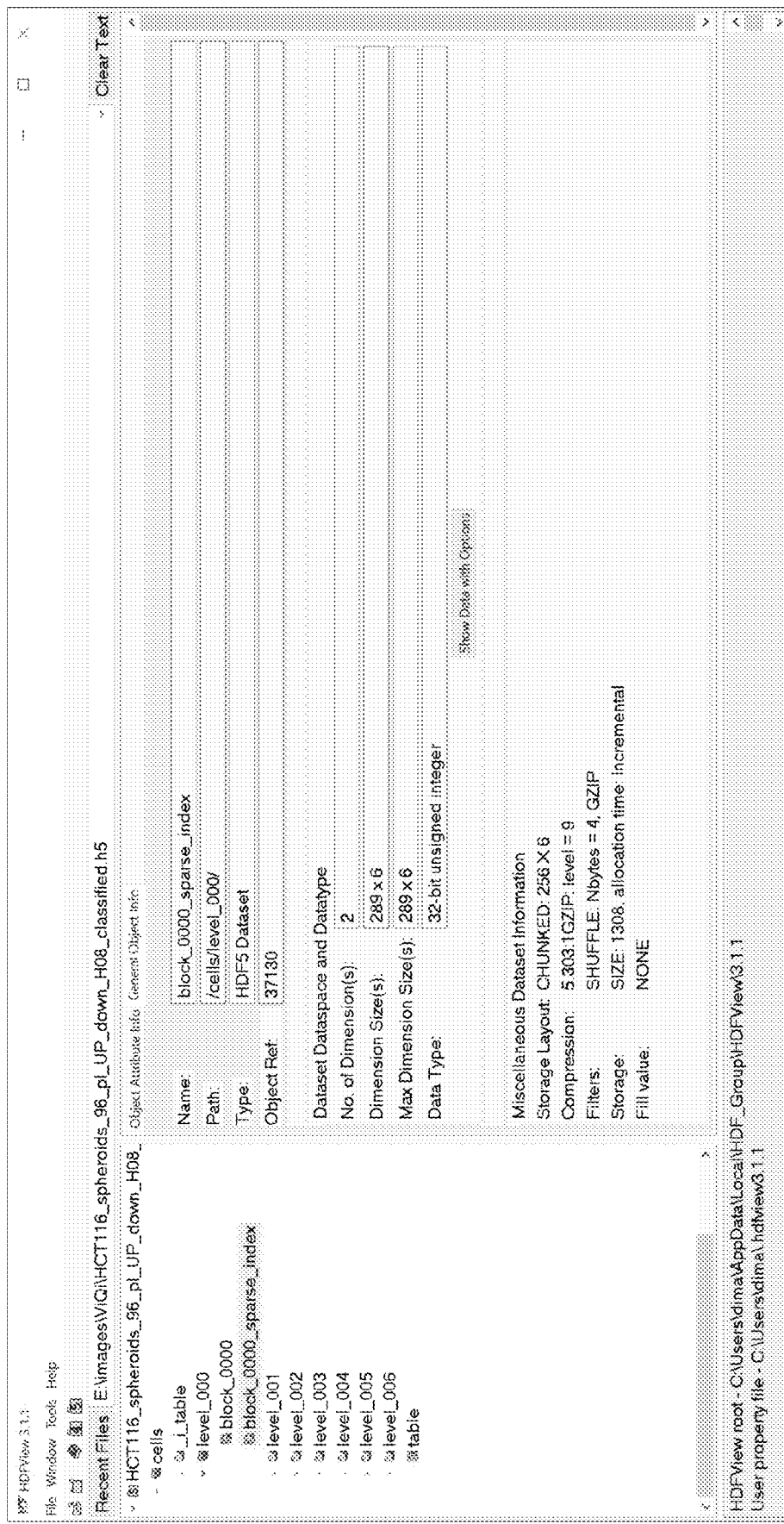
FIG. 20C illustrates a sparse index format of a heat map.

FIG. 20C illustrates how for the heatmap, the sparse index is the same as in the sparse mask case. The block 0000 sparse index is selected to view its attributes.

Measures for Mask and Heatmap Types

Sparse mask and heatmap data are describing the space with a set of measures stored in a tabular format. Several metadata elements can control how the visual representations are created from the table columns.

Image-Level: Metadata Tags viqi_columns_id: string [object id]—defines what columns are used to uniquely identify objects.

viqi_columns_vis: string,vector [ ]—stores comma separated strings of true and false defining visibility for each column.

viqi_columns_class: string—defines columns describing class labels.

viqi_columns_confidence: string—defines columns describing class label confidence.

viqi_class_label_mapping: string—defines mapping from numerical class labels stored in the "viqi_columns_class" to humanly readable strings of class labels. This technique is used to optimize class label storage.

viqi_columns_ml: string,vector [ ]—indicates which columns should be used for ML workflows.

viqi_columns_index: string,vector [ ]—indicates which columns should be indexed by pytables indexing for faster reading and querying.

Exposed Measures

Figure 21:
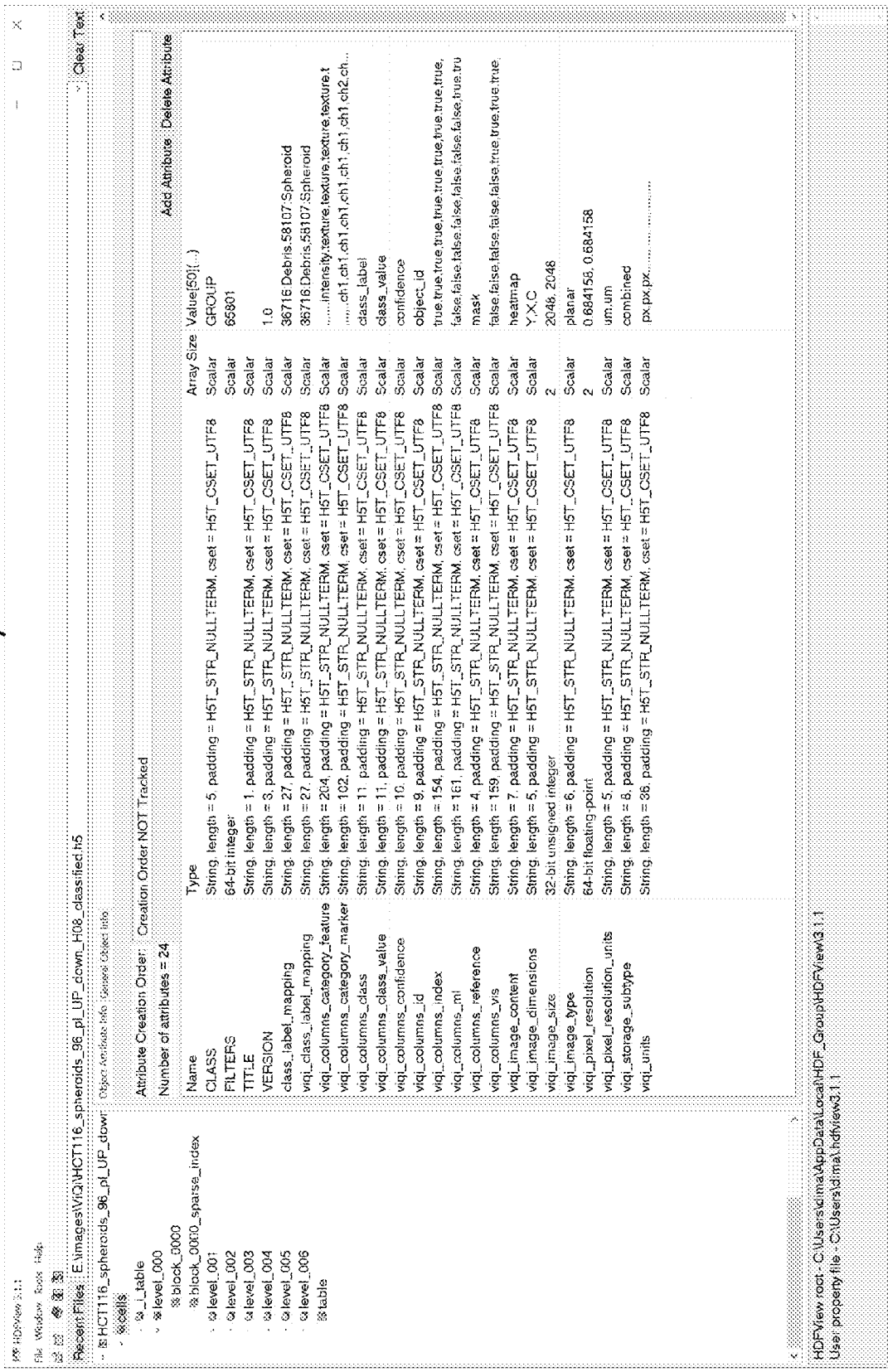
FIG. 21 illustrates an example table with typically stored tags describing a high-resolution image file with several levels and several measures for imaged objects.

Referring now to FIGS. 6 and 21, Most exposed measures are directly represented by values in the table store. If a column is marked as visualizable its name will be the measure name, e.g., "ch1.mfi" as shown in the table example figure. Some measures are exposed in a less direct way with columns producing several measures.

object_id_random—is a special visualization measure computed from the object_id column using a pseudo random algorithm which will give the same value for each id, but the random nature will produce different values for near-by ids enabling a better visualization of separation of nearby objects.

class_labels—visualizes class labels for objects, here values are mapped to strings using the "viqi_class_label_mapping" tag. In the metadata document this measure is marked with a tag "values_label_ids: true".

If the confidence tag "viqi_columns_confidence" is defined, the "class_labels" measure will be followed by a set for measures for each class label:

confidence.class_id.58107—these measures will be computed from "viqi_columns_class" and "viqi_columns_confidence" columns only for a label 58107 and values will be confidences of objects with this label. The string meaning of the label 58107 can be found in the "viqi_class_label_mapping" tag.

Implementation

FIG. 21 illustrates a table with typically stored tags describing a file with several measures. FIG. 6 illustrates storage of a block into a table with several measures.

Low-Resolution Dense Storage Considerations

While measure visualization is computed dynamically by combining sparse stores "mask" or "heatmap" and tabular measure storage dynamically. At certain "low" resolutions, it may become too slow. In these resolutions dense visualizations of sparse objects can be pre-computed and stored as dense blocks with channels, typically stored as "float32", that can be created for each measure in the exact order as they are defined in sparse levels.

FIG. 3C illustrates heatmap data for a block. Heatmap data, although typically much lower resolution than the original data, can also be densified at resolutions lower than the original heatmap grid. Accordingly different levels of heatmap data can be associated with the different levels of image data.

Support for APIs and Services

Figure 22:
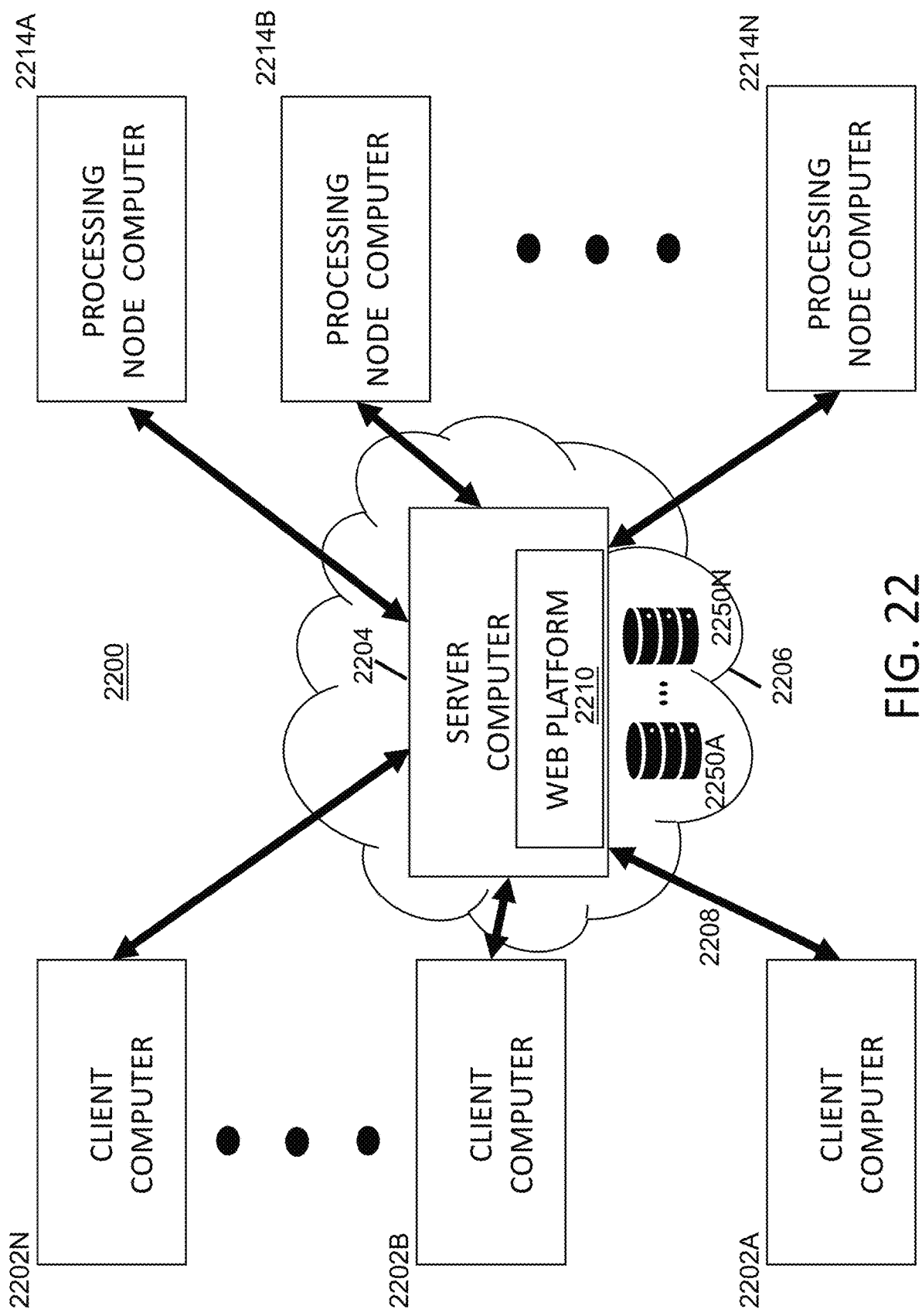
FIG. 22 is a block diagram of a client-server computer system with multiple client computers communicating with one or more computer servers in a server center (or the cloud) over a computer network, such as a wide area network of the internet to provide image storage and analysis services.

FIG. 2B illustrates a distributed method for image analysis and storage with a server, processing nodes, and clients. FIG. 22 further illustrates the distributed computers involved with the distributed method for image analysis and storage around a cloud server. The methods of image analysis and storage format is supported by cloud services as well as application program interfaces (APIs) for easy access and storage. In the cloud, a table service and an image service can be provided.

Cloud, Table Service

Table service gives a composite (fused) view of the table, replacing the reference column with the image service link. The table is thus located at the top level. In FIGS. 16-21, file name of the table is "cells". Other interpretational metadata and levels contained within "cells" are hidden for clarity.

Cloud, Image Service

Image service parses this file and gives fast access to individual objects by asking for an image path appended with object ID, for example, the following command line:

/image_service/DOCUMENT_UUID/cells/4 returns the 4th object from the cells image layer.

Additionally, a block can be requested in reconstructed "dense" form by using the field of view (FOV interface), for example, a request for block 5 is as follows:
slice=fov:5.

Alternatively, one can access the whole reconstructed dense image using the standard tile interface by requesting the scale and region of interest.

BENEFITS/ADVANTAGES

There are a number of advantages in the methods and systems disclosed. Data files we produce are 100× to 1000× smaller than typical naive representations. The size difference means that for real world patient studies it would be physically prohibitive to store and access all of the details we can with this method. Another benefit is that creating new visualizable and analyzable measurements using machine learning (ML) workflows is 10× to 100× faster than typically used naive methods. The speed of access to final data enables exploratory workflows where users can gate many measurements and visualize those results spatially in real time on whole slide imagery. Even more complex exploratory workflows with unsupervised ML methods like UMAP over object measures can be used for spatial visualization and exploration. Finally, this method dramatically speeds-up exploratory assay development and enables many workflows that were unwieldy previously. Additionally, overall storage and speed improvements make this workflow applicable to production analysis and therefore enable unprecedented verifiability and debugging.

Computer Network

Referring now to FIG. 22, a block diagram of a client-server computer system 2200 is shown for a web-based scalable image analysis platform 2210. The client-server computer system 2200 includes a plurality of client computers 2202A-2202N in communication with one or more computer servers 2204 in a server center (or the cloud) 2206 over a computer network 2208, such as a wide area network of the internet. The one or more computer servers 2204 can in turn be coupled in communication with one or more processing node computers 2214A-2214N to process, analyze, and store the high-resolution images in a database 2250. The database 2250 can be a distributed database spread over a plurality of storage devices. 2250A-2250N. The web-based scalable image analysis platform 2210 for the high-resolution images stored in the database 2250 can be executed by the one or more computer servers 2204 and the one or more processing node computers 2214A-2214N for access by the plurality of client computers 2202A-2202N.

Computer System

Figure 23:
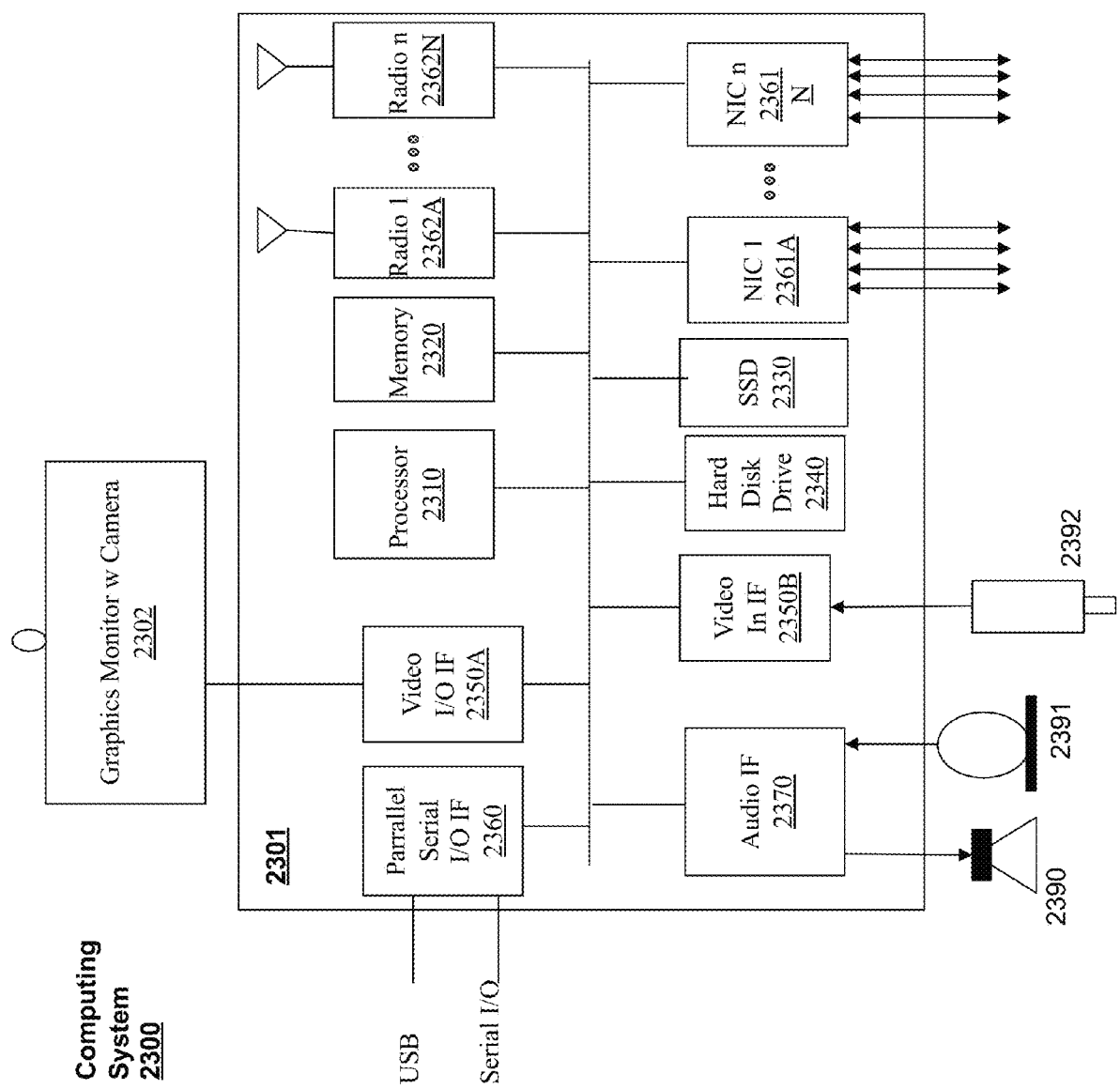
FIG. 23 is a block diagram of a computer system for use as a server computer and client computers (devices) in the system shown in FIG. 22.

Referring now to FIG. 23, a block diagram of a computing system 2300 is shown that can execute the software instructions for the image storage and analysis system and its functionality. The computing system 2300 can be an instance of the one or more servers executing stored software instructions to perform the functional processes described herein. The computing system 2300 can also be an instance of a plurality of instances of the client computers in the wide area network executing stored software instructions to perform the functional processes described herein of a client computer to provide and display a web browser with the various window viewers described herein.

In one embodiment, the computing system 2300 can include a computer 2301 coupled in communication with a graphics monitor 2302 with or without a microphone. The computer 2301 can further be coupled to a loudspeaker 2390, a microphone 2391, and a camera 2392 in a service area with audio video devices. In accordance with one embodiment, the computer 2301 can include one or more processors 2310, memory 2320; one or more storage drives (e.g., solid state drive, hard disk drive) 2330,2340; a video input/output interface 2350A; a video input interface 2350B; a parallel/serial input/output data interface 2360; a plurality of network interfaces 2361A-2361N; a plurality of radio transmitter/receivers (transceivers) 2362A-2362N; and an audio interface 2370. The graphics monitor 2302 can be coupled in communication with the video input/output interface 2350A. The camera 2392 can be coupled in communication with the video input interface 2350B. The speaker 2390 and microphone 2391 can be coupled in communication with the audio interface 2370. The camera 2392 can be used to view one or more audio-visual devices in a service area, such as the monitor 2302. The loudspeaker 2390 can be used to communication out to a user in the service area while the microphone 2391 can be used to receive communications from the user in the service area.

The data interface 2360 can provide wired data connections, such as one or more universal serial bus (USB) interfaces and/or one or more serial input/output interfaces (e.g., RS232). The data interface 2360 can also provide a parallel data interface. The plurality of radio transmitter/receivers (transceivers) 2362A-2362N can provide wireless data connections such as over WIFI, Bluetooth, and/or cellular. The one or more audio video devices can use the wireless data connections or the wired data connections to communicate with the computer 2301.

The computer 2301 can be an edge computer that provides for remote logins and remote virtual sessions through one or more of the plurality of network interface 2361A-2361N. Additionally, each of the network interfaces support one or more network connections. Network interfaces can be virtual interface and also be logically separated from other virtual interfaces. One or more of the plurality of network interfaces 2361A-2361N can be used to make network connections between client computers and server computers.

One or more computing systems 2300 and/or one or more computers 2301 (or computer servers) can be used to perform some or all of the processes disclosed herein. The software instructions that performs the functionality of servers and devices are stored in the storage device 2330,2340 and loaded into memory 2320 when being executed by the processor 2310.

In one embodiment, the processor 2310 executes instructions residing on a machine-readable medium, such as the hard disk drive 2330,2340, a removable medium (e.g., a compact disk 2399, a magnetic tape, etc.), or a combination of both. The instructions can be loaded from the machine-readable medium into the memory 2320, which can include Random Access Memory (RAM), dynamic RAM (DRAM), etc. The processor 2310 can retrieve the instructions from the memory 2320 and execute the instructions to perform operations described herein.

Note that any or all of the components and the associated hardware illustrated in FIG. 23 can be used in various embodiments of a computer system 2300. However, it should be appreciated that other configurations of the computer system 2300 can include more or less devices than those shown in FIG. 23.

CLOSING

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

When implemented in software, the elements of the embodiments of the invention are essentially the code segments to perform the necessary tasks. The program or code segments can be stored in a processor readable medium or transmitted by a computer data signal embodied in a carrier wave over a transmission medium or communication link. The processor readable medium can include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal can include any signal that can propagate over a transmission medium such as electronic network channels, optical fibers, air, electromagnetic, RF links, etc. The code segments can be downloaded via computer networks such as the Internet, Intranet, etc.

While certain exemplary embodiments have been described and shown in the accompanying drawings, it is to be understood that such embodiments are merely illustrative of and not restrictive on the broad invention. While this specification includes many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations, separately or in sub-combination. Moreover, although features can be described above as acting in certain combinations and even initially claimed as such, one or more features from a claimed combination can in some cases be excised from the combination, and the claimed combination can be directed to a sub-combination or variations of a sub-combination. Accordingly, the claimed invention is to be limited only by patented claims that follow below.

What is claimed is:

1. A method of storing and processing a large-scale digital image, the method comprising:
   reading a digital image within an image space at a one hundred percent scale, wherein the one hundred percent scale represents a highest resolution of the digital image;
   defining the image space of the digital image by using spatial parameters, measure parameters, and resolution parameters, wherein the spatial parameters define the extent of the digital image, and wherein the measure parameters include predefined metrics for detecting imaged objects within the digital image, and wherein the resolution parameters define a plurality of resolutions including the highest resolution for the image space;
   partitioning the image space into a plurality of logical blocks that are arbitrarily positioned and arbitrarily sized, wherein at least some of the logical blocks overlap on one or more areas of the image space to generate overlapping blocks;
   detecting the imaged objects and associated measures in each of the plurality of logical blocks by using the measure parameters; and
   storing the imaged objects associated with the logical blocks at the one hundred percent scale and one or more lower resolutions, wherein the storing includes tabular storage of the associated measures, object types, and object identifiers into a table, and wherein the storing further includes a storage of object spatial data into a semi-sparse matrix associated with the object identifiers.

2. The method of claim 1, further comprising:
   optimizing storage of the logical blocks, wherein the optimizing includes
      fusing overlapping parts of the imaged objects identified in the overlapping blocks,
      densifying and re-gridding the digital image at the one or more lower resolutions to generate one or more further lower resolutions, and
      using the one or more further lower resolutions to generate a fast visualization of the image space at the further lower resolution levels.

3. The method of claim 2, further comprising:
   adding new measures to the table by using machine learning inference, wherein the machine learning includes an analysis of data in the table associated with one or more imaged objects; and
   iteratively performing the optimizing storage and the adding new measures to further describe additional various characteristics of the imaged objects.

4. The method of claim 3, further comprising:
   generating a visualization of any scale of the image space, including retrieving planes of one or more measures of interest.

5. The method of claim 3, further comprising:
   generating a visualization of a sparse layer of the image space by finding overlapping logical blocks in a requested spatial extent in a requested resolution level.

6. The method of claim 1, wherein
   the digital image is captured by using a microscope.

7. The method of claim 1, wherein
   the digital image is captured at a highest resolution available for an image capture device.

8. The method of claim 1, wherein
the digital image is captured by using an image capture device configured for at least one of:
whole tissue microscopy;
light-sheet microscopy;
large-scale electromagnetic (EM) microscopy;
remote sensing satellite imagery; or
aerial imagery.

9. The method of claim 1, wherein
the storing includes down-sampling the imaged objects from one hundred percent to the one or more lower resolutions.

10. The method of claim 1, wherein
the lower resolutions are less than or equal to a 50% scale relative to the highest resolution.

11. The method of claim 1, wherein
the further lower resolutions are less than or equal to a 25% scale relative to the highest resolution.

12. The method of claim 1, further comprising:
displaying, on a display device, selected objects at a selected resolution and within a portion of the image space that is at the one hundred percent scale.

13. A system comprising:
one or more computers including one or more processors configured to perform:
reading a digital image within an image space at a one hundred percent scale, wherein the one hundred percent scale represents a highest resolution of the digital image;
defining the image space of the digital image by using spatial parameters, measure parameters, and resolution parameters, wherein the spatial parameters define the extent of the digital image, and wherein the measure parameters include predefined metrics for detecting imaged objects within the digital image, and wherein the resolution parameters define a plurality of resolutions including the highest resolution for the image space;
partitioning the image space into a plurality of logical blocks that are arbitrarily positioned and arbitrarily sized, wherein at least some of the logical blocks overlap on one or more areas of the image space to generate overlapping blocks;
detecting the imaged objects and associated measures in each of the plurality of logical blocks by using the measure parameters; and
storing the imaged objects associated with the logical blocks at the one hundred percent scale and one or more lower resolutions, wherein the storing includes tabular storage of the associated measures, object types, and object identifiers into a table, and wherein the storing further includes a storage of object spatial data into a semi-sparse matrix associated with the object identifiers.

14. The system of claim 13, wherein the one or more processors are further configured to perform:
optimizing storage of the logical blocks, wherein the optimizing includes
fusing overlapping parts of the imaged objects identified in the overlapping blocks,
densifying and re-gridding the digital image at the one or more lower resolutions to generate one or more further lower resolutions, and
using the one or more further lower resolutions to generate a fast visualization of the image space at the further lower resolution levels.

15. The system of claim 14, wherein the one or more processors are further configured to perform:
adding new measures to the table by using machine learning inference, wherein the machine learning includes an analysis of data in the table associated with one or more imaged objects; and
iteratively performing the optimizing storage and the adding new measures to further describe additional various characteristics of the imaged objects.

16. The system of claim 15, wherein the one or more processors are further configured to perform:
generating a visualization of any scale of the image space, including retrieving planes of one or more measures of interest.

17. The system of claim 15, wherein the one or more processors are further configured to perform:
generating a visualization of a sparse layer of the image space by finding overlapping logical blocks in a requested spatial extent in a requested resolution level.

18. The system of claim 13, wherein
the digital image is captured by using a microscope.

19. The system of claim 13, wherein
the digital image is captured at a highest resolution available for an image capture device.

20. The system of claim 13, wherein
the digital image is captured by using an image capture device configured for at least one of:
whole tissue microscopy;
light-sheet microscopy;
large-scale electromagnetic (EM) microscopy;
remote sensing satellite imagery; or
aerial imagery.

21. The system of claim 13, wherein
the storing includes down-sampling the imaged objects from one hundred percent to the one or more lower resolutions.

22. The system of claim 13, wherein
the lower resolutions are less than or equal to a 50% scale relative to the highest resolution.

23. The system of claim 13, wherein
the further lower resolutions are less than or equal to a 25% scale relative to the highest resolution.

24. The system of claim 23, wherein the one or more processors are further configured to perform:
displaying, on a display device, selected objects at a selected resolution and within a portion of the image space that is at the one hundred percent scale.

* * * * *